United States Patent [19]

Abe et al.

[11] Patent Number: 5,494,969
[45] Date of Patent: Feb. 27, 1996

[54] CYCLOOLEFIN POLYMER COMPOSITION

[75] Inventors: Yoshiharu Abe; Toshihiro Sagane; Yoichiro Tsuji, all of Waki, Japan

[73] Assignee: Mitsui Petrochemical Industries, Ltd., Tokyo, Japan

[21] Appl. No.: 187,142

[22] Filed: Jan. 27, 1994

[30] Foreign Application Priority Data

| Jan. 29, 1993 | [JP] | Japan | 5-014292 |
| Jan. 29, 1993 | [JP] | Japan | 5-014297 |
| Jan. 29, 1993 | [JP] | Japan | 5-014298 |

[51] Int. Cl.$^6$ .......................... C08L 45/00; C08L 23/16; C08L 51/04
[52] U.S. Cl. .......................... 525/289; 525/290; 525/210; 525/211; 525/932
[58] Field of Search .................. 525/289, 210, 525/932, 211, 290

[56] References Cited

U.S. PATENT DOCUMENTS

| 4,614,778 | 9/1986 | Kajiura et al. . | |
| 4,874,808 | 10/1989 | Minami et al. | 525/210 |
| 4,918,133 | 4/1990 | Moriya et al. . | |
| 4,992,511 | 2/1991 | Yamamoto et al. | 525/210 |
| 5,128,446 | 7/1992 | Hayashi et al. | 526/281 |
| 5,179,171 | 1/1993 | Minami et al. . | |
| 5,239,006 | 8/1993 | Sagane | 525/210 |
| 5,324,801 | 6/1994 | Brekner et al. | 526/281 |
| 5,331,057 | 7/1994 | Brekner et al. | 525/289 |

FOREIGN PATENT DOCUMENTS

| 0313838 | 5/1989 | European Pat. Off. . |
| 0335985 | 10/1989 | European Pat. Off. . |
| 0482626 | 4/1992 | European Pat. Off. . |
| 61-98780 | 5/1986 | Japan . |
| 61-120816 | 6/1986 | Japan . |
| 61-115916 | 6/1986 | Japan . |
| 3255145 | 11/1991 | Japan . |
| 05320257 | 12/1993 | Japan . |
| 9324567 | 12/1993 | WIPO . |

OTHER PUBLICATIONS

Manson et al—Polymer Blends and Composites—pp. 116–117 (1976).

*Primary Examiner*—Carman J. Seccuro, Jr.
*Attorney, Agent, or Firm*—Sherman and Shalloway

[57] ABSTRACT

There is provided a cycloolefin polymer composition comprising 8 to 40% by weight of a cycloolefin polymer [A] and 92 to 60% by weight of a cycloolefin polymer [B], both having specific properties, wherein a difference $\Delta n_D = |n_D(A) - n_D(B)|$ between the refractive index $n_D(A)$ of the polymer [A] and the refractive index $n_D(B)$ of the polymer [B] is not more than 0.015. This composition is excellent in impact resistance, transparency and heat resistance, and has a good balance of these properties.

There is also provided a cycloolefin copolymer composition comprising 8 to 40% by weight of a cycloolefin elastomer component [Aa] of an α-olefin, a specific cycloolefin and a non-conjugated diene which contains a polymerizable carbon-carbon double bond; and 92 to 60% by weight of a cycloolefin copolymer component [Ba] which is obtained by copolymerizing an α-olefin and a specific cycloolefin in the presence of the elastomer component [Aa]; wherein a difference $\Delta n_D = |n_D(A) - n_D(B)|$ between the refractive index $n_D(Aa)$ of the component [Aa] and the refractive index $n_D(Ba)$ of the component [Ba] is not more than 0.015. This composition has excellent properties inherent in a cycloolefin random copolymer and is improved especially in impact resistance without tranding off its transparency.

There is also provided a cycloolefin copolymer composition comprising 8 to 40% by weight of a cycloolefin elastomer component [Aα] of an α-olefin and a specific cycloolefin which substantially contains no polymerizable carbon-carbon double bond; and 92 to 60% by weight of a cycloolefin copolymer component [Bα] which is obtained by copolymerizing an α-olefin and a specific cycloolefin in the presence of the elastomer component [Aα]; wherein a difference $\Delta n_D = |n_D(A) - n_D(B)|$ between the refractive index $n_D(A\alpha)$ of the component [Aα] and the refractive index $n_D(B\alpha)$ of the component [Bα] is not more than 0.015. This composition has also excellent properties inherent in a cycloolefin random copolymer and is improved particularly in impact resistance without trading off its transparency.

4 Claims, No Drawings

CYCLOOLEFIN POLYMER COMPOSITION

FIELD OF THE INVENTION

The present invention relates to cycloolefin polymer compositions, and more particularly to cycloolefin polymer compositions which are excellent in impact resistance, transparency and heat resistance and have a good balance of these properties.

BACKGROUND OF THE INVENTION

The present applicant has found that cycloolefin random copolymers obtained by copolymerizing ethylene and cycloolefins such as tetracyclododecene are synthetic resins which are excellent in transparency and well-balanced among various properties such as heat resistance, thermal aging resistance, chemical resistance, solvent resistance, dielectric properties and rigidity, and also found that these copolymers exert excellent performance in a field of optical materials, e.g., optical memory discs and optical fibers. Based on these findings, the applicant has disclosed the cycloolefin random copolymers in Japanese Patent Laid-Open Publications No. 168708/1985, No. 98780/1986, No. 115912/1986, No. 115916/1986, No. 120816/1986 and No. 252407/1987. Further, it is also known that the copolymers described in these publications exert excellent performance in a field of structural materials.

However, there is yet room for improvement of the impact resistance in the cycloolefin copolymers, though they are excellent especially in the heat resistance and the rigidity. Moreover, even if the impact resistance is improved, the transparency inherent in the cycloolefin copolymers should be maintained.

The present applicant has also found that a composition comprising a cycloolefin random copolymer having a specific softening temperature (TMA) and a specific α-olefin elastomeric copolymer can be improved in the impact resistance without deteriorating other excellent properties such as heat resistance, thermal aging resistance and chemical resistance, and the present applicant has disclosed this composition in Japanese Patent Laid-Open Publication No. 163241/1989.

Further, the present applicant has also proposed in Japanese Patent Laid-Open Publication No. 167318/1990 a cycloolefin polymer composition improved in the impact resistance which comprises a reaction product obtained by reacting a specific cycloolefin random copolymer with a specific soft copolymer in the presence of an organic peroxide.

However, the cycloolefin polymer compositions proposed in Japanese Patent Laid-Open Publications No. 163241/1989 and No. 167318/1990 are not always satisfactory in the transparency and has yet room for improvement, though they are improved in the impact resistance.

The present applicant has further proposed resin compositions comprising cycloolefin random copolymers obtained by copolymerizing ethylene and cycloolefins (e.g., tetracyclododecene) and soft polymers (rubbers) in Japanese Patent Application No. 52971/1990.

These resin compositions are higher in the impact resistance than the cycloolefin random copolymers as they are, but they are desired to be much more improved in the impact strength. Further, the resin compositions are sometimes deteriorated in the transparency.

Moreover, in Japanese Patent Application No. 133822/1992, the present applicant has proposed a cycloolefin copolymer obtained by copolymerizing an α-olefin and a cycloolefin in the presence of a hydrocarbon elastomer having a polymerizable double bond.

This cycloolefin copolymer is also good in the impact resistance, but it is also desired to be more improved in the transparency.

Accordingly, the present inventors have further studied to solve such problems associated with the prior art techniques as described above. As a result, they have found that a cycloolefin polymer composition comprising two kinds of cycloolefin polymers having specific glass transition temperatures, specific refractive indexes and a specific difference in the refractive index therebetween, and a cycloolefin polymer composition obtained by radical reaction of the above composition in the presence of an organic peroxide and, if necessary, a radical polymerizable polyfunctional monomer are well-balanced among the impact resistance, the transparency and the heat resistance; and accomplished the present invention.

The present inventors have also found that a cycloolefin copolymer composition, which comprises a specific cycloolefin elastomer component [Aa] having a polymerizable double bond and a cycloolefin copolymer component [Ba] obtained by copolymerizing an α-olefin of two or more carbon atoms such as ethylene and a cycloolefin in the presence of the elastomer component [Aa] and which contains the component [Aa] in a specific amount wherein a difference between the refractive index $n_D(Aa)$ of the component [Aa] and the refractive index $n_D(Ba)$ of the component [Ba] is in a specific range, is excellent particularly in the transparency and the impact resistance; and accomplished the present invention.

The present inventors have further found that a cycloolefin copolymer composition, which comprises a specific cycloolefin elastomer component [Aα] having substantially no polymerizable double bond and a cycloolefin elastomer [Bα] obtained by copolymerizing an α-olefin of two or more carbon atoms such as ethylene and a cycloolefin in the presence of the elastomer component [Aα] and which contains the component [Aα] in a specific amount wherein a difference between the refractive index $n_D(A\alpha)$ of the component [Aα] and the refractive index $n_D(B\alpha)$ of the component [Bα] is in a specific range, is also excellent particularly in the transparency and the impact resistance; and accomplished the present invention.

OBJECT OF THE INVENTION

The present invention is intended to solve problems associated with the prior art techniques as described above, and it is an object of the invention to provide a cycloolefin polymer composition which is excellent in the impact resistance, the transparency and the heat resistance and has a good balance of these properties.

It is another object of the invention to provide a cycloolefin copolymer composition which is improved especially in the impact resistance and the transparency without deteriorating the excellent properties inherent in a cycloolefin random copolymer.

SUMMARY OF THE INVENTION

The first cycloolefin polymer composition according to the present invention comprises:

[A] a cycloolefin polymer selected from the group consisting of:

[A-1] a cycloolefin random copolymer obtained by copolymerizing (i) an α-olefin of two or more carbon atoms and (ii) at least one cycloolefin represented by the following formula (I) or (II) and, if necessary, (iii) a diene,

[A-2] a ring-opening polymer of at least one cycloolefin represented by the following formula (I) or (II), and

[A-3] a hydrogenation product of a ring-opening polymer of at least one cycloolefin represented by the following formula (I) or (II), the cycloolefin polymer [A] having an intrinsic viscosity [η], as measured in decalin at 135° C., of 0.5 to 5.0 dl/g, a glass transition temperature (Tg), as measured by DSC, of lower than 15° C., a content of constituent units derived from the cycloolefin of not less than 3% by mol, and a refractive index $n_D(A)$, as measured at 25° C., of 1.500 to 1.650; and

[B] a cycloolefin polymer selected from the group consisting of:

[B-1] a cycloolefin random copolymer obtained by copolymerizing (i) an α-olefin of two or more carbon atoms and (ii) at least one cycloolefin represented by the following formula (I) or (II) and, if necessary, (iii) a diene,

[B-2] a ring-opening polymer of at least one cycloolefin represented by the following formula (I) or (II), and

[B-3] a hydrogenation product of a ring-opening polymer of at least one cycloolefin represented by the following formula (I) or (II), the cycloolefin polymer [B] having an intrinsic viscosity [η], as measured in decalin at 135° C., of 0.1 to 5.0 dl/g, a glass transition temperature (Tg), as measured by DSC, of not lower than 70° C., and a refractive index $n_D(B)$, as measured at 25° C., of 1.500 to 1.650;

wherein a difference $\Delta n_D=|n_D(A)-n_D(B)|$ between the refractive index $n_D(A)$ of the cycloolefin polymer [A] and the refractive index $n_D(B)$ of the cycloolefin polymer [B] is not more than 0.015, and a weight ratio [A]/[B] is in the range of 8/92 to 40/60:

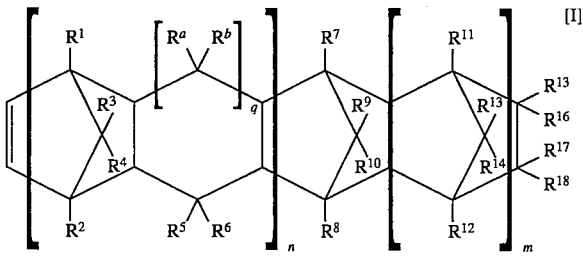

[I]

wherein n is 0 or 1; m is 0 or a positive integer; q is 0 or 1;

each of $R^1$–$R^{18}$, $R^a$ and $R^b$ is independently a hydrogen atom, a halogen atom, or an aliphatic, an alicyclic or an aromatic hydrocarbon group;

$R^{15}$–$R^{18}$ may be linked with one another to form a monocyclic or polycyclic group which may have a double bond; and $R^{15}$ and $R^{16}$, or $R^{17}$ and $R^{18}$ may together form an alkylidene group; or

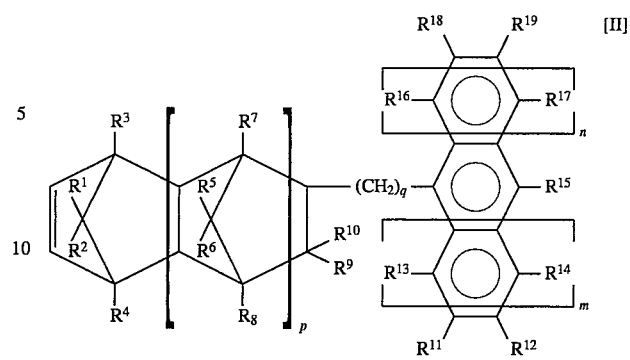

[II]

wherein each of p and q is independently 0 or an integer of 1 or more; each of m and n is independently 0, 1 or 2;

each of $R^1$–$R^{19}$ is independently a hydrogen atom, a halogen atom, or an aliphatic, an alicyclic or an aromatic hydrocarbon group, or an alkoxy group; the carbon atom to which $R^9$ and $R^{10}$ are linked may be bonded directly or by way of an alkylene group of 1–3 carbon atoms to the carbon atom to which $R^{13}$ is linked or the carbon atom to which $R^{11}$ is linked; and $R^{15}$ and $R^{12}$, or $R^{15}$ and $R^{19}$ may be linked together to form a monocyclic or polycyclic aromatic ring when each of n and m is 0.

The first cycloolefin polymer composition of the invention can be modified by radical reaction thereof in the presence of an organic peroxide and if necessary, a radical polymerizable polyfunctional monomer.

The first cycloolefin polymer composition of the invention and the radical reaction modified product thereof show excellent impact resistance, transparency and heat resistance.

In the first cycloolefin polymer composition of the invention, the cycloolefin polymer [A] and the cycloolefin polymer [B] are preferably cycloolefin random copolymers [A-1] and [B-1], respectively, each obtained by copolymerizing (i) an α-olefin of two or more carbon atoms, and (ii) at least one cycloolefin represented by the above formula (I) or (II) and if necessary, (iii) a diene.

Further, the cycloolefin polymer [A] is particularly preferably a random copolymer of an α-olefin having two or more carbon atoms and a cycloolefin represented by the above formula (II).

The cycloolefin polymer [B] is particularly preferably a random copolymer of an α-olefin having two or more carbon atoms and a cycloolefin represented by the above formula (I).

The second cycloolefin copolymer composition according to the present invention comprises:

[Aa] a cycloolefin elastomer component which is obtained by copolymerizing (i) an α-olefin of two or more carbon atoms and (ii) at least one cycloolefin represented by the above formula (I) or (II) and (iiia) a non-conjugated diene of 5 to 20 carbon atoms, and which has a content of the cycloolefin units of not less than 3% by mol, an intrinsic viscosity [η], as measured in decalin at 135° C., of 0.5 to 5.0 dl/g, a glass transition temperature (Tg) of lower than 15° C., a polymerizable carbon-carbon double bond and an iodine value of 2 to 30 (g-iodine/100 g-polymer) and a refractive index $n_D(Aa)$, as measured at 25° C., of 1.500 to 1.650; and

[Ba] a cycloolefin copolymer component which is obtained by copolymerizing (i) an α-olefin of two or more carbon atoms and (ii) at least one cycloolefin represented by the above formula (I) or (II) in the presence of the elastomer component [Aa];

wherein the component [Aa] exists in an amount of 8 to 40% by weight, and a difference $\Delta n_D = |n_D(Aa) - n_D(Ba)|$ between the refractive index $n_D(Aa)$ of the component [Aa] and the refractive index $n_D(Ba)$ of the component [Ba] is not more than 0.015.

In this invention, the cycloolefin elastomer component [Aa] is preferably a copolymer of a cycloolefin represented by the formula (II), and the cycloolefin copolymer component [Ba] is preferably a copolymer of a cycloolefin represented by the formula (I).

The second cycloolefin copolymer composition of the invention has excellent properties inherent in a cycloolefin random copolymer, and is improved particularly in the impact resistance without trading off its transparency.

The third cycloolefin copolymer composition according to the present invention comprises:

[Aα] a cycloolefin elastomer component which is obtained by copolymerizing (i) an α-olefin of two or more carbon atoms and (ii) at least one cycloolefin represented by the above formula (I) or (II), and which has a content of the cycloolefin units of not less than 3% by mol, an intrinsic viscosity [η], as measured in decal in at 135° C., of 0.5 to 5.0 dl/g, a glass transition temperature (Tg) of lower than 15° C. and a refractive index $n_D(A\alpha)$, as measured at 25° C., of 1.500 to 1.650, and substantially contains no polymerizable carbon-carbon double bond; and

[Bα] a cycloolefin copolymer component which is obtained by copolymerizing (i) an α-olefin of two or more carbon atoms and (ii) at least one cycloolefin represented by the above formula (I) or (II) in the presence of the elastomer component [Aα];

wherein the component [Aα] exists in the composition in an amount of 8 to 40% by weight, and a difference $\Delta n_D = |n_D(A\alpha) - n_D(B\alpha)|$ between the refractive index $n_D(A\alpha)$ of the component [Aα] and the refractive index $n_D(B\alpha)$ of the component [Bα] is not more than 0.015.

In this invention, the cycloolefin elastomer component [Aα] is preferably a copolymer of a cycloolefin represented by the formula (II), and the cycloolefin copolymer component [Bα] is preferably a copolymer of a cycloolefin represented by the formula (I).

The third cycloolefin copolymer composition of the invention has also excellent properties inherent in a cycloolefin random copolymer, and is improved particularly in the impact resistance without trading off its transparency.

DETAILED DESCRIPTION OF THE INVENTION

The cycloolefin polymer compositions according to the present invention will be further described hereinafter.

The meaning of the term "polymer" used herein is not limited to "homopolymer" but may comprehend "copolymer". Also, the meaning of the term "polymerization" used herein is not limited to "homopolymerization" but may comprehend "copolymerization".

First Cycloolefin Polymer Composition

The first cycloolefin polymer composition according to the invention is formed from:

[A] a cycloolefin polymer selected from the group consisting of:

[A-1] a cycloolefin random copolymer obtained by copolymerizing (i) an α-olefin of two or more carbon atoms and (ii) at least one cycloolefin represented by the formula (I) or (II) and if necessary, (iii) a diene,

[A-2] a ring-opening polymer of at least one cycloolefin represented by the formula (I) or (II), and

[A-3] a hydrogenation product of a ring-opening polymer of at least one cycloolefin represented by the following formula (I) or (II); and

[B] a cycloolefin polymer selected from the group consisting of:

[B-1] a cycloolefin random copolymer obtained by copolymerizing (i) an α-olefin of two or more carbon atoms and (ii) at least one cycloolefin represented by the formula (I) or (II) and if necessary, (iii) a diene,

[B-2] a ring-opening polymer of at least one cycloolefin represented by the following formula (I) or (II), and

[B-3] a hydrogenation product of a ring-opening polymer of at least one cycloolefin represented by the formula (I) or (II).

The cycloolefin random copolymer [A-1] and the cycloolefin random copolymer [B-1] used in the invention are each a cycloolefin random copolymer obtained by copolymerizing (i) an α-olefin of two or more carbon atoms and at least one cycloolefin represented by the formula (I) or (II) and, if necessary, (iii) a diene.

The α-olefin of two or more carbon atoms (i) used for preparing the cycloolefin random copolymer [A-1] and the cycloolefin random copolymer [B-1] may be straight chain or branched chain, and preferably has 2 to 20 carbon atoms. Examples of such α-olefin include ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene. Of these, preferred is ethylene or propylene, and particularly preferred is ethylene. These α-olefins may be used singly or in combination of two or more kinds.

The cycloolefin (ii) used for preparing the cycloolefin random copolymer [A-1] and the cycloolefin random copolymer [B-1] is a cycloolefin represented by the formula (I) or (II).

The cycloolefin represented by the formula (I) or (II) is described below in detail.

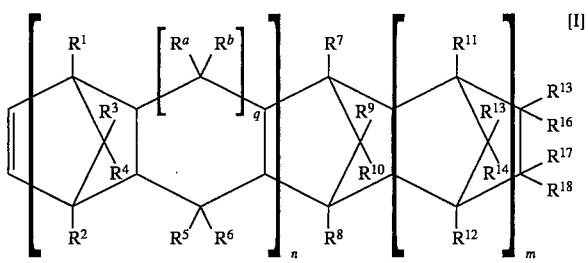

In the formula (I), n is 0 or 1, m is 0 or a positive integer, and q is 0 or 1. When q is 1, a ring represented by using q is a 6-membered ring, and when q is 0, this ring is a 5-membered ring.

Further, in the above formula (I), $R^1$–$R^{18}$, $R^a$ and $R^b$ are each independently a hydrogen atom, a halogen atom, or an aliphatic, an alicyclic or an aromatic hydrocarbon group.

Examples of the halogen atom include fluorine atom, chlorine atom, bromine atom and iodine atom.

Examples of the hydrocarbon group generally include alkyl group of 1–20 carbon atoms, cycloalkyl group of 3–15 carbon atoms and aromatic hydrocarbon group.

Specific examples of the alkyl group include methyl group, ethyl group, propyl group, isopropyl group, amyl group, hexyl group, octyl group, decyl group, dodecyl group and octadecyl group. These alkyl groups may be substituted with halogen atoms.

A specific example of the cycloalkyl group is cyclohexyl group.

Specific examples of the aromatic hydrocarbon group include phenyl group and naphthyl group.

Moreover, in the above formula (I), $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ or $R^{17}$ may be linked together to form a monocyclic or polycyclic group, and thus formed monocyclic or polycyclic group may have a double bond.

Examples of the monocyclic or polycyclic group are given below.

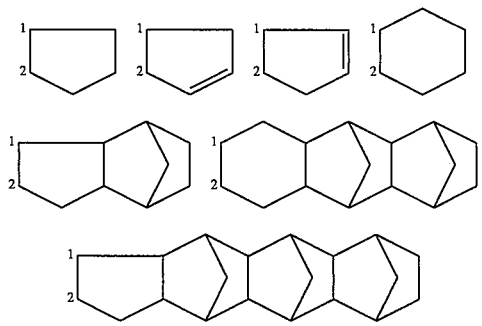

In these cyclic groups, carbon atoms attached with numerals 1 and 2 are those to which substituent $R^{15}$ ($R^{16}$) or $R^{18}$ ($R^{19}$) is linked.

In the above formula (I), $R^{15}$ and $R^{16}$, or $R^{17}$ and $R^{18}$ may together form an alkylidene group. This alkylidene group generally has 2–20 carbon atoms, and examples of such alkylidene group include ethylidene group, propylidene group and isopropylidene group.

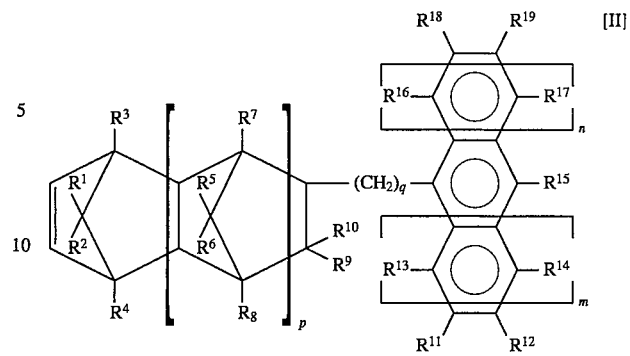

In the formula (II), each of p and q is independently 0 or an integer of 1 or more, and each of m and n is independently 0, 1 or 2.

Further, $R^1$–$R^{19}$ are each independently a hydrogen atom, a halogen atom, or an aliphatic, an alicyclic or an aromatic hydrocarbon group, or an alkoxy group.

In the formula (II), the halogen atom has the same meanings as in the formula (I).

The hydrocarbon groups include generally alkyl group of 1–20 carbon atoms and cycloalkyl group of 3–15 carbon atoms or aromatic hydrocarbon group. Specific examples of the alkyl group include methyl group, ethyl group, propyl group, isopropyl group, amyl group, hexyl group, octyl group, decyl group, dodecyl group and octadecyl group. These alkyl groups may be substituted with halogen atoms.

The cycloalkyl groups include, for example, cyclohexyl group.

The aromatic hydrocarbon groups include, for example, aryl group and aralkyl group. Specific examples include phenyl group, tolyl group, naphthyl group, benzyl group and phenylethyl group.

Specific examples of the alkoxy group include methoxy group, ethoxy group and propoxy group.

The carbon atom to which $R^9$ and $R^{10}$ are linked may be bonded directly or by way of an alkylene group of 1–3 carbon atoms to the carbon atom to which $R^{13}$ is linked or the carbon atom to which $R^{11}$ is linked. In the latter case, $R^9$ and $R^{13}$, or $R^{10}$ and $R^{11}$ together form alkylene group, such as methylene group (—$CH_2$—), ethylene group (—$CH_2CH_2$—) or propylene group (—$CH_2CH_2CH_2$—).

Furthermore, in the case of n=m=0, $R^{15}$ and $R^{12}$, or $R^{15}$ and $R^{19}$ may be linked together to form a monocyclic or polycyclic aromatic ring. Examples of the aromatic ring which is formed with $R^{15}$ and $R^{12}$ in the case of n=m=0, include

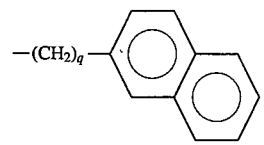

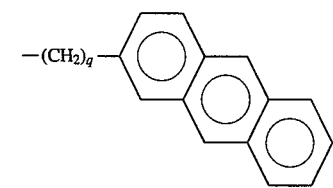

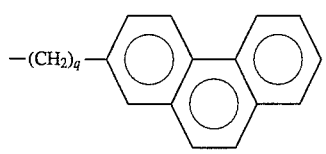

wherein q is the same as defined in the formula (II).

Cycloolefins represented by the above-mentioned formula (I) or (II) include bicyclo-2-heptene derivatives (bicyclohept-2-ene derivatives),
tricyclo-3-decene derivatives,
tricyclo-3-undecene derivatives,
tetracyclo-3-dodecene derivatives,
pentacyclo-4-pentadecene derivatives,
pentacyclopentadecadienene derivatives,
pentacyclo-3-pentadencene derivatives,
pentaccylo-4-hexadecene derivatives,
pentacyclo-3-hexadecene derivatives,
hexacyclo-4-heptadecene derivatives,
heptacyclo-5-eicocene derivatives,
heptacyclo-4-eicocene derivatives,
heptacyclo-5-heneicocene derivatives,
octacyclo-5-dococene derivatives,
nonacyclo-5-pentacosene derivatives,
nonacyclo-6-hexacosene derivatives,
cyclopentadiene-acenaphthylene adducts,
1,4-methano-1,4,4a,9a-tetrahydrofluorene derivatives and
1,4-methano-1,4,4a,5,10,10a-hexahydroanthoracene derivatives.

Examples of the cycloolefins represented by the formula (I) or (II) are as follows:

The bicyclo[2.2.1]hept-2-ene derivatives such as

| | |
|---|---|
|  | Bicyclo[2.2.1]hept-2-ene (=norbornene) |
|  | 5-Methylbicyclo[2.2.1]hept-2-ene |
| 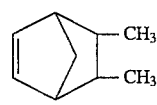 | 5,6-Dimethylbicyclo[2.2.1]-hept-2-ene |
| 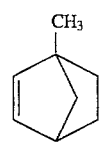 | 1-Methylbicyclo[2.2.1]hept-2-ene |
| 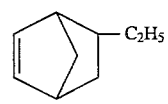 | 5-Ethylbicyclo[2.2.1]hept-2-ene |
| 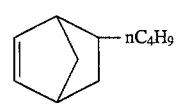 | 5-n-Butylbicyclo[2.2.1]hept-2-ene |
| 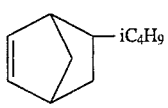 | 5-Isobutylbicyclo[2.2.1]hept-2-ene |
| 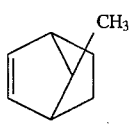 | 7-Methylbicyclo[2.2.1]hept-2-ene; | the tricyclo[4.3.0.1$^{2,5}$]-3-decene derivatives such as

| | |
|---|---|
| 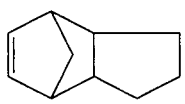 | Tricyclo [4.3.0.1$^{2,5}$]-3-decene, |
| 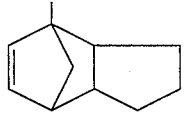 | 2-Methyltricyclo [4.3.0.1$^{2,5}$]-3-decene |
| 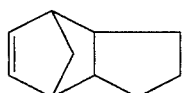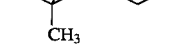 | 5-Methyltricyclo [4.3.0.1$^{2,5}$]-3-decene; | the tricyclo[4.4.0.1$^{2,5}$]-3-undecene derivatives such as

| | |
|---|---|
|  | Tricyclo[4.4.0.1$^{2,5}$]-3-undecene |
| 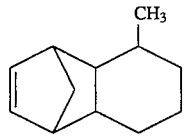 | 10-Methyltricyclo [4.4.0.1$^{2,5}$]-3-undecene; | the tetracyclo[4.4.0.1$^{2,5}$.1$^{7,10}$]-3-dodecene derivatives such as

| | |
|---|---|
| 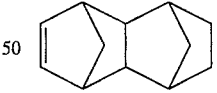 | Tetracyclo[4.4.0.1$^{2,5}$.1$^{7,10}$]-3-dodecene, |
| 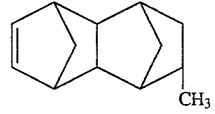 | 8-Methyltetracyclo [4.4.0.1$^{2,5}$.1$^{7,10}$]-3-dodecene |
| 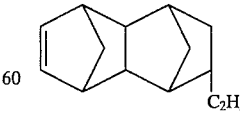 | 8-Ethyltetracyclo [4.4.0.1$^{2,5}$.1$^{7,10}$]-3-dodecene |
| 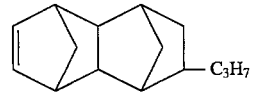 | 8-Propyltetracyclo [4.4.0.1$^{2,5}$.1$^{7,10}$]-3-dodecene |

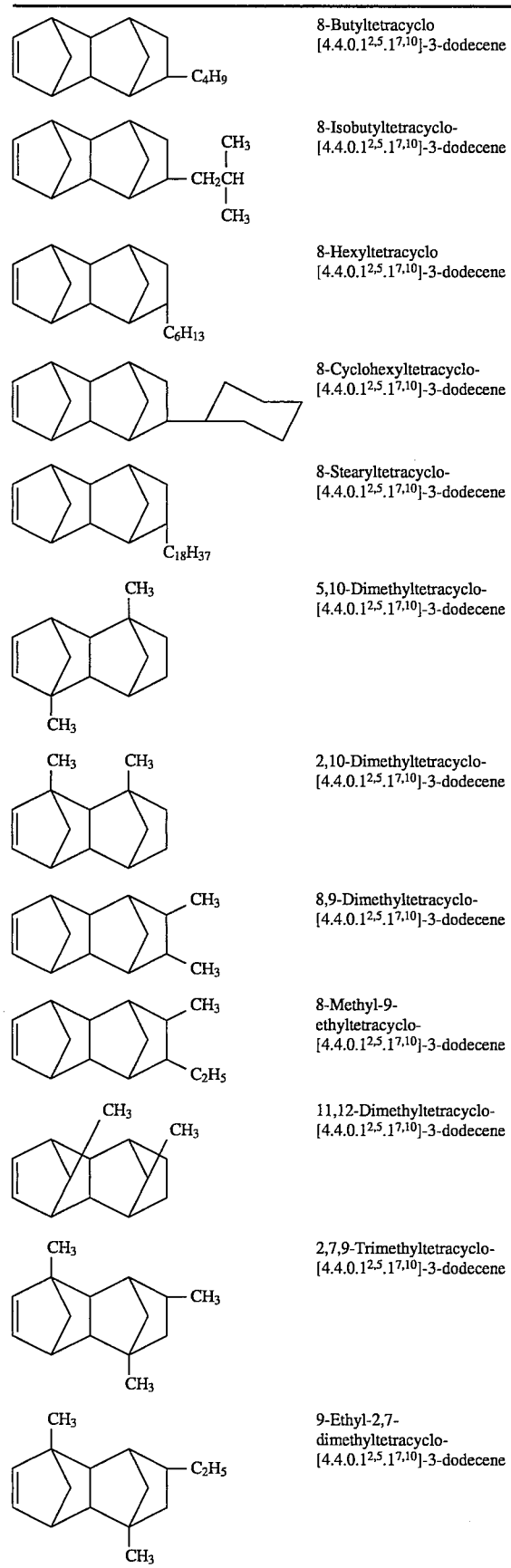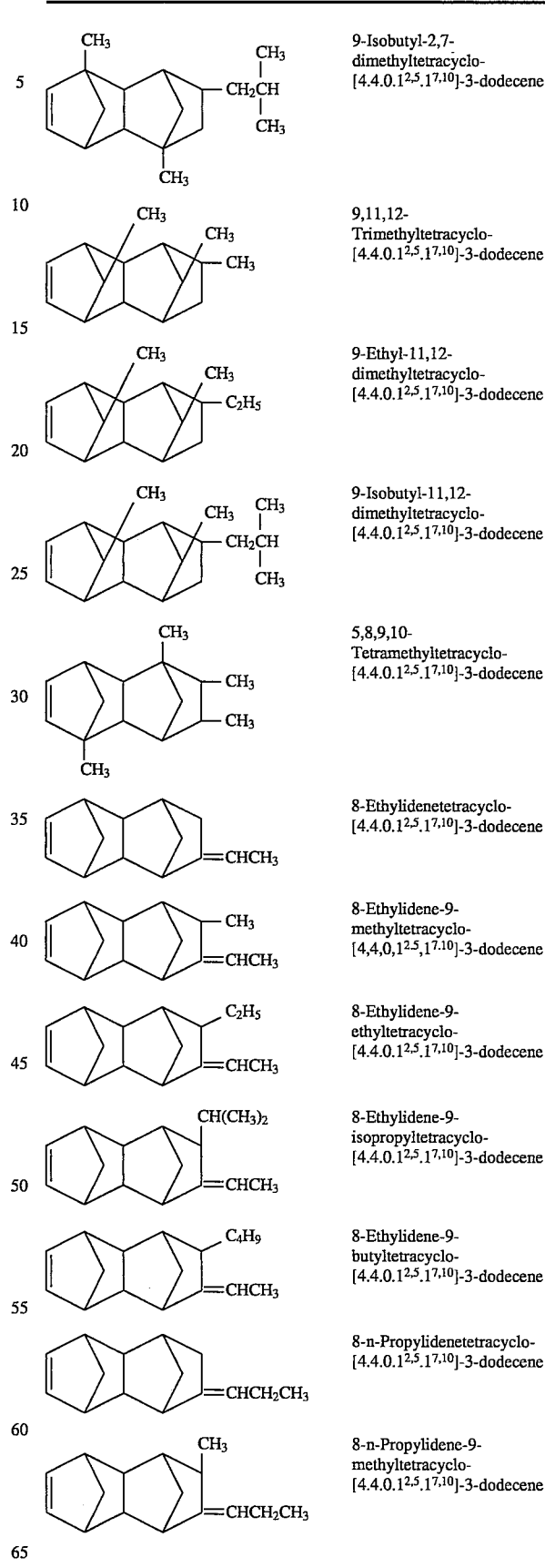

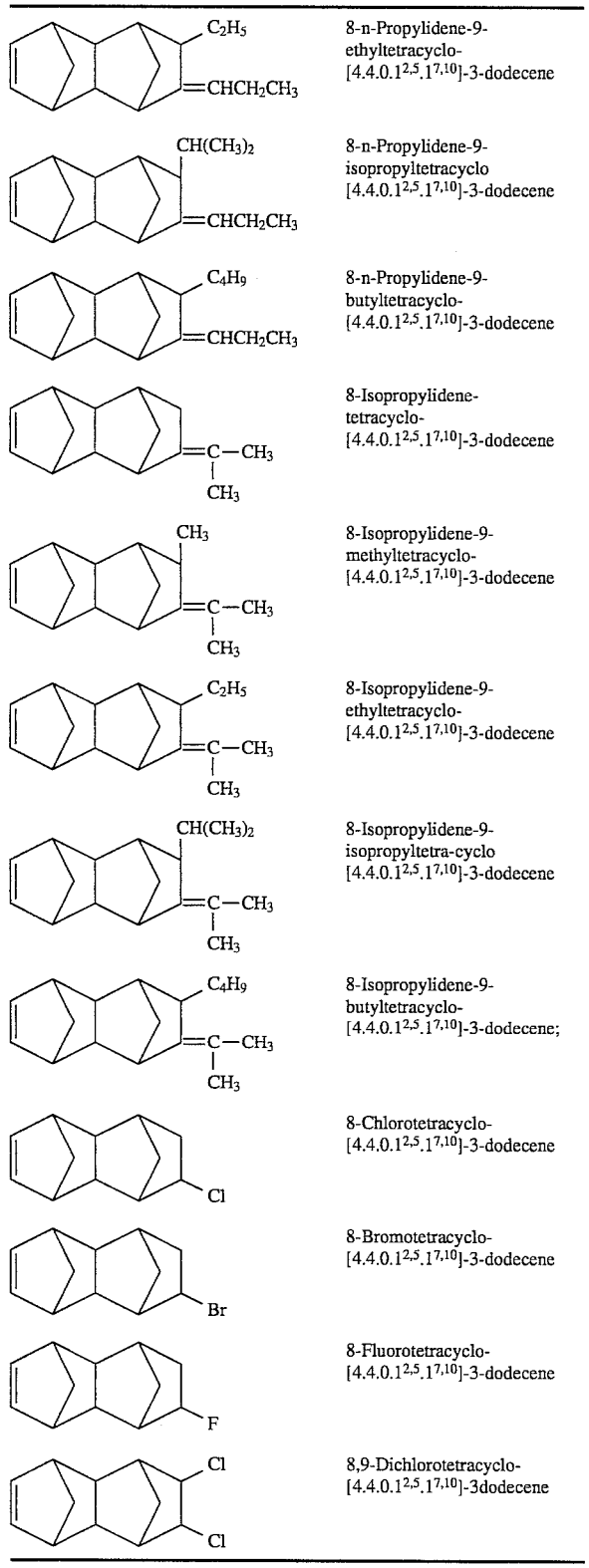
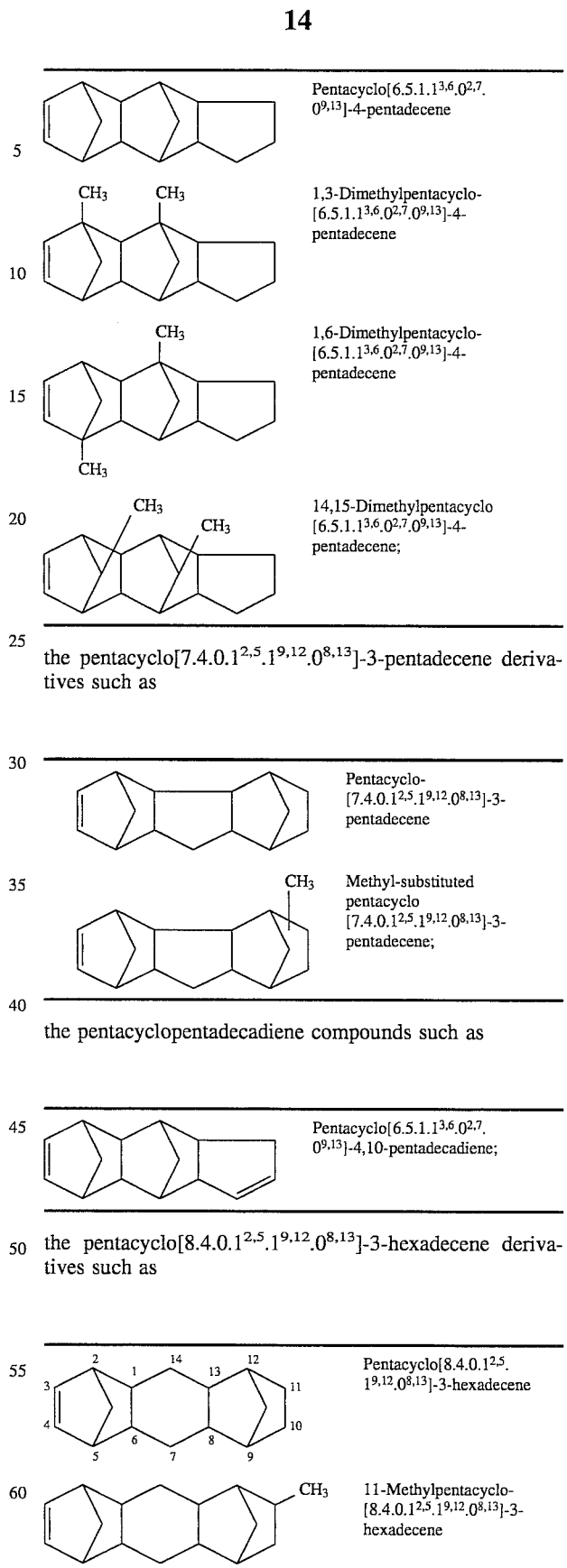
the pentacyclo[6.5.1.1³,⁶.0²,⁷.0⁹,¹³]-4-pentadecene derivatives such as
the pentacyclo[7.4.0.1²,⁵.1⁹,¹².0⁸,¹³]-3-pentadecene derivatives such as
the pentacyclopentadecadiene compounds such as
the pentacyclo[8.4.0.1²,⁵.1⁹,¹².0⁸,¹³]-3-hexadecene derivatives such as the pentacyclo[6.6.1.1$^{3,6}$.0$^{2,7}$.0$^{9,14}$]-4-hexadecene derivatives such as

| Structure | Name |
|---|---|
| | Pentacyclo,[6,6,1,1$^{3.6}$,0$^{2,7}$,0$^{9,14}$]-4-hexadecene |
| | 1,3-Dimethylpentacyclo-[6,6,1,1$^{3.6}$,0$^{2,7}$,0$^{9,14}$]-4-hexadecene |
| | 1,6-Dimethylpentacyclo-[6,6,1,1$^{3.6}$,0$^{2,7}$,0$^{9,14}$]-4-hexadecene |
| | 15,16-Dimethylpentacyclo-[6,6,1,1$^{3.6}$,0$^{2,7}$,0$^{9,14}$]-4-hexadecene; |
| | 11-Ethylpentacyclo-[8.4.0.1$^{2,5}$.1$^{9,12}$.0$^{8,13}$]-3-hexadecene |
| | 10,11-Dimethylpentacyclo-[8.4.0.1$^{2,5}$.1$^{9,12}$.0$^{8,13}$]-3-hexadecene; | the-hexacyclo[6.6.1.1$^{3,6}$.1$^{10,13}$.0$^{2,7}$.0$^{9,14}$]-4-heptadecene derivatives such as

| Structure | Name |
|---|---|
| | Hexacyclo-[6.6.1.1$^{3,6}$.1$^{10,13}$.0$^{2,7}$.0$^{9,14}$]-4-heptadecene |
| | 12-Methylhexacyclo-[6.6.1.1$^{3,6}$.1$^{10,13}$.0$^{2,7}$.0$^{9,14}$]-4-heptadecene |
| | 12-Ethylhexacyclo-[6.6.1.1$^{3,6}$.1$^{10,13}$.0$^{2,7}$.0$^{9,14}$]-4-heptadecene |
| | 12-Isobutylhexacyclo-[6.6.1.1$^{3,6}$.1$^{10,13}$.0$^{2,7}$.0$^{9,14}$]-4-heptadecene |
| | 1,6,10-Trimethyl-12-isobutylhexacyclo[6.6.1.1$^{3,6}$.1$^{10,13}$.0$^{2,7}$.0$^{9,14}$]-4-heptadecene; | the heptacyclo-5-eicosene derivatives such as

| Structure | Name |
|---|---|
| | Heptacyclo[8.7.0.1$^{2,9}$.1$^{4,7}$.1$^{11,17}$.0$^{3,8}$.0$^{12,16}$]-5-eicosene; | the heptacyclo[8.7.0.1$^{3,6}$.1$^{10,17}$.1$^{12,15}$.0$^{2,7}$.0$^{11,16}$]-4-eicosene derivatives such as

| Structure | Name |
|---|---|
| | Heptacyclo[8.7.0.1$^{3,6}$.1$^{10,17}$.1$^{12,15}$.0$^{2,7}$.0$^{11,16}$]-4-eicosene |
| | Demethyl-substituted heptacyclo-[8.7.0.1$^{3,6}$.1$^{10,17}$.1$^{12,15}$.0$^{2,7}$.0$^{11,16}$]-4-eicosene; | the heptacyclo-5-heneicosene derivatives such as

| Structure | Name |
|---|---|
| | Heptacyclo[8.8.0.1$^{2,9}$.1$^{4,7}$.1$^{11,18}$.0$^{3,8}$.0$^{12,17}$]-5-heneicosene |
| | Heptacyclo[8.8.0.1$^{4,7}$.1$^{11,18}$.1$^{13,16}$.0$^{3,8}$.0$^{12,17}$]-5-heneicosene |
| | 15-Methyl-heptacyclo[8.8.0.1$^{4,7}$.1$^{11,18}$.1$^{13,16}$.0$^{3,8}$.0$^{12,17}$]-5-heneicosene |
| | Trimethyl-substituted-heptacyclo[8.8.0.1$^{4,7}$.1$^{11,18}$.1$^{13,16}$.0$^{3,8}$.0$^{12,17}$]-5-heneicosene; | the octacyclo[8.8.0.1$^{2,9}$.1$^{4,7}$.1$^{11,18}$.1$^{13,16}$.0$^{3,8}$.0$^{12,17}$]-5-docosene derivatives such as

| Structure | Name |
|---|---|
| | Octacyclo-[8.8.0.1$^{2,9}$.1$^{4,7}$.1$^{11,18}$.1$^{13,16}$.0$^{3,8}$.0$^{12,17}$]-5-docosene |

-continued

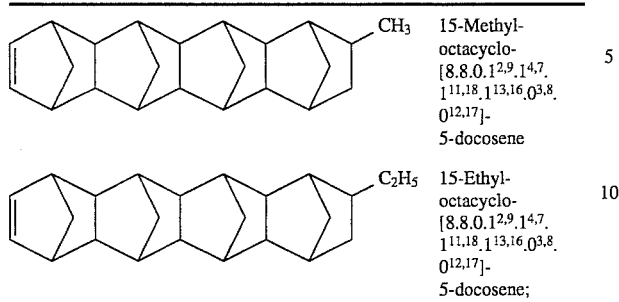

| | | |
|---|---|---|
| CH₃ | 15-Methyl-octacyclo-[8.8.0.1²,⁹.1⁴,⁷.1¹¹,¹⁸.1¹³,¹⁶.0³,⁸.0¹²,¹⁷]-5-docosene | |
| C₂H₅ | 15-Ethyl-octacyclo-[8.8.0.1²,⁹.1⁴,⁷.1¹¹,¹⁸.1¹³,¹⁶.0³,⁸.0¹²,¹⁷]-5-docosene; | | the nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene derivatives such as

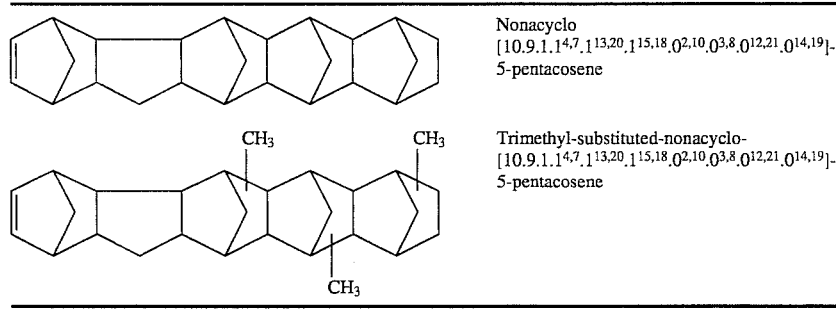

| | |
|---|---|
| | Nonacyclo[10.9.1.1$^{4,7}$.1$^{13,20}$.1$^{15,18}$.0$^{2,10}$.0$^{3,8}$.0$^{12,21}$.0$^{14,19}$]-5-pentacosene |
| | Trimethyl-substituted-nonacyclo-[10.9.1.1$^{4,7}$.1$^{13,20}$.1$^{15,18}$.0$^{2,10}$.0$^{3,8}$.0$^{12,21}$.0$^{14,19}$]-5-pentacosene | the nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivatives such as

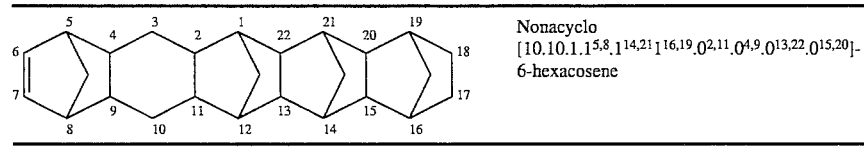

Nonacyclo[10.10.1.1$^{5,8}$.1$^{14,21}$1$^{16,19}$.0$^{2,11}$.0$^{4,9}$.0$^{13,22}$.0$^{15,20}$]-6-hexacosene and furthermore,

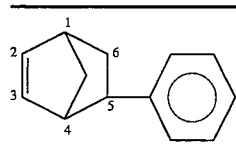 5-Phenyl-bicyclo[2.2.1]hept-2-ene
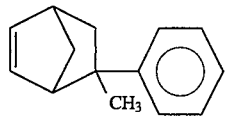 5-Methyl-5-phenyl-bicyclo[2.2.1]-hept-2-ene
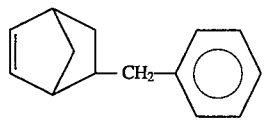 5-Benzyl-bicyclo[2.2.1]hept-2-ene
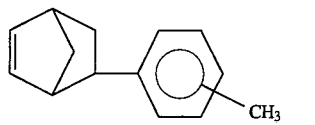 5-Tolyl-bicyclo[2.2.1]hept-2-ene
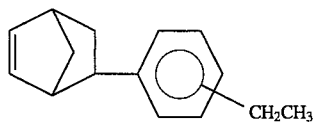 5-(Ethylphenyl)-bicyclo[2.2.1]hept-2-ene
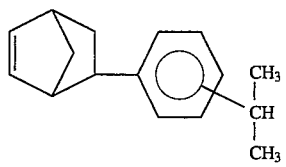 5-(Isopropylphenyl)-bicyclo[2.2.1]-hept-2-ene
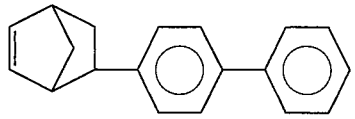 5-(Biphenyl)-bicyclo[2.2.1]hept-2-ene
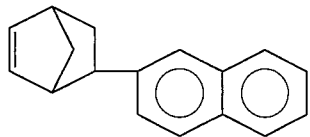 5-(β-Naphthyl)-bicyclo[2.2.1]hept-2-ene
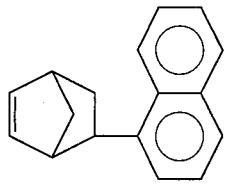 5-(α-Naphthyl)-bicyclo[2.2.1]hept-2-ene
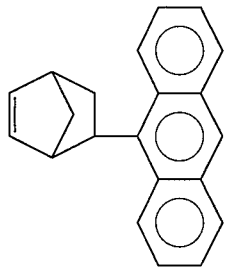 5-(Anthracenyl)-bicyclo[2.2.1]hept-2-ene -continued

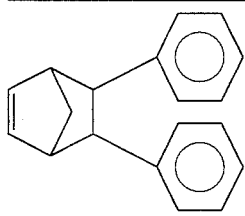
5,6-Diphenyl-bicyclo[2.2.1]hept-2-ene

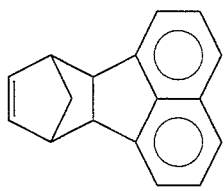
Cyclopentadiene-acenaphthylene adduct

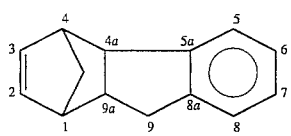
1,4-Methano-1,4,4a,9a-tetrahydrofluorene

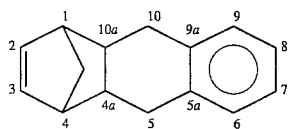
1,4-Methano-1,4,4a,5,10,10a-hexahydroanthracene

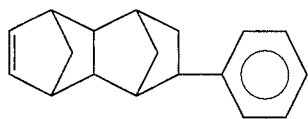
8-Phenyltetracyclo-
[4.4.0.1$^{2,5}$.1$^{7,10}$]-3-dodecene

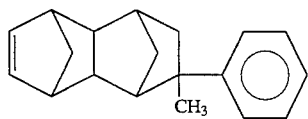
8-Methyl-8-phenyl-tetracyclo
[4.4.0.1$^{2,5}$.1$^{7,10}$]-3-dodecene

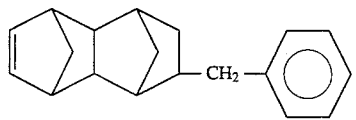
8-Benzyl-tetracyclo-
[4.4.0.1$^{2,5}$.1$^{7,10}$]-3-dodecene

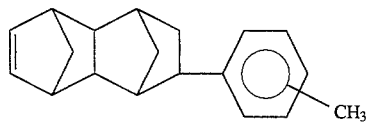
8-Tolyl-tetracyclo-
[4.4.0.1$^{2,5}$.1$^{7,10}$]-3-dodecene

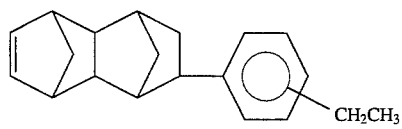
8-(Ethylphenyl)-tetracyclo-
[4.4.0.1$^{2,5}$.1$^{7,10}$]-3-dodecene

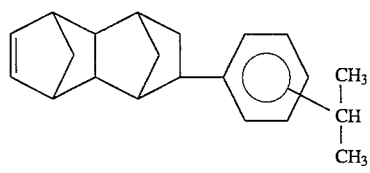
8-(Isopropylphenyl)
tetracyclo[4.4.0.1$^{2,5}$.1$^{7,10}$]-3-dodecene

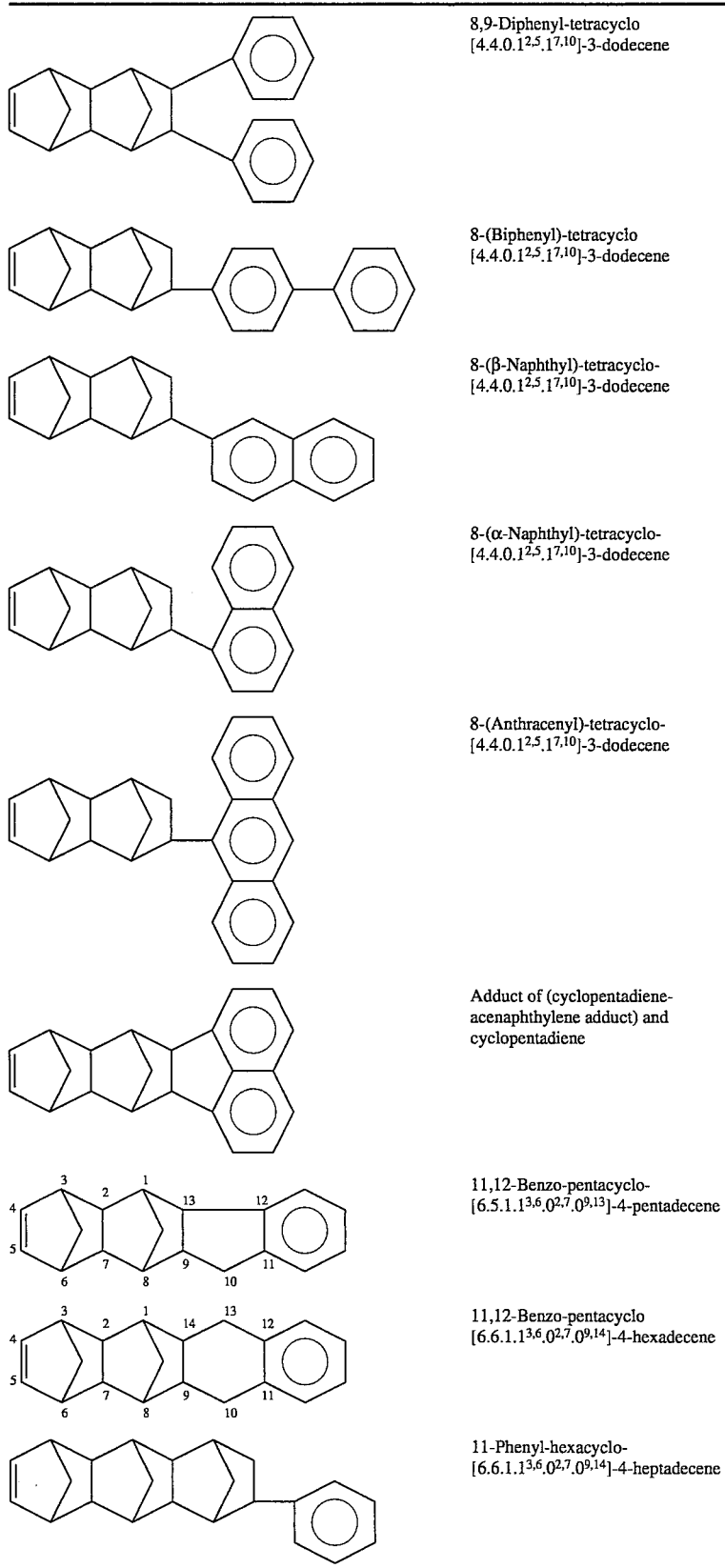

8,9-Diphenyl-tetracyclo
[4.4.0.1²,⁵.1⁷,¹⁰]-3-dodecene 8-(Biphenyl)-tetracyclo
[4.4.0.1²,⁵.1⁷,¹⁰]-3-dodecene 8-(β-Naphthyl)-tetracyclo-
[4.4.0.1²,⁵.1⁷,¹⁰]-3-dodecene 8-(α-Naphthyl)-tetracyclo-
[4.4.0.1²,⁵.1⁷,¹⁰]-3-dodecene 8-(Anthracenyl)-tetracyclo-
[4.4.0.1²,⁵.1⁷,¹⁰]-3-dodecene Adduct of (cyclopentadiene-
acenaphthylene adduct) and
cyclopentadiene 11,12-Benzo-pentacyclo-
[6.5.1.1³,⁶.0²,⁷.0⁹,¹³]-4-pentadecene 11,12-Benzo-pentacyclo
[6.6.1.1³,⁶.0²,⁷.0⁹,¹⁴]-4-hexadecene 11-Phenyl-hexacyclo-
[6.6.1.1³,⁶.0²,⁷.0⁹,¹⁴]-4-heptadecene

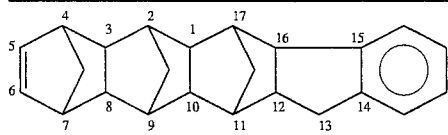

14,15-Benzo-heptacyclo-[8.7.0.1$^{2,9}$.1$^{4,7}$.1$^{11,17}$.0$^{3,8}$.0$^{12,16}$]-5-eicosene The cycloolefins of the formulas (I) and (II) may be prepared by Diels-Adler reaction of a cyclopentadiene with a corresponding olefin.

In the cycloolefin random copolymers, the cycloolefin of the formula (I) or (II) is considered to form repeating units represented by the following formula (I') or (II'):

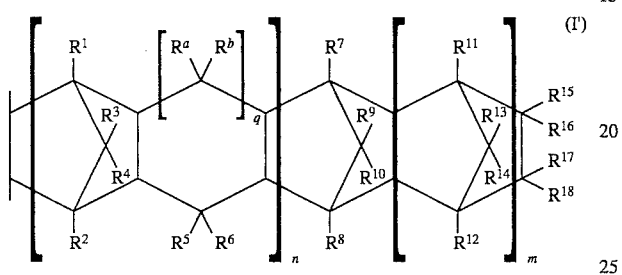

wherein m, n, q, $R^1$–$R^{18}$, $R^a$ and $R^b$ are each as defined in the formula (I); or

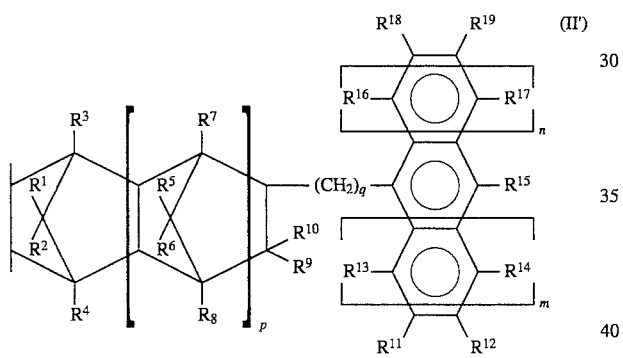

wherein m, n, p, q and $R^1$–$R^{19}$ are each as defined in the formula (II).

These cycloolefins may be used singly or in combination of two or more kinds.

As the diene (iii) which is, if necessary, used for preparing the cycloolefin random copolymer [A-1] and the cycloolefin random copolymer [B-1], non-conjugated dienes of 5 to 20 carbon atoms represented by the following formulas [III] to [VI] can be exemplified.

$$CH_2=CH-Y-CH=CH_2 \quad [III]$$

(Y is an alkylene group of 1 to 16 carbon atom)

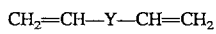 [IV]

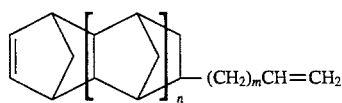

(n is 0, 1 or 2; m is an integer of 0–11)

 [V]

(n = 0, 1 or 2)

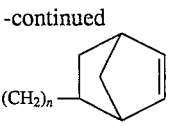 [VI]

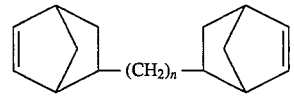

(n is an integer of 1–6)

Exemplified as the non-conjugated diene represented by the formula [III] may be 1,4-pentadiene, 1,5-hexadiene, 1,6-heptadiene, 1,7-octadiene, 1,8-nonadiene, 1,9-decadiene, 1,11-dodecadiene and 1,19-eicodiene.

Exemplified as the diene represented by the formula [IV] may be as in the following.

5-Vinyl-bicyclo[2.2.1]hept-2-ene (5-Vinyl-2-norbornene);

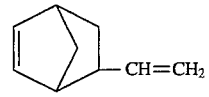

5-Alyl-bicyclo[2.2.1]hept-2-ene;

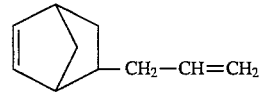

5-(3-Butenyl)-bicyclo[2.2.1]hept-2-ene;

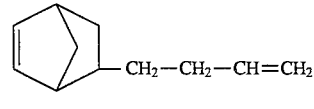

8-Vinyl-tetracyclo[4.4.0.1$^{2,5}$.1$^{7,10}$]-3-dodecene;

and

11-Vinyl-hexacyclo[6.6.1.1$^{3,6}$.1$^{10,13}$.0$^{2,7}$.0$^{9,14}$]-4-heptadecene;

Exemplified as the non-conjugated diene represented by the formula (V) may be as in the following.

Bicyclo[2.2.1]hept-2,5-diene (norbornadiene);

Tetracyclo[4.4.0.1$^{2,5}$.1$^{7,10}$]-3,8-dodecadiene;

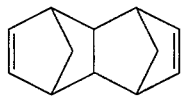

and

Hexacyclo[6.6.1.1$^{3,6}$.1$^{10,13}$.0$^{2,7}$.0$^{9,14}$]-4,11-heptadecadiene;

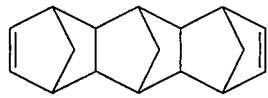

Exemplified as the non-conjugated diene represented by the formula (VI) are the compounds as listed below.

1,1-Bis(5-bicyclo[2.2.1]hepta-2-enyl)methane;

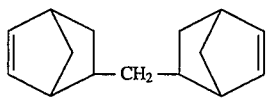

1,2-Bis(5-bicyclo[2.2.1]hepta-2-enyl)ethane;

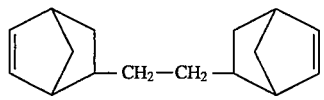

and 1,6-Bis(5-bicyclo[2.2.1]hepta-2-enyl)hexane;

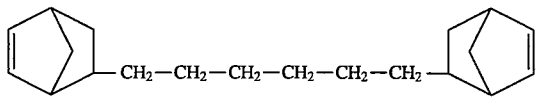

In the non-conjugated dienes, hydrogen atoms attached to carbon atoms other than those forming a carbon-carbon double bond may be substituted with hydrocarbon radicals.

Of the dienes represented by the above formulas [III] to [VI], 1,5-hexadiene, 1,7-octadiene, 1,9-decadiene, 5-vinylbicycylo[2.2.1]hepto-2-ene, 8-vinyltetracyclo[4.4.0.1$^{2,5}$.1$^{2,5}$.1$^{7,10}$]-3-dodecene, bicyclo[2.2.1]hepto-2,5-diene and tetracyclo[4.4.0.1$^{2,5}$.1$^{7,10}$]-3,8-dodecadiene are preferably used.

In addition to the non-conjugated dienes represented by the formulas (III), (IV), (V) and (VI), also employable as the diene (iii) in the invention are cyclic dienes, such as 5-ethylidene-2-norbornene, 5-methylene-2-norbornene and 5-isopropylidene-2-norbornene.

These dienes can also be used singly or in combination of two or more kinds.

The cycloolefin random copolymer [A-1] used for the invention can be prepared by copolymerizing the α-olefin of two or mora carbon atoms (i) and at least one cycloolefin (ii) represented by the aforesaid formula (I) or (II) and, if necessary, the diene (iii) in the presence of a catalyst (α) formed from a soluble vanadium compound and an organoaluminum compound (A), details of which will be described below, or in the presence of a catalyst (β) formed from a metallocene compound of a transition metal selected from Group IVB of the periodic table and lanthanoid, and an organoaluminum oxy-compound and if necessary an organoaluminum compound (B).

The soluble vanadium compounds forming the catalyst (α) may specifically be represented by the following formula.

VO(OR)$_a$V$_b$ or V(OR)$_c$X$_d$ where R is a hydrocarbon group, and a, b, c and d satisfy relations of $0 \leq a \leq 3$, $0 \leq b \leq 3$, $2 \leq a+b \leq 3$, $0 \leq c \leq 4$, $0 \leq d \leq 4$, and $3 \leq c+d \leq 4$.

Examples of the soluble vanadium compounds include
VOCl$_3$,
VO(OC$_2$H$_5$)Cl$_2$,
VO(OC$_2$H$_5$)2Cl,
VO(O-iso-C$_3$H$_7$)Cl$_2$,
VO(O-n-C$_4$H$_9$)Cl$_2$,
VO(OC$_2$H$_5$)$_3$, VOBr$_2$, VCl$_4$, VOCl$_2$,
VO(O-n-C$_4$H$_9$)$_3$ and
VOCl$_3$.2(OC$_8$H$_{17}$OH).

These compounds can be used singly or in combination of two or more kinds.

The above mentioned soluble vanadium compound can be used in the form of an electron donor addition product thereof obtained by bringing an electron donor into contact with the above-mentioned soluble vanadium compounds.

Such electron donors include, for example, oxygen containing electron donors, such as alcohols, phenols, ketones, aldehydes, carboxylic acids, organic acid halides, esters of organic or inorganic acids, ethers, diethers, acid amides, acid anhydrides and alkoxysilanes, and nitrogen containing electron donors, such as ammonia and ammonium salts, amines, nitriles, pyridines and isocyanates;

more specifically, alcohols having from 1 to 18 carbon atoms, such as methanol, ethanol, propanol, butanol, pentanol, hexanol, 2-ethylhexanol, octanol, dodecanol, octadecyl alcohol, oleyl alcohol, bnenzyl alcohol, phenylethyl alcohol, cumyl alcohol, isopropyl alcohol and isopropylbenzyl alcohol, halogenated alcohols having from 1 to 18 carbon atoms, such as trichloromethanol, trichloroethanol and trichlorohexanol, phenols having from 6 to 20 carbon atoms which may be substituted with a lower alkyl group, such as phenol, cresol, xylenol, ethylphenol, propylphenol, nonylphenol, cumylphenol and naphthol, ketones having from 3 to 15 carbon atoms, such as acetone, methylethyl ketone, methylisobutyl ketone, acetophenone, benzophenone and benzoquinone, aldehydes having from 2 to 15 carbon atoms, such as acetaldehyde, propionaldehyde, octylaldehyde, benzaldehyde, tolualdehyde and naphthaldehyde, organic acid esters having from 2 to 18 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarbonate, methyl benzoate, ethyl benzoate, propyl benzoate, butyl benzoate, octyl benzoate, cyclohexyl benzoate, phenyl benzoate, benzyl benzoate, methy toluylate, ethyl toluylate, amyl toluylate, ethyl ethylbenzoate, methyl anisate, ethyl anisate, ethoxy ethylbenzate, γ-butyrolactone, δ-valerolactone, cumarin, phthalide and ethyl carbonate, acid halides having from 2 to 15 carbon atoms, such as acetyl chloride, benzoyl chloride, toluic acid chloride and anisic acid chloride, ethers having from 2 to 20 carbon atoms, such as methyl ether, ethyl ether, isopropyl ether, butyl ether, amyl ether, tetrahydrofuran, anisole and diphenyl ether, acid anhydrides, such as acetic anhydride, phthalic anhydride and benzoic anhydride, alkoxysilanes, such as ethyl silicate and diphenyldimethoxysilane, acid amides, such as acetic N,N-dimethylamide, benzoic acid N,N-diethylamide and toluic acid N,N-dimethylamide, amines, such as trimethylamine, triethylamine, tributylamine, tribenzylamine and tetramethylethylenediamine, nitriles, such as acetonitrile and benzonitrile, trinitrile, and pyridines, such as pyridine, methylpyridine, ethylpyridine and dimethylpyridine.

In the preparation of the electron donor addition product of the soluble vanadium compound, the above-exemplified electron donors may be used singly or in combination of two or more kinds.

The organoaluminum compound (A) employable for the catalyst (α), which is used with the soluble vanadium compound, includes a compound containing at least one Al—C bond in the molecule. Examples of the organoaluminum compounds include the compounds represented by the following formulas (a) and (b).

$$R^1_m Al(OR^2)_n H_p X_q \quad (a)$$

wherein each of $R^1$ and $R^2$ is a hydrocarbon group having usually 1–15 carbon atoms, preferably 1–4 carbon atoms, and they may be the same or different from each other; X is a halogen atom; m, n, p and q are numbers satisfying the conditions of $0 \leq m \leq 3$, $0 \leq n \leq 3$, $0\text{-} \leq p \leq 3$, $0 \leq q \leq 3$, and $m+n+p+q=3$.

$$M^1 AlR^1_4 \quad (b)$$

wherein $M^1$ is Li, Na or K; and $R^1$ has the same meanings as defined above.

Specific examples of the organoaluminum compounds represented by the formula (a) include:

$$R^1_m Al(OR^2)_{3-m} \quad (a)$$

wherein $R^1$ and $R^2$ have the same meanings as defined in the formula (a), and m is preferably a number of $1.5 \leq m < 3$;

$$R^1_m AlX_{3-m} \quad (2)$$

wherein $R^1$ has the same meanings as defined in the formula (a), X is halogen, and m is preferably a number of $0 < m < 3$;

$$R^1_m AlH_{3-m} \quad (3)$$

wherein $R^1$ has the same meanings as defined in the formula (a), and m is preferably a number of $2 \leq m < 3$; and $$R^1_m Al(OR^2)_n X_q \quad (4)$$

wherein $R^1$ and $R^2$ have the same meanings as defined in the formula (a), X is halogen, and m, n and q are numbers satisfying the conditions of $0 < m \leq 3$, $0 \leq n < 3$, $0 \leq q < 3$, and $m+n+q=3$.

More specifically, as these organoaluminum compounds (A) of the formulas (1) to (4), the following compounds are mentioned.

The organoaluminum compounds of the formula (1) include:
trialkylaluminum such as triethylaluminum and tributylaluminum;
trialkenylaluminum such as triisopropenylaluminum;
dialkylaluminum alkoxide such as diethylaluminum ethoxide and dibutylaluminum butoxide; and
ethylaluminum sesquiethoxide, butylaluminum sesquibutoxide and partially alkoxylated alkylaluminum represented for example by the formula $R^1_{2.5}Al(OR^2)_{0.5}$ as an average composition.

The organoaluminum compounds of the formula (2) include:
dialkylaluminum halide such as diethylaluminum chloride, dibutylaluminum chloride and diethylaluminum bromide;
alkylaluminum sesquihalide such as ethylaluminum sesquichloride, butylaluminum sesquichloride and ethylaluminum sesquibromide; and
partially halogenated alkylaluminum such as ethylaluminum dichloride, propylaluminum dichloride and butylaluminum dichloride.

The organoaluminum compounds of the formula (3) include:
dialkylaluminum hydride such as diethylaluminum hydride and dibutylaluminum hydride; and
partially hydrogenated alkylaluminum such as ethylaluminum dihydride and propylaluminum dihydride.

The organoaluminum compounds of the formula (4) include:
partially alkoxylated and halogenated alkylaluminum such as ethylaluminum ethoxychloride, butylaluminum butoxychloride and ethylaluminum ethoxybromide.

Compounds similar to that represented by the formula (a), for example, an organoaluminum compound in which two or more aluminums are linked through oxygen atom nitrogen atom, may be used. Examples of such compounds include:

$$(C_2H_5)_2AlOAl(C_2H_5)_2,$$

$$(C_4H_9)_2AlOAl(C_4H_9)_2 \text{ and}$$

$$(C_2H_5)_2Al\underset{\underset{C_6H_5}{|}}{N}Al(C_2H_5)_2.$$

Further, the compounds belonging to the formula (b) include $LiAl(C_2H_5)_4$ and $LiAl(C_7H_{15})_4$.

Among the above-exemplified organoaluminum compounds, preferably used are alkylaluminum halide, alkylaluminum dihalide and mixtures thereof.

Next, the catalyst (β) formed from metallocene compound of a transition metal selected from Group IVB of the periodic table or lanthanoids, organoaluminum oxy-compound, and if neccessary, organoaluminum compound (B), which is used in the copolymerization is explained.

The metallocene compound of the transition metal selected from Group IVB of the periodic table and lanthanoids include the compounds represented by the following formula (VII).

$$ML_x \quad (VII)$$

In the formula (VII), M is a transition metal selected from Group IVB of the periodic table and lanthanoids, and specific examples of M include zirconium, titanium, hafnium, neodymium, samarium and ytterbium; L is a ligand coordinating to the transition metal, and at least one of the ligand L has a cyclopentadienyl skeleton; ligand L other than that having a cyclopentadienyl skeleton is a hydrocarbon group of 1–12 carbon atoms, an alkoxy group, an aryloxy group, a halogen atom, a trialkylsilyl group, $SO_3R$ group (wherein R is a hydrocarbon group of 1 to 8 of carbon atoms which may be a substituted, for example, with halogen) or a hydrogen atom; and x is a valence of the transition metal atom.

The ligands L having a cyclopentadienyl skeleton are, for example, cyclopentadienyl group, alkyl-substituted cyclopentadienyl groups such as methylcyclopentadienyl group, dimethylcyclopentadienyl group, trimethylcyclopentadienyl group, tetramethylcyclopentadienyl group, pentamethylcyclopentadienyl group, ethylcyclopentadienyl group, methylethylcyclopentadienyl group, propylcyclopentadienyl group, methylpropylcyclopentadienyl group, butylcyclopentadienyl group, methylbutylcyclopentadienyl group, hexylcyclopentadienyl group, or indenyl group, 4,5,6,7-tetrahydroindenyl group and fluorenyl group. These ligands may be substituted with a halogen atom or a trialkylsilyl group.

Among these ligands coordinating to the transition metal, alkyl-substituted cyclopentadienyl groups are particularly preferred.

When the compound of the above formula (VII) contains at least two cyclopentadienyl groups, the two cyclopentadienyl groups may be linked via an alkylene group such as ethylene group or propylene group, an alkylidene groups such as isopropylidene group, a susbtituted alkylene group such as diphenylmethyl group, silylene group, or a substituted silylene group such as dimethyl silylene group, diphenylsilylene group or methylphenylsilylene group.

The ligands L other than those having a cyclopentadienyl skeleton may include:
hydrocarbon group of 1–12 carbon atoms, specifically alkyl group such as methyl group, ethyl group, propyl group, isopropyl group and butyl group, cycloalkyl group such as cyclohexyl group, aryl group such as phenyl group and tolyl group, and aralkyl group such as neophyl group;
alkoxy group such as methoxy group, ethoxy group and butoxy group;
aryloxy group such as phenoxy group;
halogen atom such as fluorine, chlorine, bromine and iodine;
ligand of the formula SO$_3$R such as p-toluenesulfonate group, methanesulfonate group and trifluoromethanesulfonate group.

When the valence of the transition metal atom M in the formula (VII) is, for example, 4, the transition metal compound of the formula (VII) may be represented, more specifically, by the following formula (VII').

$$R^1{}_a R^2{}_b R^3{}_c R^4{}_d M \qquad (VII')$$

wherein M represents zirconium, titanium, hafnium, neodymium, samarium or ytterbium, $R^1$ represents a group having a cyclopentadienyl skeleton, $R^2$, $R^3$ and $R^4$ each represent a group having a cyclopentadienyl skeleton, alkyl group, cycloalkyl group, aryl group, aralkyl group, alkoxyl group, aryloxy group, halogen atom, trialkylsilyl group, SO$_3$R group or hydrogen atom, a is an integer of 1 or more, and a+b+c+d=4.

In the present invention, there is used preferably a transition metal compound having the above-mentioned formula (VII') in which at least one of $R^2$, $R^3$ and $R^4$ is the group having a cyclopentadienyl skeleton, for example, $R^1$ and $R^2$ are the groups having a cyclopentadienyl skeleton. The groups having a cyclopentadienyl skeleton may be linked through an alkylene group such as ethylene or propylene, an alkylidene group such as isopropylidene, a substituted alkylene group such as diphenylmethylene, silylene group or a substituted silylene group such as dimethylsilylene, diphenylsilylene or methylphenylsilylene.

Exemplified below are metallocene compounds of the transition metal wherein M is zirconium.
Bis(indenyl)zirconium dichloride,
Bis(indenyl)zirconium dibromide,
Bis(indenyl)zirconium bis(p-toluenesulfonate),
Bis(4,5,6,7-tetrahydroindenyl)zirconium dichloride,
Bis(fluorenyl)zirconium dichloride,
Ethylenebis(indenyl)zirconium dichloride,
Ethylenebis(indenyl)zirconium dibromide,
Ethylenebis(indenyl)dimethylzirconium,
Ethylenebis(indenyl)diphenylzirconium,
Ethylenebis(indenyl)methylzirconium monochloride,
Ethylenebis(indenyl)zirconium bis(methanesulfonate),
Ethylenebis(indenyl)zirconium bis(p-toluenesulfonate),
Ethylenebis(indenyl)zirconium bis(trifluoromethanesulfonate),
Ethylenebis(4,5,6,7-tetrahydroindenyl)zirconium dichloride,
Isopropylidene(cyclopentadienyl-fluorenyl)zirconium dichloride,
Isopropylidene(cyclopentadienyl-methylcyclopentadienyl)zirconium dichloride,
Isopropylidene(cyclopentadienyl-fluorenyl)dimethylzirconium,
Dimethylsilylenebis(cyclopentadienyl)zirconium dichloride,
Dimethylsilylenebis(methylcyclopentadienyl)zirconium dichloride,
Dimethylsilylenebis(dimethylcyclopentadienyl)zirconium dichloride,
Dimethylsilylenebis(trimethylcyclopentadienyl)zirconium dichloride,
Dimethylsilylenebis(indeny)zirconium dichloride,
Diemthylsilylenebis(indenyl)zirocnium bis(trifluoromethanesulfonate),
Dimethylsilylenebis(4,5,6,7-tetrahydroindenyl)zirconium dichloride,
Dimethylsilylenebis(cyclopentadienyl-fluorenyl)zirconium dichloride,
Diphenylsilylenebis(indenyl)zirconium dichloride,
Methlphenylsilylenebis(indenyl)zirconium dichloride,
Bis(cyclopentadienyl)zirconium dichloride,
Bis(cyclopentadienyl)zirconium dibromide,
Bis(cyclopentadienyl)methylzirconium monochloride,
Bis(cyclopentadienyl)ethylzirconium monochloride,
Bis(cyclopentadienyl)cyclohexylzirconium monochloride,
Bis(cyclopentadienyl)phenylzirconium monochloride,
Bis(cyclopentadienyl)benzylzirconium monochloride,
Bis(cyclopentadienyl)zirconium monochloride monohalide,
Bis(cyclopentadienyl)methylzirconium monohydride,
Bis(cyclopentadienyl)dimethylzirconium,
Bis(cyclopentadienyl)diphenylzirconium,
Bis(cyclopentadienyl)dibenzylzirconium,
Bis(cyclopentadienyl)zirconium methoxy chloride,
Bis(cyclopentadienyl)zirconium ethoxy chloride,
Bis(cyclopentadienyl)zirconium bis(methanesulfonate),
Bis(cyclopentadienyl)zirconium bis(p-toluenesulfonate),
Bis(methylcyclopentadienyl)zirconium dichloride,
Bis(dimethylcyclopentadienyl)zirconium dichloride,
Bis(dimethylcyclopentadienyl)zirconium ethoxy chloride,
Bis(dimethylcyclopentadienyl)zirconium bis(trifluoromethanesulfonate),
Bis(diemthylcyclopentadienyl)dimethylzirconium,
Bis(ethylcyclopentadienyl)zirconium dichloride,
Bis(methylethylcyclopentadienyl)zirconium dichloride,
Bis(propylcyclopentadienyl)zirconium dichloride,
Bis(methylpropylcyclopentadienyl)zirconium dichloride,
Bis(butylcyclopentadienyl)zirconium dichloride,
Bis(methylbutylcyclopentadienyl)zirconium bis(methanesulfonate),
Bis(trimethylcyclopentadienyl)zirconium dichloride,
Bis(tetramethylcyclopentadienyl)zirconium dichloride,
Bis(pentamethylcyclopentadienyl)zirconium dichloride,
Bis(hexylcyclopentadienyl)zirconium dichloride, and
Bis(trimethylsilylcyclopentadienyl)zirconium dichloride.

In the transition metal compounds exemplified above, the di-substituted cyclopentadienyl ring includes 1,2- and 1,3-substituted compounds, and the tri-substituted cyclopentadienyl ring includes 1,2,3- and 1,2,4-substituted compounds. Further, the alkyl group such as propyl or butyl includes, for example, n-, i-, sec-, tert-isomers.

In the present invention, other transition metal compounds in which the zirconium metal in the above-exemplified compounds is replaced by titanium metal, hafnium metal, neodymium metal, samarium metal or ytterbium metal can also be used.

The organoaluminum oxy-compound, which is used for forming the catalyst (β) together with the above metallocene compound of a transition metal selected from Group IVB of the periodic table or lanthanoids, may be a known aluminoxane, or may be a benzene-insoluble organoaluminum oxy-compound.

The known aluminoxane may be specifically represented by the following formula

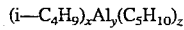

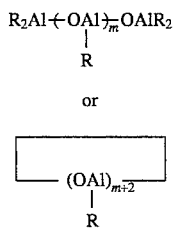

wherein R is a hydrocarbon group such as methyl group, ethyl group, propyl group or butyl group, preferably methyl group or ethyl group, particularly methyl group, and m is an integer of not less than 2, preferably an integer of 5 to 40.

In the above formulas, two or more of R may be different from each other, that is, the aluminoxane may comprise mixed alkyloxyaluminum units wherein two or more of (OAl(R)) differ from each other.

The known aluminoxane may be prepared, for example, by any one of the following processes, and is generally obtained in the form of a solution in an aromatic hydrocarbon medium.

(1) A process where an organoaluminum compound such as trialkylaluminum is added to a suspension of a compound containing adsorbed water, or a salt containing water of crystallization such as magnesium chloride hydrate, copper sulfate hydrate, aluminum sulfate hydrate, nickel sulfate hydrate or cerous chloride hydrate, in an aromatic hydrocarbon medium, to react them with each other, and the resulting aluminoxane is obtained in the form of a solution in the aromatic hydrocarbon medium;

(2) A process where water, ice or steam is acted directly on an organoaluminum compound such as trialkylaluminum in a medium such as benzene, toluene, ethyl ether or tetrahydrofuran, and the resulting aluminoxane is obtained in the form of a solution in the medium used; and (3) A process where an organoaluminum compound such as trialkylaluminum is reacted with an organotinoxide such as dimethyltinoxide and dibutyltinoxide in a solvent such as decane, benzene or toluene.

Of these processes, the process (1) is preferably used.

Specific examples of the organoaluminum compounds employable for preparing the solution of aluminoxane include:

trialkylaluminums such as trimethylaluminum, triethylaluminum, tripropylaluminum, triisopropylaluminum, tri-n-butylaluminum, triisobutylaluminum, tri-secbutylaluminum, tri-tert-butylaluminum, tripentylaluminum, trihexylaluminum, trioctylaluminum and tridecylaluminum;

tricycloalkylaluminums such as tricyclohexylaluminum and tricyclooctylaluminum;

dialkylaluminum halides such as dimethylaluminum chloride, diethylaluminum chloride, diethylaluminum bromide and diisobutylaluminum chloride;

dialkylaluminum hydrides such as diethylaluminum hydride and diisobutylaluminum hydride;

dialkylaluminum alkoxides such as dimethylaluminum methoxide and diethylaluminum ethoxide; and dialkylaluminum aryloxides such as diethylaluminum phenoxide.

Of these, trialkylaluminums are particularly preferred.

Also employable as the organoaluminum compound is isoprenylaluminum represented by the following formula:

$$(i\text{—}C_4H_9)_xAl_y(C_5H_{10})_z$$

wherein each of x, y and z is a positive integer, and $z \geq 2x$.

The above-exemplified organoaluminum compounds may be used singly or in combination.

The benzene-insoluble organoaluminum oxy-compound can be obtained, for example, by bringing a solution of aluminoxane into contact with water or an active hydrogen-containing compound or by bringing the above-mentioned organoaluminum compound into contact with water.

It is desirable to use the benzene-insoluble organoaluminum oxy-compound in which, as is analyzed by infrared spectrophotometry (IR), a ratio ($D_{1260}/D_{1220}$) of an absorbance ($D_{1260}$) at about 1260 cm$^{-1}$ to an absorbance ($D_{1220}$) at about 1220 cm$^{-1}$ is preferably not more than 0.09, more preferably not more than 0.08, particularly preferably in the range of 0.04 to 0.07.

The benzene-insoluble organoaluminum oxy-compound as mentioned above is presumed to have an alkyloxyaluminum unit represented by the following formula:

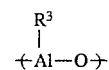

wherein $R^3$ is a hydrocarbon group of 1 to 12 carbon atoms. Specific examples of the hydrocarbon group include methyl group, ethyl group, n-propyl group, isopropyl group, n-butyl group, isobutyl group, pentyl group, hexyl group, octyl group, decyl group, cyclohexyl group and cyclooctyl group. Of these, preferred are methyl group and ethyl group, and particularly preferred is methyl group.

In addition to the alkyloxyaluminum unit represented by the above formula, the benzene-insoluble organoaluminum oxy-compound may contain an oxyaluminum unit represented by the following formula:

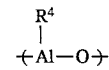

wherein $R^4$ is a hydrocarbon group of 1 to 12 carbon atoms, an alkoxy group of 1 to 12 carbon atoms, an aryloxy group of 6 to 20 carbon atoms, a hydroxyl group, halogen or hydrogen atom and is different from the group $R^3$ in the aforesaid formula.

In the case where the organoaluminum oxy-compound contains the oxyaluminum unit, it is desirable that the organoaluminum oxy-compound contains the alkyloxyaluminum unit in an amount of not less than 30% by mol, preferably not less than 50% by mol, more preferably not less than 70% by mol.

By the term 'benzene-insoluble' organoaluminum oxy-compound is meant that the compound is insoluble or slightly soluble in benzene; the amount of Al component dissolving in benzene at 60° C. is generally not more than 10%, preferably not more than 5% and particularly preferably not more than 2%, in terms of Al atom.

The organoaluminum oxy-compound used in the invention may contain an organic compound component of other metals than aluminum in a small amount.

As the organoaluminum compound (B) optionally used for preparing the catalyst (β), there can be mentioned, for example, an organoaluminum compound represented by the following formula (VIII).

$$R^5{}_nAlX_{3-n} \quad \text{(VIII)}$$

wherein $R^5$ is a hydrocarbon group of 1–12 carbon atoms, X is halogen atom or hydrogen atom, and n is 1–3.

In the formula (VIII), $R^5$ is hydrocarbon group of 1–12 carbon atoms, such as, alkyl group, cycloalkyl group or aryl group, including specifically methyl group, ethyl group, n-propyl group, isopropyl group, isobutyl group, pentyl group, hexyl group, octyl group, cyclopentyl group, cyclohexyl group, phenyl group, tolyl group, etc.

The organoaluminum compounds (B) include, in particular, compounds as mentioned below.

Trialkylaluminum such as trimethylaluminum, triethylaluminum, triisopropylaluminum, triisobutylaluminum, trioctylaluminum, tri-2-ethylhexylaluminum, etc;
alkenylaluminum such as isoprenylaluminum, etc;
dialkylaluminum halides such as dimethylaluminum chloride, diethylaluminum chloride, diisopropylaluminum chloride, diisobutylaluminum chloride, dimethylaluminum bromide, etc;
alkylaluminum sesquihalides such as methylaluminum sesquichloride, ethylaluminum sesquichloride, isopropylaluminum sesquichloride, butylaluminum sesquichloride, ethylaluminum sesquibromide, etc;
alkylaluminum dihalides such as methylaluminum dichloride, ethylaluminum dichloride, isopropylaluminum dichloride, ethylaluminum dibromide, etc, and
alkylaluminum hydride such as diethylaluminum hydride and diisobutylaluminum hydride.

As the organoaluminum compounds (B), there may also be used a compound represented by the following formula (IX):

$$R^5{}_nAlY_{3-n} \quad \text{(IX)}$$

wherein $R^5$ is as defined above, Y is —$OR^6$ group, —$OSiR^7{}_3$ group, —$OAlR^8{}_2$ group, —$NR^9{}_2$ group, —$SiR^{10}{}_3$ group, or —$N(R^{11})AlR^{12}{}_2$ group, n is 1–2 and $R^6$, $R^7$, $R^8$ and $R^{12}$ are each methyl group, ethyl group, isopropyl group, isobutyl group, cyclohexyl group, phenyl group, trimethylsilyl group, etc; $R^9$ is hydrogen atom, methyl group, ethyl group, isopropyl group, phenyl group, trimethylsilyl group, etc; and $R^{10}$ and $R^{11}$ are each methyl group, ethyl group, etc.

The organoaluminum compounds of the formula (IX) include, in particular, such compounds as mentioned below.

(i) Compounds of the formula $R^5{}_nAl(OR^6)_{3-n}$ such as
   dimethylaluminum methoxide,
   diethylaluminum ethoxide,
   diisobutylaluminum methoxide, etc;
(ii) Compounds of the formula $R^5{}_nAl(OSiR^7{}_3)_{3-n}$ such as
   $Et_2Al(OSiMe_3)$,
   $(iso\text{-}Bu)_2Al(OSiMe_3)$,
   $(iso\text{-}Bu)_2Al(OSiEt_3)$, etc;
(iii) Compounds of the formula $R^5{}_nAl(OAlR^8{}_2)_{O3-n}$ such as
   $Et_2AlOAlEt_2$,
   $(iso\text{-}Bu)_2AlOAl(iso\text{-}Bu)_2$, etc;
(iv) Compounds of the formula $R^5{}_nAl(NR^9{}_2)_{3-n}$ such as
   $Me_2AlNEt_2$,
   $Et_2AlNHMe$,
   $Me_2AlNHEt$,
   $Et_2AlN(SiMe_3)_2$,
   $(iso\text{-}Bu)_2AlN(SiMe_3)_2$, etc;
(v) Compounds of the formula $R^5{}_nAl(SiR^{10}{}_3)_{3-n}$ such as
   $(iso\text{-}Bu)_2AlSiMe_3$, etc; and
(vi) Compounds of the formula

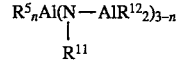

such as

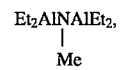

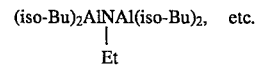

Among the organoaluminum compounds represented by the above formulas (VIII) and (IX), preferred are $R^5{}_3Al$, $R^5{}_nAl(OR^6)_{3-n}$ and $R^5{}_nAl(OAlR^8{}_2)_{3-n}$. Particularly preferred are compounds in which $R^5$ is isoalkyl group, and n is 2. These organoaluminum compounds may also be used in combination of two or more kinds.

The ring-opening polymer [A-2] of a cycloolefin and the ring-opening polymer [B-2] of a cycloolefin both used for the invention are each a ring-opening polymer of at least one cycloolefin represented by the aforesaid formula (I) or (II).

Such ring-opening polymer of a cycloolefin can be prepared by ring-opening polymerizing the cycloolefin of the formula (I) or (II) alone or in combination in the presence of a ring-opening polymerization catalyst.

Examples of the ring-opening polymerization catalyst used herein include catalysts formed from halides of metals such as ruthenium, rhodium, osmium, iridium, platinum, molybdenum and tungsten, nitrates of these metals, or acetylacetone compounds of these metals, and reducing agents such as alcohols and tin compounds; and catalysts formed from halides of metals such as titanium, vanadium, zirconium, tungsten and molybdenum, or acetylacetone compounds of these metals, and metallic aluminum compounds.

In the preparation of the ring-opening polymer, other cycloolefin than that of the above formula (I) or (II) may be used in combination. Examples of other cycloolefin include monocycloolefins of 4 or more carbon atoms, such as cyclobutene, cyclopentene, cyclooctene, cyclononene, methylcyclopentene, methylcycloheptene, methylcyclooctene, methylcyclononene, methylcyclodecene, ethylcyclopentene, ethylcycloheptene, ethylcyclooctene, ethylcyclononene, dimethylcycloheptene, dimethylcyclooctene, dimethylcyclononene, dimethylcyclodecene, cyclooctadiene and cyclodecadiene; 2,3,3a,7a-tetrahydro-4,7-methano-1H-indene; and 3a,5,6,7a-tetrahydro-4,7-methano-1H-indene.

Further, alkenes, such as propylene, 1-butene, 1-pentene and 1-hexene, can be added as chain transfer agents for molecular weight control.

In the ring-opening polymer, at least a part of the cycloolefin represented by the aforesaid formula (I) is assumed to have a structure represented by the following formula (I-a), and at least a part of the cycloolefin represented by the aforesaid formula (II) is assumed to have a structure represented by the following formula (II-a).

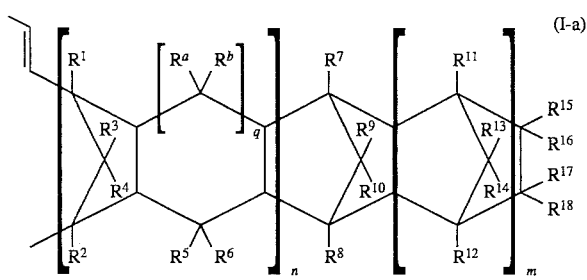

wherein m, n, q, $q^1$-$R^{18}$, $R^a$ $R^b$ have the same meaning as defined in the aforementioned formula (I); and

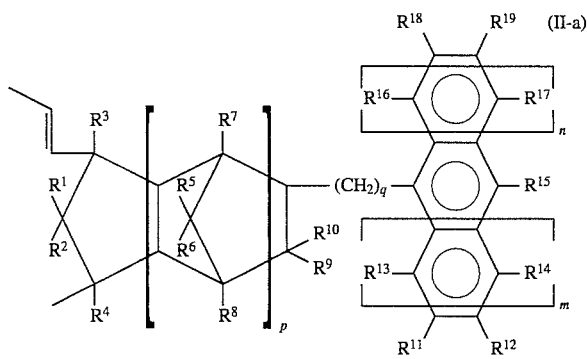

wherein m, n, q, $q^1$-$R^{19}$, $R^a$ and $R^b$ have the same meanings as defined in the aforementioned formula (II).

The hydrogenation product [A-3] of a ring-opening polymer of a cycloolefin and the hydrogenation product [B-3] of a ring-opening polymer of a cycloolefin both used for the invention are each a hydrogenation product of a ring-opening polymer of at least one cycloolefin represented by the aforesaid formula (I) or (II).

Such hydrogenation product of a ring-opening polymer of the cycloolefin can be obtained by hydrogenating the cycloolefin ring-opening polymer as prepared above. For hydrogenating the ring-opening polymer, a conventional hydroganation process which is carried out in the presence of a hydrogenation catalyst can be adopted.

As the hydrogenation catalyst, heterogeneous catalysts or homogeneous catalysts, both of which are conventionally used for the hydrogenation of olefin compounds, can be employed. Particular examples of the heterogeneous catalysts include metals such as nickel, palladium and platinum; and solid catalysts comprising these metals supported on carriers such as carbon, silica, diatomaceous earth, alumina and titanium oxide (e.g., nickel/silica, nickel/diatomaceous earth, palladium/carbon, palladium/silica, palladium/diatomaceous earth, palladium/alumina). The homogeneous catalysts are, for example, those based on metals of Group VIII of the periodic table as substrates. Examples of such catalysts include those formed from nickel compounds or cobalt compounds and organometallic compounds of Groups I to III metals of the periodic table, such as cobalt naphthenate/ triethylaluminum, cobalt octenate/n-butyl lithium and nickel acetylacetonate/triethylaluminum. Also employable are Rh compounds.

The hydrogenation reaction using the above-described hydrogenation catalyst can be carried out either in a heterogeneous reaction system or in a homogeneous reaction system according to the kind of the catalyst used. The reaction in such system may be conducted in a hydrogen atmosphere at a pressure of usually 1 to 150 atm and a temperature of usually 0° to 180° C., preferably 20° to 100° C. The hydrogenation rate can be adjusted by appropriately determining the reaction conditions such as hydrogen pressure, reaction temperature, reaction time and catalyst concentration. In general, however, the reaction conditions are selected in such a manner that the double bonds present in the main chain of the polymer is hydrogenated in an amount of usually not less than 50%, preferably not less than 80%, more preferably not less than 90%, based on the whole amount of the double bonds.

In the hydrogenated cyclic polymer, at least a part of the cycloolefin of the formula (I) is assumed to have a structure represented by the following formula (I-b), and at least a part of the cycloolefin of the formula (II) is assumed to have a structure represented by the following formula (II-b).

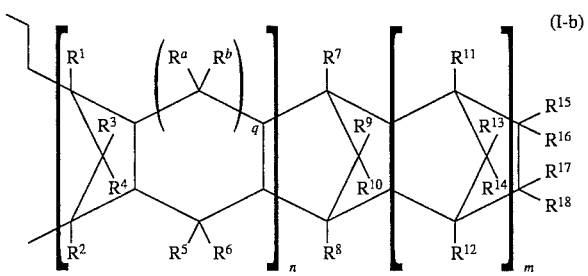

wherein m, n, q, $q^1$-$R^{18}$, $R^a$ and $R^b$ have the same meanings as defined in the aforementioned formula (I); and

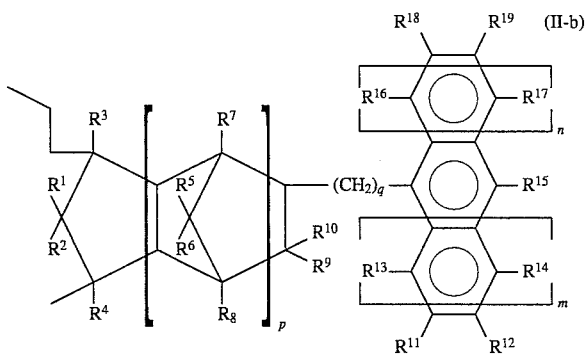

wherein m, n, q, $q^1$-$R^{19}$, $R^a$ and $R^b$ have the same meanings as defined in the aforementioned formula (II).

Now, the cycloolefin polymer [A] and the cycloolefin polymer [B] for forming the cycloolefin polymer composition of the invention are described below in more detail.

The cycloolefin polymer [A] for forming the cycloolefin polymer composition of the invention is a cycloolefin polymer selected from the group consisting of A-1] the cycloolefin random copolymer, [A-2] the ring-opening polymer of a cycloolefin and [A-3] the hydrogenation product of a ring-opening polymer of a cycloolefin, and the cycloolefin polymer [B] is a cycloolefin polymer selected from the group consisting of [B-1] the cycloolefin random copolymer, [B-2] the ring-opening polymer of a cycloolefin and [B-3] the hydrogenation product of a ring-opening polymer of a cycloolefin, as described above.

In the cycloolefin random copolymer [A-1], it is desired that the recurring units derived from the α-olefin component are contained in an amount of usually 60 to 97% by mol, preferably 70 to 95% by mol; and the recurring units derived from the cycloolefin of the formula (I) or (II) are contained in an amount of usually 3 to 40% by mol, preferably 5 to 30% by mol. The diene compound is desirably exist therein in an amount of not more than 10% by mol.

The intrinsic viscosity [η] of the copolymer [A-1], as measured in decalin at 135° C., is in the range of usually 0.5 to 5.0 dl/g, preferably 0.15 to 4.5 dl/g.

The glass transition temperature (Tg) of the copolymer [A-1], as measured by DSC, is usually lower than 15° C., preferably in the range of −30° to 15° C.

The refractive index $n_D(A)$ of the copolymer [A-1], as measured at 25° C., is in the range of usually 1.500 to 1.650, preferably 1.510 to 1.600.

In the invention, the refractive index is a value measured at 25° C. by the use of Abbe's refractometer (D-lines, 589 nm).

The iodine value of the copolymer [A-1] is desirably not more than 30 (g-iodine/100 g-polymer).

The intrinsic viscosity [η] of the ring-opening copolymer [A-2] and the intrinsic viscosity [η] of the hydrogenation product [A-3], as measured in decalin at 135° C., are each in the range of usually 0.5 to 5.0 dl/g, preferably 0.15 to 4.5 dl/g.

The glass transition temperature (Tg) of the ring-opening copolymer [A-2] and that of the hydrogenation product [A-3], as measured by DSC, are each usually lower than 15° C., preferably in the range of −30° to 15° C.

The refractive index $n_D(A)$ of the ring-opening copolymer [A-2] and that of the hydrogenation product [A-3], as measured at 25° C., are each in the range of usually 1.500 to 1.650, preferably 1.510 to 1.600.

The iodine value of the ring-opening copolymer [A-2] and that of the hydrogenation product [A-3] are each desirably not more than 30 (g-iodine/100 g-polymer).

In the cycloolefin random copolymer [B-1], it is desired that the recurring units derived from the α-olefin component are contained in an amount of usually 40 to 85% by mol, preferably 42 to 80% by mol; and the recurring units derived from the cycloolefin of the formula (I) or (II) are contained fin an amount of usually 15 to 60% by mol, preferably 20 to 58% by mol. The diene compound is desirably contained therein in an amount of not more than 10% by mol.

The intrinsic viscosity [η] of the copolymer [B-1], as measured in decalin at 135° C., is in the range of usually 0.1 to 5.0 dl/g, preferably 0.15 to 4.5 dl/g.

The glass transition temperature (Tg) of the copolymer B-1], as measured by DSC, is usually not lower than 70° C., preferably in the range of 90° to 200° C.

The refractive index $n_D(B)$ of the copolymer [B-1], as measured at 25° C., is in the range of usually 1.500 to 1.650, preferably 1.510 to 1.600.

The iodine value of the copolymer [B-1] is desirably not more than 30 (g-iodine/100 g-polymer).

The intrinsic viscosity [η] of the ring-opening copolymer [B-2] and the intrinsic viscosity [η] of the hydrogenation product [B-3], as measured in decalin at 135° C., are each in the range of usually 0.1 to 5.0 dl/g, preferably 0.15 to 4.5 dl/g.

The glass transition temperature (Tg) of the ring-opening copolymer [B-2] and that of the hydrogenation product [B-3], as measured by DSC, are each usually not lower than 70° C., preferably in the range of 90° to 200° C.

The refractive index $n_D(B)$ of the ring-opening copolymer [B-2] and that of the hydrogenation product [B-3], as measured at 25° C., are each in the range of usually 1.500 to 1.650, preferably 1.510 to 1.600.

The iodine value of the ring-opening copolymer [B-2] and that of the hydrogenation product [B-3] are each desirably not more than 30 (g-iodine/100 g-polymer).

The cycloolefin polymer composition of the invention comprises the cycloolefin polymer [A] and the cycloolefin polymer [B], and a difference $\Delta n_D$ between the refractive index $n_D(A)$ of the cycloolefin polymer [A] and the refractive index $n_D(B)$ of the cycloolefin polymer [B], namely, $|n_D(A)-n_D(B)|$, is not more than 0.015, preferably not more than 0.012, more preferably not more than 0.010.

When the difference $\Delta n_D$ between the refractive index $n_D(A)$ of the cycloolefin polymer [A] and the refractive index $n_D(B)$ of the cycloolefin polymer [B], that is, $|n_D(A)-n_D(B)|$, exceeds 0.015, the resultant composition may be sometimes deteriorated in the transparency.

Further, in the cycloolefin polymer composition of the invention, a ratio of the cycloolefin polymer [A] to the cycloolefin polymer [B] ([A]/[B], by weight) is in the range of usually 8/92 to 40/60 (the total of [A] and [B] is 100), preferably 10/90 to 40/60.

The cycloolefin polymer composition as described above can be prepared, for example, by the following processes.

(1) A process where the cycloolefin polymer [A] and the cycloolefin polymer [B], both being separately prepared, are mechanically blended by the use of an extruder, a kneader, etc.

(2) A process where the cycloolefin polymer [A] and the cycloolefin polymer [B], both being separately prepared, are dissolved in a suitable solvent (e.g., saturated hydrocarbons such as heptane, hexane, decane and cyclohexane; and aromatic hydrocarbons such as toluene, benzene and xylene) to blend them (solution blending process).

(3) A multi-stage polymerization process where the cycloolefin polymer [A] and the cycloolefin polymer [B] are separately synthesized in a series of polymerization reactors.

The cycloolefin polymer composition thus obtained has a high transparency and is well-balanced among the transparency, the heat resistance and the impact strength, since the difference in the refractive index between the cycloolefin polymer [A] and the cycloolefin polymer [B] is small.

The cycloolefin polymer composition of the invention may be a radical reaction product of the cycloolefin polymer [A] and the cycloolefin polymer [B] in the presence of an organic peroxide and if necessary, a radical polymerizable polyfunctional monomer.

The radical reaction product may be prepared by radically reacting the cycloolefin polymer [A] and the cycloolefin polymer [B] in the presence of an organic peroxide and if necessary, a radical polymerizable polyfunctional monomer.

Examples of the organic peroxide used herein include:

ketone peroxides, such as methyl ethyl ketone peroxide and cyclohexanone peroxide;

peroxy ketals, such as 1, 1-bis(tert-butylperoxy)cyclohexane and 2,2-bis(tert-butylperoxy)octane;

hydroperoxides, such as tert-butyl hydroperoxide, cumene hydroperoxide, 2,5-dimethylhexane-2,5-dihydroxyperoxide and 1,1,3,3-tetramethylbutyl hydroperoxide;

dialkyl peroxides, such as di-tert-butyl peroxide, 2,5-dimethyl-2,5-di(tert-butylperoxy)hexane and 2,5-diethyl-2,5-di(tert-butylperoxy)hexyne-3;

diacylperoxides, such as lauroyl peroxide and benzoyl peroxide; and peroxy esters, such as tert-butyl peroxyacetate, tertbutyl peroxybenzoate and 2,5-dimethyl-2,5-di(benzoylperoxy)hexane.

Examples of the radical polymerizable polyfunctional monomer, which is used if necessary, include divinylbenzene, vinyl acrylate, vinyl methacrylate, triallyl isocyanurate, diallyl phthalate, ethylene glycol dimethacrylate and trimethylolpropane trimethacrylate.

In the preparation of the composition of the invention, the radical reaction of the cycloolefin polymer [A] with the cycloolefin polymer [B] in the presence of the peroxide and if necessary, the radical polymerizable polyfunctional monomer, may be prepared carried out in one reactor. Otherwise, the composition of the present invention may be prepared by the use of two or more than two reactors, wherein, for example, the cycloolefin polymer [A] and the cycloolefin polymer [B] are radically reacted in separate two or more reactors under different conditions, respectively, and each of the reaction mixtures is blended together to obtain the composition of the present invention.

In the radical reaction, the amount of the organic peroxide used is in the range of usually 0.01 to 10 parts by weight, preferably 0.05 to 5 parts by weight, based on 100 parts by weight of the total amounts of the cycloolefin polymer [A] and the cycloolefin polymer [B]; and the amount of the radical polymerizable polyfunctional monomer optionally used is in the range of usually 0.01 to 15 parts by weight, preferably 0.1 to 10 parts by weight, based on 100 parts by weight of the total amounts of the cycloolefin polymer [A] and the cycloolefin polymer [B].

The radical reaction of the cycloolefin polymer [A] with the cycloolefin polymer [B] is desirably conducted at a temperature not lower than the decomposition temperature of the organic peroxide. The reaction can be carried out by mixing all the starting materials together, but it is preferred that the cycloolefin polymer [A] is first mixed with the cycloolefin polymer [B] to prepare a mixture to which the organic peroxide and, if necessary, the radical polymerizable polyfunctional monomer are then added to react [A] and [B] with each other. The organic peroxide is preferably added after the cycloolefin polymer [A] is sufficiently mixed with the cycloolefin polymer [B].

Blending of the cycloolefin polymer [A] with the cycloolefin polymer [B] can be carried out by various methods, for example, by mechanically blending the cycloolefin polymer [A] and the cycloolefin polymer [B] both having been separately prepared, in an extruder or the like, by sufficiently dissolving the cycloolefin polymer [A] and the cycloolefin polymer [B] in a suitable solvent (e.g., saturated hydrocarbons such as heptane, hexane, decane and cyclohexane; and aromatic hydrocarbons such as toluene, benzene and xylene) to blend them (solution blending method), and by separately synthesizing the cycloolefin polymer [A] and the cycloolefin polymer [B] in different polymerization reactors and blending the resulting polymers in a container.

To the mixture of the cycloolefin polymer [A] and the cycloolefin polymer [B] thus obtained, the organic peroxide and if necessary, the radical polymerizable polyfunctional monomer are added, and they are blended to react [A] and [B] at a temperature not lower than the decomposition temperature of the organic peroxide.

The radical reaction may be carried out in a state where the mixture of the starting materials is molten, namely, in the molten state, or may be carried out in a state where the starting materials are dissolved in a solvent, namely, in the solution state.

For conducting the radical reaction in the molten state, the mixture of the starting materials can be mixed, melted and reacted using a kneading apparatus such as a mixing roll, a Banbury mixer, an extruder, a kneader or a continuous mixer. This radical reaction is desirably carried out at a temperature not lower than the temperature at which a half-life period of the organic peroixde corresponds to 1 minute, usually 15° to 300° C., preferably 170° to 270° C., and for a reaction time of usually 10 sec to 30 min, preferably 3 to 10 min.

As the solvent used for the radical reaction in the solution state, there can be mentioned solvents similar to those for the above-mentioned solution blending method. This radical reaction is desirably carried out at a temperature not lower than the temperature at which a half-life period of the organic peroxide corresponds to 10 minutes, usually 50° to 300° C., and for a reaction time of usually 10 sec to 2 hours.

From the reaction product as obtained above is removed the solvent by means of, for example, distillation, to obtain the composition of the invention.

It is considered that the reason why the radical reaction product composition exhibits much improved transparency and impact resistance is that the organic peroxide decomposes to produce radicals which cause the radical reaction between the cycloolefin polymers [A] and [B], whereby the cycloolefin polymers [A] and [B] are partially bonded to each other with the intermolecular chemical bonds.

When double bonds are present in the cycloolefin polymer [A] and the cycloolefin polymer [B] or when constituent units derived from the radical polymerizable polyfunctional monomer are present in the radical reaction product, the bonding reaction may more easily take place, and hence the resulting composition as a reaction product which is further improved in the transparency and the impact resistance can be obtained.

The first cycloolefin polymer composition and the radical reaction modified product thereof according to the invention can be used alone, or mixtures thereof with other resins, particularly transparent resins, as far as excellent properties of the composition and the radical reaction modified product, particularly the transparency and the impact resistance, are not deteriorated.

The Second Cycloolefin Copolymer Composition

The second cycloolefin copolymer composition according to the invention comprises a cycloolefin elastomer component [Aa] and a cycloolefin copolymer component [Ba]. The cycloolefin elastomer component [Aa] is obtained by copolymerizing (i) an α-olefin of two or more carbon atoms and (ii) a cycloolefin of the formula (I) or (II), and (iiia) a non-conjugated diene of 5 to 20 carbon atoms. The cycloolefin copolymer component [Ba] is obtained by copolymerizing the above α-olefin (i) and the above cycloolefin (ii) in the presence of the cycloolefin elastomer component [Aa] obtained above. In the second cycloolefin copolymer composition of the invention, the cycloolefin elastomer component [Aa] has a polymerizable carbon-carbon double bond, and hence it is assumed that the cycloolefin elastomer component [Aa] and the cycloolefin copolymer component [Ba] are chemically bonded in part as described later.

The cycloolefin elastomer component [Aa] having a polymerizable carbon-carbon double bond used for the invention is described below in detail.

Cycloolefin Elastomer Component [Aa]

The cycloolefin elastomer component [Aa] used for the invention is an elastomer having a polymerizable carbon-carbon double bond, and is specifically a copolymer of (i) an α-olefin of two or more carbon atoms, (ii) a cycloolefin represented by the formula (I) or (II), and (iiia) a non-conjugated diene of 5 to 20 carbon atoms.

Examples of the α-olefin of two or more carbon atoms employable herein are the aforesaid α-olefins of 2 to 20 carbon atoms. They can be used singly or in combination of two or more kinds. Of those, ethylene or propylene is preferred.

Employable as the cycloolefin (ii) are cycloolefins represented by the aforesaid formula (I) and/or (II), and they can be used singly or in combination.

Employable as the non-conjugated diene of 5 to 20 carbon atoms (iiia) are specifically non-conjugated dienes represented by the aforesaid formulas [III] to [VI], and they can be also used singly or in combination.

Listed below are particular examples of the cycloolefin elastomer component [Aa] having a polymerizable carbon-carbon double bond.

The cycloolefin elastomer component [Aa] containing units derived from the non-conjugated diene represented by the formula [III] include:

ethylene/norbornene/1,5-hexadiene copolymer, ethylene/5-methyl-2-norbornene/1,5-hexadiene copolymer, ethylene/5-ethyl-2-norbornene/1,5-hexadiene copolymer, ethylene/5-phenyl-2-norbornene/1,5-hexadiene copolymer, ethylene/1,4-methano-1,4,4a,9a-tetrahydrofluorene/1,5-hexadiene copolymer, ethylene/tetracyclododecene/1,5-hexadiene copolymer, ethylene/norbornene/1,7-octadiene copolymer, ethylene/5-methyl-2-norbornene/1,7-octadiene copolymer, ethylene/5-ethyl-2-norbornene/1,7-octadiene copolymer, ethylene/5-phenyl-2-norbornene/1,7-octadiene copolymer, ethylene/tetracyclododecene/1,7-octadiene copolymer, ethylene/norbornene/1,9-decadiene copolymer, ethylene/5-methyl-2-norbornene/1,9-decadiene copolymer, ethylene/5-ethyl-2-norbornene/1,9-decadiene copolymer, ethylene/5-phenyl-2-norbornene/1,9-decadiene copolymer, ethylene/1,4-methano-1,4,4a,9a-tetrahydrofluorene/1,9-decadiene copolymer and ethylene/tetracyclododecene/1,9-decadiene copolymer.

The cycloolefin elastomer component [Aa] containing units derived from the non-conjugated diene represented by the formula [IV] include:

ethylene/norbornene/5-vinyl-bicyclo[2.2.1]hept-2-ene copolymer, ethylene/5-methyl-2-norbornene/5-vinyl-bicyclo[2.2.1]hept-2-ene copolymer, ethylene/5-ethyl-2-norbornene/5-vinyl-bicyclo[2.2.1]hept-2-ene copolymer, ethylene/5-phenyl-2-norbornene/5-vinyl-bicyclo[2.2.1]hept-2-ene copolymer, ethylene/1,4-methano-1,4,4a,9a-tetrahydrofluorene/5-vinyl-bicyclo[2.2.1]hept-2-ene copolymer and ethylene/tetracyclododecene/5-vinyl-bicyclo[2.2.1]hept-2-ene copolymer.

The cycloolefin elastomer component [Aa] containing units derived from the non-conjugated diene represented by the formula [V] include:

ethylene/norbornene/bicyclo[2.2.1]hept-2,5-diene copolymer, ethylene/5-methyl-2-norbornene/bicyclo[2.2.1]hept-2,5-diene copolymer, ethylene/5-ethyl-2-norbornene/bicyclo[2.2.1]hept-2,5-diene copolymer, ethylene/5-phenyl-2norbornene/bicyclo[2.2.1]hept-2,5-diene copolymer, ethylene/1,4-methano-1,4,4a,9a-tetrahydrofluorene/bicyclo[2.2.1]hept-2,5-diene copolymer, ethylene/tetracyclododecene/bicyclo[2.2.1]hept-2,5-diene copolymer, ethylene/norbornene/tetracyclo[4.4.0.1$^{2,5}$.1$^{7,10}$]-3,8-dodecadiene copolymer, ethylene/5-methyl-2-norbornene/tetracyclo[4.4.0.1$^{2,5}$.1$^{7,10}$]-3,8-dodecadiene copolymer, ethylene/5-ethyl-2-norbornene/tetracyclo[4.4.0.1$^{2,5}$.1$^{7,10}$]-3,8-dodecadiene copolymer, ethylene/5-phenyl-2-norbornene/tetracyclo[4.4.0.1$^{2,5}$.1$^{7,10}$]-3,8-dodecadiene copolymer, ethylene/1,4-methano-1,4,4a,9a-tetrahydrofluorene/tetracyclo[4.4.0.1$^{2,5}$.1$^{7,10}$]-3,8dodecadiene copolymer and ethylene/tetracyclododecene/tetracyclo[4.4.0.1$^{2,5}$.1$^{7,10}$] -3,8-dodecadiene copolymer.

The cycloolefin elastomer component [Aa] containing units derived from the non-conjugated diene represented by the formula [VI] include:

ethylene/norbornene/1,1-bis(5-bicyclo[2.2.1]hept-2-enyl)methane copolymer, ethylene/5-methyl-2-norbornene/1,1-bis(5-bicyclo[2.2.1]hept-2-enyl)methane copolymer, ethylene/5-ethyl-2-norbornene/1,1-bis(5-bicyclo[2.2.1]hept-2-enyl)methane copolymer, ethylene/5-phenyl-2-norbornene/ 1,1-bis(5-bicyclo[2.2.1]hept-2-enyl)methane copolymer, ethylene/1,4-methano-1,4,4a,9a-tetrahydrofluorene/bis(5-bicyclo[2.2.1]hept-2-enyl)methane copolymer and ethylene/tetracyclododecene/1,1-bis(5-bicyclo[2.2.1]hept-2-enyl)methane copolymer.

The intrinsic viscosity [η] of the cycloolefin elastomer component [Aa], as measured in decalin at 135° C., is in the range of 0.5 to 5.0 dl/g, preferably 0.7 to 4.0 dl/g.

In the cycloolefin elastomer component [Aa], it is desired that the cycloolefin units are contained in an amount of usually not less than 3% by mol, preferably not less than 5% by mol.

The glass transition temperature (Tg) of the cycloolefin elastomer component [Aa] is usually lower than 15° C., preferably lower than 12° C.

The iodine value of the cycloolefin elastomer component [Aa] is in the range of usually 2 to 30 (g-iodine/100 g-polymer), preferably 3 to 25 (g-iodine/100 g-polymer).

The refractive index $n_D$(Aa) of the cycloolefin elastomer component [Aa] as measured at 25° C. is in the range of usually 1.500 to 1.650, preferably 1.510 to 1.600.

Now, the cycloolefin copolymer component [Ba] is described below in detail.

Cycloolefin Coplolymer Component [Ba]

The cycloolefin copolymer component [Ba] is obtained by copolymerizing (i) an α-olefin of two or more carbon atoms and (ii) a cycloolefin in the presence of the above-mentioned cycloolefin elastomer component [Aa] having a polymerizable double bond.

As the α-olefin of two or more carbon atoms (i), those exemplified before can be employed. Of those, ethylene or propylene is preferred, and ethylene is particularly preferred. Those α-olefins can be used singly of in combination or two or more kinds.

Employable as the cycloolefin (ii) are specifically cycloolefins represented by the aforesaid formula (I) and/or (II), and they can be used singly or in combination.

The cycloolefin copolymer component [Ba] used for the invention is an addition polymer obtained by polymerizing the α-olefin of two or more carbon atoms (i) and the cycloolefin (ii) of the formula (I) or (II) in the presence of the aforementioned cycloolefin elastomer component [Aa] having a polymerizable double bond.

In the preparation of the cycloolefin copolymer component [Ba], other cycloolefins than the cycloolefin of the formula (I) or (II) can be additionally polymerized together with the α-olefin of two or more carbon atoms (i) and the cycloolefin of the formula (I) or (II), with the proviso that the properties of the copolymer component [Ba] are not deteriorated.

The term "other cycloolefins" used herein has a wide concept including unsaturated polycyclic hydrocarbon compounds except the cycloolefin of the formula (I) or (II).

More specifically, as other cycloolefins, there can be mentioned cyclobutene, cyclopentene, cyclohexane, 3,4-dimethylcyclopentene, 3-methylcyclohexene, 2-(2-methylbutyl)-cyclohexene, styrene, α-methylstyrene and 3a,5,6,7a-tetrahydro-4,7-methano-1H-indene.

Cycloolefin Copolymer Composition

The second cycloolefin copolymer composition according to the invention comprises the cycloolefin elastomer component [Aa] and the cycloolefin copolymer component [Ba], and the cycloolefin elastomer component [Aa] is contained in the composition in an amount of 8 to 40% by weight, preferably 10 to 35% by weight.

In the cycloolefin copolymer composition of the invention, a difference $\Delta n_D$ between the refractive index $n_D(Aa)$ of the cycloolefin elastomer component [Aa] and the refractive index $n_D(Ba)$ of the cycloolefin copolymer component [Ba], namely, $|n_D(Aa)-n_D(Ba)|$, is not more than 0.015. The cycloolefin elastomer component [Aa] is preferably a copolymer of a cycloolefin represented by the aforesaid formula (II), and the cycloolefin copolymer component [Ba] is preferably a copolymer of a cycloolefin represented by the aforesaid formula (I).

The cycloolefin copolymer composition of the invention comprises the cycloolefin elastomer component [Aa] having a polymerizable carbon-carbon double bond and the cycloolefin copolymer component [Ba] obtained by copolymerizing the α-olefin of two or more carbon atoms (i) and the cycloolefin (ii) in the presence of the cycloolefin elastomer component [Aa], as described above, and in this composition, it is assumed that the cycloolefin copolymer component [Ba] formed from the α-olefin (i) and the cycloolefin (ii) and the cycloolefin elastomer component [Aa] are chemically bonded to each other at least in part. This is apparent from the fact that the cycloolefin copolymer composition of the invention is superior in the transparency and the impact resistance to a cycloolefin copolymer composition which is obtained by simply blending the cycloolefin elastomer component [Aa] and a cycloolefin random copolymer component corresponding the component [Ba] which is obtained by copolymerizing the α-olefin of two or more carbon atoms (i) and the cycloolefin (ii) in the absence of the cycloolefin elastomer component [Aa].

It is assumed that this fact is brought about by that the compatibility between the phase of the cycloolefin copolymer component [Ba] and the phase of the elastomer component [Aa] is further improved by the chemical bonds which may be partially present between the [Aa] and the [Ba].

In the cycloolefin copolymer composition of the invention, a difference $\Delta n_D$ between the refractive index $n_D(Aa)$ of the cycloolefin elastomer component [Aa] and the refractive index $n_D(Ba)$ of the cycloolefin copolymer component [Ba], namely, $|n_D(Aa)-n_D(Ba)|$, is not more than 0.015 as described above, and it is preferably not more than 0.12, more preferably not more than 0.010.

In this invention, the refractive index of the cycloolefin elastomer component [Aa] and the refractive index of the cycloolefin copolymer component [Ba] are measured at 25° C. by the use of Abbe's refractometer (D-lines, 589 nm).

The cycloolefin copolymer component [Ba] herein means other portion than the cycloolefin elastomer component [Aa] in the cycloolefin copolymer composition which is prepared by copolymerizing the α-olefin (i) and the cycloolefin (ii) in the presence of the elastomer component [Aa], but it is impossible to separate the component [Ba] alone from the composition by physical means, because a part of the component [Ba] is chemically bonded to the elastomer component [Aa].

Accordingly, the refractive index $n_D(Ba)$ of the component [Ba] herein is a value of refractive index $n_D$ measured on a cycloolefin random copolymer prepared from the α-olefin (i) and the cycloolefin (ii) under the same conditions as those for preparing the component [Ba] except that the cycloolefin elastomer component [Aa] is not present.

In the preparation of the cycloolefin elastomer component [Aa] and the cycloolefin copolymer component [Ba], there can generally be used a transition metal catalyst, specifically (α) a catalyst formed from a soluble vanadium compound and an organoaluminum compound, or (β) a catalyst formed from a metallocene compound of a transition metal selected from Group IVB of the periodic table and lanthanoid and an organoaluminum oxy-compound, and if necessary, an organoaluminum compound.

Details of the catalysts (α) and (β) are described before in the preparation of the cycloolefin random copolymers [A-1] and [B-1].

In this invention, the α-olefin of two or more carbon atoms (i) is copolymerized with the cycloolefin (ii) in the presence of the cycloolefin elastomer component [Aa] using the above-mentioned catalyst (α) or (β) usually in a liquid phase, preferably in a hydrocarbon solvent.

Examples of the hydrocarbon solvent include:

aliphatic hydrocarbons, such as pentane, hexane, heptane, octane, decane, dodecane and kerosine, and halogen derivatives thereof;

alicyclic hydrocarbons, such as cyclohexane, methylcyclopentane and methylcyclohexane, and halogen derivatives thereof; and aromatic hydrocarbons, such as benzene, toluene and xylene, and halogen derivatives thereof, such as chlorobenzene.

In the copolymerization reaction, the liquid α-olefin or the liquid cycloolefin per se can be used as the solvent. A mixture of two or more of the solvents may also be employed.

In the invention, the copolymerization reaction is preferably conducted in the presence of any one of the hydrocarbon solvents, preferably in the presence of a mixture of these solvents. Particularly preferred solvent mixtures are cyclohexane-hexane, cyclohexane-heptane, cyclohexane-pentane, toluene-hexane, toluene-heptane and toluene-pentane.

The copolymerization can be carried out either batchwise or continuously, but it is preferably carried out continuously. The catalyst concentrations used are as follows.

In the case of the catalyst (α):

The soluble vanadium compound is fed to the polymerization system in an amount of usually 0.01 to 5 mmol, preferably 0.05 to 3 mmol, per 1 liter of the polymerization solution; and the organoaluminum compound is fed to the polymerization system in such an amount that a raio (Al/V) of the aluminum atom to the vanadium atom in the polymerization system is not less than 2, preferably in the range of 2 to 50, more preferably 3 to 20. In the continuous copolymerization, the soluble vanadium compound is fed to the system in a concentration of not more than 10 times, preferably 1 to 7 times, more preferably 1 to 5 times, as much as the concentration of the soluble vanadium compound existing in the polymerization system.

In general, the soluble vanadium compound and the organoaluminum compound are diluted with a liquid monomer and/or the aforesaid hydrocarbon solvent followed by feeding to the polymerization reactor. In this case, the soluble vanadium compound is desirably diluted to the above-mentioned concentration, while the organoaluminum compound is desirably fed to the polymerization system after diluting it to a concentration of, for example, not more than 50 times as much as the concentration thereof in the polymerization system.

In the case of the catalyst (β):

The metallocene compound is used in an amount of usually about 0.00005 to 1.0 mmol, preferably about 0.0001 to 0.3 mmol, per 1 liter of the polymerization solution; and the organoaluminum oxy-compound is used in such an amount that the aluminum atom contained therein is in the range of usually about 1 to 10,000 mol, preferably 10 to 5,000 mol, per 1 mol of the transition metal atom in the metallocene compound.

The copolymerization reaction in the presence of the catalyst (α) or (β) is generally carried out under the conditions of a temperature of −50° to 200° C., preferably −30° to 150° C., more preferably −20° to 100° C., and a pressure of more than 0 kg/cm² to 50 kg/cm², preferably more than 0 kg/cm² to 20 kg/cm². The reaction time (average residence time in the continuous copolymerization) is varied depending on various conditions such as kinds of the monomers, catalyst concentrations and polymerization temperatures, but is generally in the range of 5 minutes to 5 hours, preferably 10 minutes to 3 hours.

In the copolymerization reaction in the presence of the component [Aa], it is desired that the α-olefin of two or more carbon atoms (i) and the cycloolefin (ii) are fed to the polymerization system in such amounts that a molar ratio (i)/(ii) is in the range of 10/90 to 90/10, preferably 10/90 to 50/50

In the copolymerization, a chain transfer agent such as hydrogen can also be employed for molecular weight control.

Through the above-mentioned procedure, a solution containing the cycloolefin copolymer composition which comprises the cycloolefin elastomer component [Aa] and the cycloolefin copolymer component [Ba] obtained by copolymerizing the α-olefin of two or more carbon atoms (i) and the cycloolefin (ii) of the formula (I) or (II) in the presence of the elastomer component [Aa]. In this solution, the cycloolefin copolymer composition is contained in a concentration of usually 10 to 500 g/liter, preferably 10 to 300 g/liter. The cycloolefin copolymer composition is obtained by processing the solution in the conventional manner.

More specifically, in order to prepare the cycloolefin copolymer composition of the invention, it is possible to dissolve the cycloolefin elastomer component [Aa] having been beforehand prepared, e.g., in the form of pellets or elastomer bales, in a hydrocarbon solvent to give a solution in which the α-olefin of two or more carbon atoms (i) and the cycloolefin (ii) are copolymerized. It is also possible to first prepare the cycloolefin elastomer component [Aa] and then copolymerize the α-olefin of two or more carbon atoms (i) and the cycloolefin (ii) in the resulting polymerization solution of component [Aa] in a two-stage polymerization process.

The second cycloolefin copolymer composition of the invention can be used alone or in combination with other resins, particularly transparent resins, as far as excellent properties of the composition, particularly the transparency and the impact resistance, are not deteriorated.

The Third Cycloolefin Copolymer Composition

The third cycloolefin copolymer composition according to the present invention comprises a cycloolefin elastomer component [Aα] and a cycloolefin copolymer component [Bα]. The cycloolefin elastomer component [Aα] is obtained by copolymerizing (i) an α-olefin of two or more carbon atoms and (ii) a cycloolefin of the formula (I) or (II); and the the cycloolefin copolymer component [Bα] is obtained by copolymerizing the α-olefin (i) and the cycloolefin (ii) in the presence of the cycloolefin elastomer component [Aα]. It is considered that in such cycloolefin copolymer composition of the invention, the cycloolefin elastomer component [Aα] and the cycloolefin copolymer component [Bα] are highly compatible with each other.

First, the cycloolefin elastomer component [Aα] substantially having no polymerizable carbon-carbon double bond, which is used for the invention, will be described below.

Cycloolefin Elastomer Component [Aα]

The cycloolefin elastomer component [Aα] used for the invention is an elastomer substantially having no polymerizable carbon-carbon double bond, and is specifically a copolymer of (i) an α-olefin or two or more carbon atoms and (ii) a cycloolefin of the formula (I) or (II).

Examples of the α-olefin of two or more carbon atoms (i) are the aforesaid α-olefins of 2 to 20 carbon atoms, and they can be used singly or in combination of two or more kinds. Of these, preferred is ethylene or propylene.

Employable as the cycloolefin (ii) are cycloolefins represented by the aforesaid formula (I) and/or (II). They can be used singly or in combination of two or more kinds.

Examples of the cycloolefin elastomer component [Aα] substantially having no polymerizable carbon-carbon double bond include:

ethylene/norbornene copolymer, ethylene/5-methyl-2-norbornene copolymer, ethylene/5-ethyl-2-norbornene copolymer, ethylene/5-propyl-2-norbornene copolymer, ethylene/5-butyl-2-norbornene copolymer, ethylene/5-pentyl-2-norbornene copolymer, ethylene/5-hexyl-2-norbornene copolymer, ethylene/5-heptyl-2-norbornene copolymer, ethylene/5-octyl-2-norbornene copolymer, ethylene/5-nonyl-2-norbornene copolymer, ethylene/5-decyl-2-norbornene copolymer, ethylene-5-undecyl-2-norbornene copolymer, ethylene/5-dodecyl-2-norbornene copolymer, ethylene/5-phenyl-2-norbornene copolymer, ethylene/1,4-methano-1,4,4a,9a-tetrahydrofluorene copolymer, and ethylene/tetracyclododecene copolymer;

ethylene/propylene/norbornene copolymer, ethylene/propylene/5-ethylidene-2-norbornene copolymer, ethylene/propylene/5-methyl-2-norbornene copolymer, ethylene/propylene/5-ethyl-2-norbonrene copolymer, ethylene/propylene/5-propyl-2-norbornene copolymer, ethylene/propylene/5-butyl-2-norbornene copolymer, ethylene/propylene/5-pentyl-2-norbornene copolymer, ethylene/propylene/5-hexyl-2-norbornene copolymer, ethylene/propylene/5-heptyl-2-norbornene copolymer, ethylene/propylene/5-octyl-2-norbornene copolymer, ethylene/propylene/5-nonyl-2-norbornene copolymer, ethylene/propylene/5-decyl-2-norbornene copolymer, ethylene/propylene/5-undecyl-2-norbornene copolymer, ethylene/propylene/5-dodecyl-2-norbornene copolymer, ethylene/propylene/5-phenyl-2-norbornene copolymer, and ethylene/propylene/tetracyclododecene copolymer;

ethylene/1-butene/norbornene copolymer, ethylene/1-butene/5-ethylidene-2-norbornene copolymer, ethylene/1-butene/5-methyl-2-norbornene copolymer, ethylene/1-butene/5-ethyl-2-norbornene copolymer, ethylene/1-butene/5-propyl- 2-norbornene copolymer, ethylene/1-butene/5-butyl-2-norbornene copolymer, ethylene/1-butene/5-pentyl-2-norbornene copolymer, ethylene/1-butene/5-hexyl-2-norbornene copolymer, ethylene/1-butene/5-heptyl-2-norbornene copolymer, ethylene/1-butene/5-octyl-2-norbornene copolymer, ethylene/1-butene/5-nonyl-2-norbornene copolymer, ethylene/1-butene/5-decyl-2-norbornene copolymer, ethylene/1-butene/5-undecyl-2-norbornene copolymer, ethylene/1-butene/5-dodecyl-2-norbornene copolymer, ethylene/1-butene/5-phenyl-2-norbornene copolymer, and ethylene/1-butene/tetracyclododecene copolymer;

ethylene/1-hexene/norbornene copolymer, ethylene/1-hexene/ 5-methyl-2-norbornene copolymer, ethylene/1-hexene/5-ethyl-2-norbornene copolymer, ethylene/1-hexene/5-propyl- 2-norbornene copolymer, ethylene/1-hexene/5-butyl-2-norbornene copolymer, ethylene/1-hexene/5-pentyl-2-norbornene copolymer, ethylene/1-hexene/5- hexyl-2-norbornene copolymer, ethylene/1-hexene/5-heptyl-2-norbornene copolymer, ethylene/1-hexene/5-octyl-2-norbornene copolymer, ethylene/1-hexene/5-nonyl-2-norbornene copolymer, ethylene/1-hexene/5-decyl-2-norbornene copolymer, ethylene/1-hexene/5-undecyl-2-norbornene copolymer, ethylene/1-hexene/5-dodeceyl-2-norbornene copolymer, ethylene/1-hexene/5-phenyl-2-norbornene copolymer, and ethylene/1-hexene/tetracyclododecene copolymer;

ethylene/1-octene/norbornene copolymer, ethylene/1-octene/5-methyl-2-norbornene copolymer, ethylene/1-octene/5-ethyl-2-norbornene copolymer, ethylene/1-octene/5-propyl-2-norbornene copolymer, ethylene/1-octene/5-butyl-2-norbornene copolymer, ethylene/1-octene/5-pentyl-2-norbornene copolymer, ethylene/1-octene/5-hexyl-2-norbornene copolymer, ethylene/1-octyl/5-heptyl-2-norbornene copolymer, ethylene/1-octene/5-octyl-2-norbornene copolymer, ethylene/1-octene/5-nonyl-2-norbornene copolymer, ethylene/1-octene/5-decyl-2-norbornene copolymer, ethylene/1-octene/5-undecyl-2-norbornene copolymer, ethylene/1-octene/5-dodeceyl-2-norbornene copolymer, ethylene/1-octene/5-phenyl-2-norbornene copolymer, and ethylene/1-octene/tetracyclododecene copolymer; and ethylene/1-decene/norbornene copolymer, ethylene/1-decene/5-methyl-2-norbornene copolymer, ethylene/1-decene/5-ethyl-2-norbornene copolymer, ethylene/1-decene/5-propyl-2-norbornene copolymer, ethylene/1-decene/5-butyl-2-norbornene copolymer, ethylene/1-decene/5-pentyl-2-norbornene copolymer, ethylene/1-decene/5-hexyl-2-norbornene copolymer, ethylene/1-decene/5-heptyl-2-norbornene copolymer, ethylene/1-decene/5-octyl-2-norbornene copolymer, ethylene/1-decene/5-nonyl-2-norbornene copolymer, ethylene/1-decene/5-decyl-2-norbornene copolymer, ethylene/1-decene/5-undecyl-2-norbornene copolymer, ethylene/1-decene/5-dodeceyl-2-norbornene copolymer, ethylene/1-decene/5-phenyl-2-norbornene copolymer, and ethylene/1-decene/tetracyclododecene copolymer.

The intrinsic viscosity [η] of the cycloolefin elastomer component [Aα], as measured in decalin at 135° C., is in the range of 0.5 to 5.0 dl/g, preferably 0.7 to 4.0 dl/g.

In the cycloolefin elastomer component [Aα], it is desired that the cycloolefin units are contained in an amount of not less than 3% by mol, preferably not less than 5% by mol.

The glass transition temperature (Tg) of the cycloolefin elastomer component [Aα] is usually lower than 15° C., preferably lower than 12° C.

The refractive index $n_D(A\alpha)$ of the cycloolefin elastomer component [Aα], as measured at 25° C., is in the range of usually 1.500 to 1.650, preferably 1.510 to 1.600.

Next, the cycloolefin copolymer component [Bα] will be described below.

Cycloolefin Copolymer Component [Bα]

The cycloolefin copolymer component [Bα] used for the invention can be obtained by copolymerizing (i) an α-olefin of two or more carbon atoms and (ii) a cycloolefin in the presence of the cycloolefin elastomer component [Aα] substantially having no polymerizable double bond.

Examples of the α-olefin of two or more carbon atoms (i) are the aforesaid α-olefins of 2 to 20 carbon atoms, and they can be used singly or in combination of two or more kinds. Of these, preferred is ethylene or propylene, and more preferred is ethylene.

Employable as the cycloolefin (ii) are specifically cycloolefins of the aforesaid formula (I) and/or (II), and they can be used singly or in combination of two or more kinds.

The cycloolefin copolymer component [Bα] used for the invention is an addition type polymer obtained by polymerizing the α-olefin of two or more carbon atoms (i) and the cycloolefin (ii) of the formula (I) or (II) in the presence of the aforesaid cycloolefin elastomer component [Aα] substantially having no polymerizable double bond.

In addition to the α-olefin of two or more carbon atoms (i) and the cycloolefin (ii), other cycloolefins than the cycloolefin of the formula (I) or (II) can be also additionally polymerized in the cycloolefin copolymer component [Bα], with the proviso that the properties of the copolymer component [Bα] are not deteriorated.

The term "other cycloolefins" used herein has a wide concept including unsaturated polycyclic hydrocarbon compounds as described above. For example, the same compounds as those employable for the synthesis of the aforementioned cycloolefin copolymer component [Ba] can be employed.

Cycloolefin Copolymer Composition

The cycloolefin copolymer composition according to the invention comprises the cycloolefin elastomer component [Aα] and the cycloolefin copolymer component [Bα], and the cycloolefin elastomer component [Aα] is contained in the composition in an amount of 8 to 40% by weight, preferably 10 to 35% by weight.

In the cycloolefin copolymer composition of the invention, a difference $\Delta n_D$ between the refractive index $n_D(A\alpha)$ of the cycloolefin elastomer component [Aα] and the refractive index $n_D(B\alpha)$ of the cycloolefin copolymer component [Bα], namely, $|n_D(A\alpha)-n_D(B\alpha)|$, is not more than 0.015. The cycloolefin elastomer component [Aα] is preferably a copolymer of a cycloolefin of the formula (II), and the cycloolefin copolymer component [Bα] is preferably a copolymer of a cycloolefin of the formula (I).

In this invention, the refractive index of the cycloolefin elastomer component [Aα] and the refractive index of the cycloolefin copolymer component [Bα] are measured at 25° C. by the use of Abbe's refractometer (D-lines, 589 nm).

The cycloolefin copolymer composition of the invention comprises the cycloolefin elastomer component [Aα] substantially having no polymerizable carbon-carbon double bond and the cycloolefin copolymer component [Bα] obtained by copolymerizing the α-olefin of two or more carbon atoms (i) and the cycloolefin (ii) in the presence of the cycloolefin elastomer component [Aα], and in the composition, the phase of cycloolefin elastomer component [Aα] is finely dispersed in the phase of cycloolefin copolymer component [Bα] formed from the α-olefin (i) and the cycloolefin (ii). This is apparent from the fact that the cycloolefin copolymer composition of the invention is superior in the transparency and the impact resistance to a cycloolefin copolymer composition which is obtained by simply blending the cycloolefin elastomer component [Aα] and a cycloolefin random copolymer component corresponding to the component [Bα] obtained by copolymerizing the α-olefin of two or more carbon atoms (i) and the cycloolefin (ii) in the absence of the cycloolefin elastomer component [Aα].

In the cycloolefin copolymer composition of the invention, a difference $\Delta n_D$ between the refractive index $n_D(A\alpha)$ of the cycloolefin elastomer component [Aα] and the refractive index $n_D(B\alpha)$ of the cycloolefin copolymer component [B$\alpha$], namely, $|n_D(A\alpha)-n_D(B\alpha)|$, is not more than 0.015 as described above, and it is preferably not more than 0.12, more preferably not more than 0.010.

The cycloolefin copolymer component [B$\alpha$] herein means other component than the component [A$\alpha$] in the cycloolefin copolymer composition which is prepared by copolymerizing the $\alpha$-olefin (i) and the cycloolefin (ii) in the presence of the cycloolefin elastomer component [A$\alpha$], but it is difficult to measure the refractive index $n_D(B\alpha)$ alone, because the component [Bm] and the component [A$\alpha$] are quite compatible with each other.

Accordingly, the refractive index $n_D(B\alpha)$ of the component [B$\alpha$] herein is a value of refractive index $n_D$ measured on a cycloolefin random copolymer prepared from the $\alpha$-olefin (i) and the cycloolefin (ii) under the same conditions as those for preparing the component [B$\alpha$] except that the cycloolefin elastomer component [A$\alpha$] is not present.

In the preparation of the cycloolefin elastomer component [A$\alpha$] and the cycloolefin copolymer component [B$\alpha$], there can generally be used a transition metal catalyst, specifically ($\alpha$) a catalyst formed from a soluble vanadium compound and an organoaluminum compound, or ($\beta$) a catalyst formed from a metallocene compound of a transition metal selected from Group IVB of the periodic table and lanthanoid and an organoaluminum oxy-compound, and, if necessary, an organoaluminum compound.

Details of the catalysts ($\alpha$) and ($\beta$) are described before in the preparation of the cycloolefin random copolymers [A-1] and [B-1].

The copolymerization of the $\alpha$-olefin of two or more carbon atoms (i) and the cycloolefin (ii) in the presence of the cycloolefin elastomer component [A$\alpha$] using the above-mentioned catalyst ($\alpha$) or ($\beta$) is also usually carried out in a liquid phase, preferably in a hydrocarbon solvent.

As the hydrocarbon solvent, those exemplified before can be employed. Further, the liquid $\alpha$-olefin or the liquid cycloolefin per se can also be used as the solvent.

Examples of the solvent preferably used for the copolymerization reaction in the presence of the component [A$\alpha$] are mixed solvents such as cyclohexane-hexane, cyclohexane-heptane, cyclohexane-pentane, toluene-hexane, toluene-heptane and toluene-pentane.

The copolymerization can be carried out either batchwise or continuously, but it is preferably carried out continuously. The catalyst concentrations used are as follows.

In the case of the catalyst ($\alpha$):

The soluble vanadium compound is fed to the polymerization system in an amount of usually 0.01 to 5 mmol, preferably 0.05 to 3 mmol, per 1 liter of the polymerization solution; and the organoaluminum compound is fed to the polymerization system in such an amount that a raio (Al/V) of the aluminum atom to the vanadium atom in the polymerization system is not less than 2, preferably in the range of 2 to 50, more preferably 3 to 20. In the continuous copolymerization, the soluble vanadium compound is fed to the system in a concentration of not more than 10 times, preferably 1 to 7 times, more preferably 1 to 5 times, as much as the concentration of the soluble vanadium compound contained in the polymerization system.

In general, the soluble vanadium compound and the organoaluminum compound are diluted with a liquid monomer and/or the aforesaid hydrocarbon solvent followed by feeding to the polymerization reactor. In this case, the soluble vanadium compound is desirably diluted to the above-mentioned concentration, while the organoaluminum compound is desirably fed to the polymerization system after diluting it to a concentration of, for example, not more than 50 times as much as the concentration thereof in the polymerization system.

In the case of the catalyst ($\beta$):

The metallocene compound is used in an amount of usually about 0.00005 to 1.0 mmol, preferably about 0.0001 to 0.3 mmol, per 1 liter of the polymerization solution; and the organoaluminum oxy-compound is used in such an amount that the aluminum atom contained therein is in the range of usually about 1 to 10,000 mol, preferably 10 to 5,000 mol, per 1 mol of the transition metal atom in the metallocene compound.

The copolymerization reaction in the presence of the catalyst ($\alpha$) or ($\beta$) is generally carried out under the conditions of a temperature of $-50°$ to $200°$ C., preferably $-30°$ to $150°$ C., more preferably $-20°$ to $100°$ C., and a pressure of more than 0 kg/cm$^2$ to 50 kg/cm$^2$, preferably more than 0 kg/cm$^2$ to 20 kg/cm$^2$. The reaction time (average residence time in the continuous copolymerization) is varied depending on various conditions such as kinds of the monomers, catalyst concentrations and polymerization temperatures, but is generally in the range of 5 minutes to 5 hours, preferably 10 minutes to 3 hours.

In the copolymerization reaction in the presence of the component [A$\alpha$], it is desired that the $\alpha$-olefin of two or more carbon atoms (i) and the cycloolefin (ii) are fed to the polymerization system in such amounts that a molar ratio (i)/(ii) is in the range of 10/90 to 90/10, preferably 10/90 to 50/50.

In the copolymerization, a chain transfer agent such as hydrogen can also be employed for molecular weight control.

Through the above-mentioned procedures, a solution containing the cycloolefin copolymer composition which comprises the cycloolefin elastomer component [A$\alpha$] and the cycloolefin copolymer component [B$\alpha$] obtained by copolymerizing the $\alpha$-olefin of two or more carbon atoms (i) and the cycloolefin (ii) of the formula (I) or (II) in the presence of the elastomer component [A$\alpha$]. In this solution, the cycloolefin copolymer composition is contained in a concentration of usually 10 to 500 g/liter, preferably 10 to 300 g/liter. The cycloolefin copolymer composition is obtained by processing the solution in the conventional manner.

More specifically, in order to prepare the cycloolefin copolymer composition of the invention, it is possible to dissolve the cycloolefin elastomer component [A$\alpha$] having been beforehand prepared, e.g., in the form of elastomer pellets or elastomer bales, in a hydrocarbon solvent to give a solution in which the $\alpha$-olefin of two or more carbon atoms (i) and the cycloolefin (ii) are copolymerized. It is also possible to first prepare the cycloolefin elastomer component [A$\alpha$] and then copolymerize the $\alpha$-olefin of two or more carbon atoms (i) and the cycloolefin (ii) in the resulting polymerization solution of component [A$\alpha$] in a series of two-stage polymerization process.

The third cycloolefin copolymer composition of the present invention can be used alone or in combination with other resins, particularly transparent resins, as far as excellent properties of the composition, particularly the transparency and the impact resistance, are not deteriorated.

The first, second and third cycloolefin polymer compositions of the invention can be each molded by conventional molding processes, for example, extrusion molding, injection molding, blow molding and rotational molding, by means of a single-screw extruder, a vented extruder, a twin-screw extruder, a conical type twin-screw extruder, a co-kneader, a Plastificator, a mixtruder, a twin-screw conical extruder, a planetary screw extruder, a gear extruder, a screwless extruder, etc.

The cycloolefin copolymer compositions according to the invention may contain rubber components to further improve the impact strength thereof and/or various additives, for example, heat stabilizer, weathering stabilizer, antistatic agent, anti-slip agent, anti-blocking agent, antifogging agent, lubricant, pigment, dye, natural oil, synthetic oil and wax, provided that the object of the invention is not marred.

Stabilizers may optionally be added include, for example, phenolic antioxidants such as tetrakis[methylene-3-( 3,5-di-t-butyl-4-hydroxyphenyl)-propionate] methane, alkyl ester of β-(3,5-di-t-butyl-4-hydroxyphenyl)propionic acid and 2,2'-oxamidobis[ethyl-3-(3,5-di-t-butyl-4-hydroxyphenyl)]propionate;
aliphatic acid metal salts such as zinc stearate, calcium stearate and calcium 12-hydroxystearate; and
aliphatic acid esters of polyhydric alcohols such as glycerin monostearate, glycerin monolaurate, glycerin distearate, pentaerythritol monostearate, pentaerythritol distearate and pentaerythritol tristearate.

These stabilizers may be used singly or in combination. One of the examples is a combination of tetrakis[methylene-3-(3,5-di-t-butyl-4-hydroxyphenyl)propionate]methane with zinc stearate or with glycerin monostearate.

In the present invention, particularly preferred is the use of the phenolic antioxidant and the aliphatic acid ester of polyhydric alcohol in combination. The aliphatic acid ester of polyhydric alcohol is preferably such an ester in which the polyhydric alcohol having 3 or more hydroxy groups is partly esterified. The aliphatic acid esters of polyhydric alcohols include, specifically, aliphatic acid esters of glycerin such as glycerin monostearate, glycerin monolaurate, glycerin monomyristate, glycerin monopalmitate, glycerin distearate and glycerin dilaurate; and aliphatic acid esters of pentaerythritol such as pentaerythritol monostearate, pentaerythritol monolaurate, pentaerythritol dilaurate, pentaerythritol distearate and pentaerythritol tristearate. The phenolic stabilizer is used in an amount of 0 to 10 parts by weight, preferably 0 to 5 parts by weight, more preferably 0 to 2 parts by weight, based on 100 parts by weight of the cycloolefin resin. The aliphatic acid ester of the polyhydric alcohol is used in an amount of 0 to 10 parts by weight, preferably 0 to 5 parts by weight, based on 100 parts by weight of the cycloolefin resin.

Further, the cycloolefin random copolymer compositions of the invention may include, provided that the object of the invention is not marred, fillers such as silica, diatomaceous earth, alumina, titanium oxide, magnesium oxide, pumice powder, pumice balloons, aluminum hydroxide, magnesium hydroxide, basic magnesium carbonate, dolomite, calcium sulfate, potassium titanate, barium sulfate, calcium sulfite, talc, clay, mica, asbestos, glass fibers, glass flakes, glass beads, calcium silicate, montmorillonite, bentonite, graphite, aluminum powder, molybdenum sulfide, boron fibers, silicon carbide fibers, fibers of polymer obtained from α-olefin having 2 or more carbon atoms, such as polypropylene fibers, polyester fibers and polyamide fibers.

EFFECT OF THE INVENTION

The first cycloolefin polymer composition of the present invention comprises two kinds of the cycloolefin copolymers [A] and [B] having specially combined properties, wherein a difference $n_D=|n_D(A)-n_D(B)|$ between the refractive index $n_D(A)$ of the cycloolefin polymer [A] and the refractive index $n_D(B)$ of the cycloolefin polymer [B] is not more than 0.015, so that this composition is excellent in the impact resistance, the transparency and the heat resistance, and has a good balance of these properties.

The second cycloolefin copolymer composition of the present invention comprises the cycloolefin elastomer component [Aa] containing a polymerizable carbon-carbon double bond and the cycloolefin copolymer component [Ba] obtained by copolymerizing the α-olefin of two or more carbon atoms (i) and the cycloolefin (ii) in the presence of the elastomer component [Aa], wherein a difference $\Delta n_D = |n_D(Aa)-n_D(Ba)|$ between the refractive index $n_D(Aa)$ of the component [Aa] and the refractive index $n_D(Ba)$ of the component [Ba] is not more than 0.015, and the cycloolefin elastomer component [Aa] and the cycloolefin copolymer component [Ba] are also chemically bonded to each other at least in part, so that the composition is improved especially in the impact resistance without trading off its transparency.

The third cycloolefin copolymer composition of the present invention comprises the cycloolefin elastomer component [Aα] substantially having no polymerizable carbon-carbon double bond and the cycloolefin copolymer component [Bα] obtained by copolymerizing the α-olefin of two or more carbon atoms (i) and the cycloolefin (ii) in the presence of the elastomer component [Aα], and therefore the phase of cycloolefin elastomer component [Aα] is finely dispersed in the phase of cycloolefin copolymer component [Bα]. Further, the difference in the refractive index between the component [Aα] and the component [Bα] is as small as not more than 0.015 in the composition. Hence, the composition is improved especially in the impact resistance without trading off its transparency.

EXAMPLE

The present invention will be further described with reference to the following examples, but it should be construed that the invention is in no way limited to those examples.

Measurement of various properties and evaluation are carried out according to the following methods.
(1) Intrinsic viscosity [η]
   The intrinsic viscosity [η] was measured in decalin at 135° C. by the use of Ubbelohde viscometer.
(2) Glass transition temperature (Tg)
   The glass transition temperature (Tg) was measured at a heating rate of 10° C./min in a $N_2$ atmosphere by the use of DSC-220C from Seiko Electron Co., Ltd.
(3) Melt flow rate (MFR)
   The melt flow rate (MFR) was measured at 260° C. under a load of 2.16 kg in accordance with ASTM D1238.
(4) Refractive index
   The refractive index was measured at 25° C. by the use of Abbe's refractometer (D-lines, 589 nm).
(5) Monomer composition in copolymer
   The monomer composition ratio was measured by means of $^{13}C$-NMR.
(6) Iodine value
   The iodine value was measured by the iodine monochloride method in accordance with JIS K3331.
(7) Preparation of specimen
   A specimen was prepared using an injection molding machine IS50EPN from Toshiba Kikai Co., Ltd. and a prescribed mold for specimen under the following molding conditions. After molding, the specimen was allowed to stand for 48 hours at room temperature, followed by measurement.

Molding conditions

Cylinder temperature: 260° C.

Mold temperature: 60° C.

Injection pressure primary/secondary: 1,000/800 kg/cm$^2$ (8) Light transmittance Light transmittance was measured using a pressed sheet of 2 mm in thickness as a sample, with the use of a spectrophotometer MPS-2000 from Shimadzu Seisakusho Co., Ltd., at a wavelength of 780 nm.

(9) Izod impact strength

The Izod impact strength was measured in accordance with ASTM D256.

Size of specimen: 5/2×⅛×½' inch (notched)

Test temperature: 23° C.

(10) Heat distortion temperature (HDT)

The heat distortion temperature (HDT) was measured in accordance with ASTM D648.

Size of specimen: 5×¼×½' inch

Load: 264 psi

Preparation of Copolymers

[Synthesis of Copolymer (a)]

Copolymerization of ethylene and tetracyclo[4.4.0.1$^{2,5}$.1$^{7,10}$]-3-dodecene (hereinafter sometimes abbreviated to "TCD") was continuously carried out using a vanadium catalyst in the following manner.

A cyclohexane solution of TCD was continuously fed to a 1-liter glass polymerization reactor, equipped with a stirring blade, at the top of the reactor so that the TCD concentration in the reactor was 60 g/liter. Further, a cyclohexane solution of VO(O.ethyl)Cl$_2$ and a cyclohexane solution of ethylaluminum sesquichloride (Al(C$_2$H$_5$)$_{1.5}$Cl$_{1.5}$) were continuously fed to the polymerization reactor at the top thereof, respectively, so that the vanadium concentration and the aluminum concentration in the reactor were 0.5 mmol/liter and 4.0 mmol/liter, respectively. Through bubbling tubes, ethylene, nitrogen and hydrogen were continuously introduced into the polymerization system at rates of 36.0 liters/hr, 35.0 liters/hr and 1.0 liter/hr, respectively.

The copolymerization reaction was conducted while keeping the polymerization system at 10° C. by circulating a cooling medium through a jacket provided outside the reactor. A polymer solution containing a copolymer resulting from the above copolymerization reaction was continuously withdrawn from the top of the reactor so that a volume of the polymer solution in the reactor was constantly 1 liter (i.e., the average residence time was 0.5 hour). To the polymer solution was added a mixture of cyclohexane/isopropyl alcohol (1/1) to terminate the polymerization reaction. Thereafter, the polymer solution was contacted with an aqueous solution containing 5 ml of concentrated hydrochloric acid in 1 liter of water in a proportion of 1:1 with vigorous stirring by means of a homomixer, thereby allowing the catalyst residue to transfer into the aqueous phase. After allowing the contacted mixture to stand, the aqueous phase was removed by separation, and the polymer solution phase was washed twice with distilled water to purify it and separated.

Then, the polymer solution thus purified and separated was poured into acetone in an amount of 3 times as much as the polymer solution with vigorous stirring to precipitate a copolymer, and the solid portion was collected by filtration and thoroughly washed with acetone. Further, the solid portion was introduced into acetone so as to be 40 g/liter and extracted the unreacted TCD present in the copolymer at a temperature of 60° C. for 2 hours. After the extraction, the solid portion was collected by filtration and dried at 130° C. and 350 mmHg for 12 hours in a nitrogen atmosphere.

In the above-mentioned manner, an ethylene/TCD copolymer (a) was obtained. This ethylene/TCD copolymer had an intrinsic viscosity [η] of 0.53 dl/g, Tg of 140° C., a TCD content of 36.5% by mol, and an iodine value of 0.1 g-iodine/100 g. The results are shown in Table 1.

[Synthesis of Copolymer (b)]

A 1-liter stainless steel autoclave was charged with 239 ml of toluene, 134 g of norbornene (hereinafter sometimes abbreviated to "NB") was fed at room temperature in a nitrogen stream, and the content in the autoclave was stirred for 5 minutes (NB concentration in the reactor: 335 g/l). Subsequently, ethylene was passed through the reaction system at atmospheric pressure with stirring to lay the system in an ethylene atmosphere. Keeping the internal temperature of the autoclave at 70° C., ethylene was fed to the autoclave so that the internal pressure became 4 kg/cm$^2$. After stirring for 10 minutes, a toluene solution containing ethylenebis(indenyl)zirconium dichloride and methyl aluminoxan, which had been beforehand prepared, was added to the system to initiate the copolymerization reaction of ethylene and NB. At this time, the concentration of ethylenebis(indenyl)zirconium dichloride in the system was 0.10 mmol/liter, and the concentration of methyl aluminoxane in the system was 20 mmol/liter.

During the copolymerization, ethylene was continuously fed to the system to keep the internal pressure at 4 kg/cm$^2$. After 20 minutes, isopropyl alcohol was added to the system to terminate the polymerization reaction. After release of the pressure, the polymer solution was taken out from the autoclave, and contacted with an aqueous solution of 5 ml of concentrated hydrochloric acid in 1 liter of water in a proportion of 1:1 with vigorous stirring by means of a homomixer, thereby allowing the catalyst residue to transfer into the aqueous phase. After allowing the contacted mixture to stand, the aqueous phase was removed by separation, and the polymer solution phase was washed twice with distilled water to purify it and separated.

Then, the polymer solution thus purified and separated was poured into acetone in an amount of 3 times as much as the polymer solution with vigorous stirring to precipitate a copolymer, and the solid portion (copolymer) was collected by filtration and thoroughly washed with acetone. Further, the solid portion was introduced into acetone so as to be 40 g/liter and extracted the unreacted NB present in the copolymer at a temperature of 60° C. for 2 hours. After the extraction, the solid portion was collected by filtration and dried at 130° C. and 350 mmHg for 12 hours in a nitrogen stream.

In the above-mentioned manner, an ethylene/norbornene copolymer (b) was obtained. This ethylene/norbornene copolymer had an intrinsic viscosity [η] of 0.60 dl/g, Tg of 151° C., a NB content of 47.0% by mol, and an iodine value of 0.2 g-iodine/100 g-polymer. The results are shown in Table 1.

[Synthesis of Copolymer (c)]

The procedure for synthesizing the copolymer (a) was repeated except that ethylidene norbornene (hereinafter sometimes abbreviated to "ENB") as a diene was additionally fed so as to be a concentration of 0.9 g/liter, and ethylene at a rate of 36.0 liters/hr, nitrogen at a rate of 35.0 liters/hr and hydrogen at a rate of 1.0 liter/hr were fed, to synthesize a copolymer (c). The results are shown in Table 1.

[Syntheses of Copolymers (d) to (g)]

The procedure for preparing the copolymer (a) was repeated except that 5-phenyl-bicyclo[2,2, 1]hept-2-ene (hereinafter sometimes abbreviated to "PhBH") as a cycloolefin in place of TCD, and ethylene, nitrogen, hydrogen and PhBH were fed in amounts shown in Table 1, to synthesize copolymers (d) to (g). The results are also shown in Table 1.

[Synthesis of Copolymer (h)]

The procedure for synthesizing the copolymer (a) was repeated except that NB as a cycloolefin in place of TCD, and ethylene, nitrogen, hydrogen and NB were fed in amounts shown in Table 1, to synthesize a copolymer (h). The results are also shown in Table 1.

[Synthesis of Copolymer (i)]

The procedure for synthesizing the copolymer (d) was repeated except that PhBH and ENB, and ethylene, nitrogen and hydrogen were fed in amounts shown in Table 1, to synthesize a copolymer (i). The results are shown in Table 1.

Example 1

400.0 g of pellets of the copolymer (e) (component [A]) and 1,600.0 g of pellets of the copolymer (a) (component [B]) were weighed, and they were sufficiently mixed with each other in a nitrogen atmosphere in a polyethylene bag, followed by purging with nitrogen for 2 hours. The resultant mixture was melt blended by means of a twin-screw extruder (BT-30 from Plastic Engineering Institute) at a cylinder maximum temperature of 260° C. for a residence time of 1 minute, and pelletized by a pelletizer.

The pellets thus obtained were molded and evaluated. The light transmittance of the sheet 2 mm of thickness was 75%; the Izod impact strength was 7.1 kg.cm/cm; and the heat distortion temperature (HDT) under a load of 264 psi was 122° C. The results are shown in Table 2.

Example 2

The procedure of Example 1 was repeated except that 600.0 g of the pellets of the copolymer (e) (component [A]) and 1,400.0 g of the pellets of the copolymer (a) (component [B]) were used. The results are shown in Table 2.

Example 3

The procedure of Example 1 was repeated except that the copolymer (d) (component [A]) and the copolymer (b) (component [B]) were used. The results are shown in Table 2.

Example 4

The procedure of Example 1 was repeated except that the copolymer (b) as a component [B] were used. The results are shown in Table 2.

Example 5

The procedure of Example 1 was repeated except that 500.0 g of the pellets of the copolymer (f) (component [A]) and 1,500.0 g of the pellets of the copolymer (a) (component [B]) were used. The results are shown in Table 2.

Comparative Example 1

The procedure of Example 1 was repeated except that 400.0 g of the pellets of the copolymer (g) (component [A]) and 1,600.0 g of the pellets of the copolymer (a) (component [B]) were used. The results are shown in Table 2.

It was shown that when Tg of the component [A] was outside the range defined in the claim, the impact strength of the composition was low.

Comparative Example 2

The procedure of Example 1 was repeated except that 600.0 g of the pellets of the copolymer (g) (component [A]) and 1,400.0 g of the pellets of the copolymer (a) (component [B]) were used. The results are shown in Table 2.

It was shown that when Tg of the component [A] was outside the range defined in the claim, the impact strength of the composition was low even if the amount of the component [A] was increased.

Comparative Example 3

The procedure of Example 1 was repeated except that 400.0 g of the pellets of the copolymer (h) (component [A]) and 1,600.0 g of the pellets of the copolymer (a) (component [B]) were used. The results are shwon in Table 2.

It was shown that when the difference in the refractive index between the component [A] and the component [B] was large, the transparency of the composition was deteriorated.

Comparative Example 4

The procedure of Example 1 was repeated except that 400.0 g of the pellets of the copolymer (h) (component [A]) and 1,600.0 g of the pellets of the copolymer (b) (component [B] ) were used. The results are shown in Table 2.

It was shown that when the difference in the refractive index between the component [A] and the component [B] was large, the transparency of the composition was deteriorated.

Example 6

A 1-liter glass flask was charged with 3.0 g of the copolymer (i) (component [A]) and 12.0 g of the copolymer (c) (component [B]) in a dry nitrogen atmosphere, and further 470 ml of orthodichlorobenzene was added. In order to completely dissolve the copolymers, the mixture was heated to 160° C. to give a polymer solution.

Separately, 0.15 g of Percumyl D available from Nippon Oils & Fats Co., Ltd. (dicumyl peroxide, hereinafter sometimes abbreviated to "DCP") was dissolved in 30 ml of orthodichlorobenzene.

The solution of DCP was dropwise added to the polymer solution over a period of 30 minutes with stirring at 160° C. to initiate the radical reaction. Thereafter, the reaction was continued at 160° C., and the heating was stopped after the lapse of 2 hours from completion of the dropwise addition of the peroxide solution, followed by allowing to cool to room temperature.

Subsequently, the reaction solution was poured into a large amount of acetone with vigorous stirring to precipitate a reaction product. The white solid was separated by filtration and washed with a large amount of acetone to remove the unreacted DCP residue. The solid was collected by filtration and dried at 130° C. and 350 mmHg for 12 hours in a nitrogen stream.

In the above-mentioned manner, a cycloolefin polymer composition was obtained. This composition had a light transmittance of 87%, Izod impact strength of 5.1 kg.cm/cm and a heat distortion temperature (HDT) of 120° C. The results are shown in Table 3.

Example 7

The procedure of Example 6 was repeated except that DCP was not used, to prepare a composition. The results are shown in Table 3.

Example 8

A 1-liter glass flask was charged with 3.0 g of the copolymer (d) (component [A]) and 12.0 g of the copolymer (b) (component [B]) in a dry nitrogen atmosphere, and further 440 ml of orthodichlorobenzene was added. In order to completely dissolve the copolymers, the mixture was heated to 160° C. to give a polymer solution.

Separately, 0.15 g of DCP was dissolved in 30 ml of orthodichlorobenzene, and 0.30 g of divinylbenzene (hereinafter sometimes abbreviated "DVB", available from Wako Junyaku K.K.) was dissolved in 30 ml of orthodichlorobenzene, respectively.

The solution of DCP and the solution of DVB were dropwise added to the above-obtained polymer solution over a period of 30 minutes with stirring at 160° C. to initiate the radical reaction. Thereafter, the reaction was continued at 160° C., and the heating was stopped after the lapse of 2 hours from completion of the dropwise addition of the peroxide solution, followed by allowing to cool to room temperature.

Subsequently, the reaction solution was poured into a large amount of acetone with vigorous stirring to precipitate a reaction product. The white solid was separated by filtration and washed with a large amount of acetone to remove the unreacted DCP and DVB residue. The solid was collected by filtration and dried at 130° C. and 350 mmHg for 12 hours in a nitrogen stream.

The results are shown in Table 3.

Example 9

400.0 g of pellets of the copolymer (e) (component [A]), 1,600.0 g of pellets of the copolymer (a) (component [B]), 4 g of Perhexyne 25B (trade name, hereinafter sometimes abbreviated to "PH25B", available from Nippon Oils & Fats Co., Ltd.) and 8 g of DVB were introduced into a polyethylene bag, and they were sufficiently mixed in a nitrogen atmosphere in the polyethylene bag, followed by purging with nitrogen for 2 hours. The resultant mixture was melt blended by means of a twin-screw extruder (BT-30 from Plastic Engineering Institute) at a cylinder maximum temperature of 260° C. for a residence time of 1 minute, and pelletized by a pelletizer. The pellets thus obtained were molded and evaluated.

The results are shown in Table 3.

TABLE 1

| | | Cycloolefin | | Diene | | Feed Rate of Gas (1/hr) | | |
|---|---|---|---|---|---|---|---|---|
| | Copolymer | Kind | Amount (g/l) | Kind | Amount (g/l) | Ethylene | Nitrogen | Hydrogen |
| Component [B] | (a) | TCD | 60.0 | — | — | 36.0 | 35.0 | 1.0 |
| | (b) | NB | 335.0 | — | — | (pressure: 4 kg/cm$^2$) | | |
| | (c) | TCD | 60.0 | ENB | 0.9 | 36.0 | 35.0 | 1.0 |
| Component [A] | (d) | PhBH | 9.6 | — | — | 30.0 | 9.0 | 1.0 |
| | (e) | PhBH | 11.2 | — | — | 30.0 | 9.0 | 1.0 |
| | (f) | PhBH | 11.9 | — | — | 30.0 | 9.8 | 0.2 |
| | (g) | PhBH | 25.5 | — | — | 30.0 | 9.8 | 0.2 |
| | (h) | NB | 7.8 | — | — | 30.0 | 9.0 | 1.0 |
| | (i) | PhBH | 13.1 | ENB | 0.6 | 30.0 | 9.5 | 0.5 |

| | Copolymer | Polymer Concentration (g/l) | Content of Cycloolefin (mol %) | Tg (°C.) | Viscosity [η] (dl/g) | IV *1 | Refractive Index |
|---|---|---|---|---|---|---|---|
| Component [B] | (a) | 48.0 | 36.5 | 140 | 0.53 | 0.1 | 1.543 |
| | (b) | 67.0 | 47.0 | 151 | 0.60 | 0.2 | 1.532 |
| | (c) | 47.1 | 35.1 | 135 | 0.55 | 3.1 | 1.541 |
| Component [A] | (d) | 23.8 | 5.5 | −5 | 1.41 | 0.1 | 1.532 |
| | (e) | 24.5 | 8.6 | −1 | 0.93 | 0.1 | 1.538 |
| | (f) | 24.8 | 12.1 | 2 | 1.38 | 0.1 | 1.541 |
| | (g) | 27.1 | 18.3 | 29 | 0.91 | 0.1 | 1.552 |
| | (h) | 24.5 | 12.4 | −7 | 1.13 | 0.1 | 1.515 |
| | (i) | 25.0 | 12.5 | 3 | 1.11 | 3.6 | 1.539 |

The copolymers (a) and (c) to (h) were synthesized using a catalyst of VO(OEt)Cl$_2$/AlEt$_{1.5}$Cl$_{1.5}$ (0.5/4.0 mM).

TABLE 1-continued

The copolymer (b) was synthesized using a metallocene catalyst of Et(Ind)$_2$ZrCl$_2$ and MAO (0.1/20 mM/L).
*1: g-iodine/100 g-polymer.

TABLE 2

| | Component [A] | Component [B] | [A]/[B] (by weight) | Difference of Refractive Index $\Delta n_D$ | Light Transmittance (%) | Izod *2 | HDT (°C.) |
|---|---|---|---|---|---|---|---|
| Ex. 1 | Copolymer (e) | Copolymer (a) | 20/80 | 0.005 | 75 | 7.1 | 122 |
| Ex. 2 | Copolymer (e) | Copolymer (a) | 30/70 | 0.005 | 73 | 51.3 | 121 |
| Ex. 3 | Copolymer (d) | Copolymer (b) | 20/80 | 0 | 88 | 5.1 | 122 |
| Ex. 4 | Copolymer (e) | Copolymer (b) | 20/80 | 0.006 | 71 | 6.4 | 121 |
| Ex. 5 | Copolymer (f) | Copolymer (a) | 25/75 | 0.002 | 85 | 17.2 | 122 |
| Comp. Ex. 1 | Copolymer (g) | Copolymer (g) | 20/80 | 0.009 | 73 | 1.8 | 122 |
| Comp. Ex. 2 | Copolymer (g) | Copolymer (a) | 30/70 | 0.009 | 70 | 1.8 | 120 |
| Comp. Ex. 3 | Copolymer (h) | Copolymer (a) | 20/80 | 0.028 | 8 | 9.3 | 118 |
| Comp. Ex. 4 | Copolymer (h) | Copolymer (b) | 20/80 | 0.017 | 10 | 10.5 | 121 |

*2: kg · cm/cm

TABLE 3

| | Component [A] | Component [B] | [A]/[B] by weight | Refractive Index $\Delta n_D$ |
|---|---|---|---|---|
| Ex. 6 | Copolymer (i) | Copolymer (c) | 20/80 | 0.002 |
| Ex. 7 | Copolymer (i) | Copolymer (c) | 20/80 | 0.002 |
| Ex. 8 | Copolymer (d) | Copolymer (b) | 20/80 | 0 |
| Ex. 9 | Copolymer (e) | Copolymer (a) | 20/80 | 0.005 |

| | Organic Peroxide | | Crosslinking Assisting Agent | | Light Transmittance | Izod | HDT |
|---|---|---|---|---|---|---|---|
| | Kind | Amount*3 | Kind | Amount*3 | (%) | *2 | (°C.) |
| Ex. 6 | DCP | 1.0 | none | — | 87 | 5.1 | 120 |
| Ex. 7 | none | — | none | — | 75 | 3.9 | 122 |
| Ex. 8 | DCP | 1.0 | DVB | 2.0 | 89 | 5.3 | 119 |
| Ex. 9 | PH25B | 0.2 | DVB | 0.4 | 82 | 7.1 | 120 |

*2: kg · cm/cm
*3: g/100 g-polymer

Preparation of Cycloolefin Elastomer Component [Aa]

In a 1-liter glass polymerization reactor equipped with a stirring blade, a cycloolefin elastomer [Aa] having a polymerizable carbon-carbon double bond was prepared in the following manner.

A cyclohexane solution containing 5-phenylbicyclo[2.2.1]hepto-2-ene (PhBH) and 5-vinyl-2-norbornene (VNB) were continuously fed to the polymerization reactor at a rate of 0.4 liter/hr so that the concentrations of PhBH and VNB in the reactor were 10.0 g/liter and 2.0 g/liter respectively, and cyclohexane was also continuously fed at a rate of 0.5 liter/hr. Further, to the reactor were continuously fed, as catalysts, a cyclohexane solution of VO(OC$_2$H$_5$)Cl$_2$ at a rate of 0.7 liter/hr (the concentration of vanadium to be fed at this time was 2.86 times as much as that of the vanadium present in the reactor) so that the vanadium concentration in the reactor was 0.5 mmol/liter, and a cyclohexane solution of isobutylaluminum sesquichloride (Al(C$_4$H$_9$)$_{1.5}$Cl$_{1.5}$) at a rate of 0.4 liter/hr so that the aluminum concentration in the reactor was 4.0 mmol/liter. Furthermore, to the polymerization system were fed ethylene at a rate of 20.0 liters/hr, nitrogen at a rate of 10.0 liters/hr and hydrogen at a rate of 1.0 liter/hr, through bubbling tubes.

The copolymerization reaction was conducted while keeping the polymerization system at 10° C. by circulating a cooling medium through a jacket provided outside the polymerization reactor. A polymer solution containing an ethylene/PhBH/VNB copolymer resulted from the above copolymerization reaction was continuously withdrawn from the top of the reactor so that the amount of the polymer solution in the reactor was constantly 1 liter (i.e., the average residence time was 0.5 hour). To the polymer solution was added a small amount of methyl alcohol to terminate the polymerization reaction. Thereafter, the polymer solution was contacted with an aqueous solution containing 5 ml of concentrated hydrochloric acid in 1 liter of water in a proportion of 1:1 with vigorous stirring by means of a homomixer, thereby allowing to transfer the catalyst residue into the aqueous phase. After allowing the contacted mixture to stand, the aqueous phase was removed by separation, and the polymer solution phase was washed twice with distilled water to purify it and separated. The polymer solution thus separated was then poured into acetone in an amount of 3 times as much as the polymer solution with vigorous stirring. Then, the solid portion was collected by filtration, thoroughly washed with acetone, and dried at 130° C. and 350 mmHg for 12 hours.

In the above-mentioned manner, an ethylene/PhBH/VNB copolymer was obtained as a cycloolefin elastomer component [Aa] in an amount of 40.0 g/hr, i.e., 20.0 g/liter. The copolymer obtained had an ethylene content of 82.6% by mol; a PhBH content of 11.4% by mol; an intrinsic viscosity [η] of 2.05 dl/g; a glass transition temperature (Tg), measured by DSC, of 2.0° C.; an iodine value of 13.2 g-iodine/100 g-polymer; and a refractive index $n_D$(Aa), measured at 25° C., of 1.5408.

Separately, the polymerization reaction was carried out as mentioned above and a polymer solution was withdrawn from the top of the reactor, and washed with an acidic water and then pure water to remove the catalyst residue. To the polymer solution, magnesium sulfate anhydride in an amount of 10 g per 1 liter of the polymer solution was added, and the resulting mixture was shaken to remove water contained in the polymer solution to obtain a polymer solution, which was used for the polymerization reaction in Example 10.

Example 10

In a 1-liter glass polymerization reactor equipped with a stirring blade, the copolymerization of ethylene and tetracyclo[4.4.0.1$^{2,5}$.1$^{7,10}$]-3-dodecene (TCD) in the presence of the cycloolefin elastomer component [Aa] having a polymerizable carbon-carbon double bond was continuously carried out in the following manner.

The water-removed polymer solution obtained in the manner mentioned above, which contained the ethylene/5-phenyl-bicyclo[ 2.2.1]hepto-2-ene (PhBH)/vinyl norbornene (VNB) copolymer ([η]: 2.05 dl/g, iodine value: 13.2 g-iodine/100 g-polymer, Tg: 2.0° C.), was continuously fed to the reactor at a rate of 0.5 liter/hr so that the concentration of the ethylene/PhBH/VNB copolymer in the reactor was 6.9 g/liter. Further, to the reactor was continuously fed a cyclohexane solution of TCD at a rate of 0.4 liter/hr so that the TCD concentration in the reactor was 60.0 g/liter. Furthermore, to the reactor from its top, were continuously fed, as catalysts, a cyclohexane solution of VO(OC$_2$H$_5$)Cl$_2$ at a rate of 0.7 liter/hr (the concentration of vanadium to be fed at this time was 2.86 times as much as that of the vanadium present in the reactor) so that the vanadium concentration in the reactor was 0.5 mmol/liter and a cyclohexane solution of isobutylaluminum sesquichloride (Al(C$_4$H$_9$)$_{1.5}$Cl$_{1.5}$) at a rate of 0.4 liter/hr so that the aluminum concentration in the reactor was 4.0 mmol/liter. Moreover, to the polymerization system were fed ethylene at a rate of 30.6 liters/hr, nitrogen at a rate of 40.6 liters/hr and hydrogen at a rate of 0.85 liter/hr, through bubbling tubes.

The copolymerization reaction was conducted while keeping the polymerization system at 10° C. by circulating a cooling medium through a jacket provided outside the polymerization reactor. A polymer solution of the ethylene/TCD copolymer composition containing the ethylene/5-phenyl-bicyclo[2.2.1]hepto-2-ene (PhBH)/vinyl norbornene (VNB) copolymer resulted from the above copolymerization reaction was continuously withdrawn from the top of the reactor so that the amount of the polymer solution in the reactor was constantly 1 liter (i.e., the average residence time was 0.5 hour). To the polymer solution was added a small amount of methanol to terminate the polymerization reaction. Thereafter, the polymer solution was contacted with an aqueous solution containing 5 ml of concentrated hydrochloric acid in 1 liter of water in a proportion of 1:1 with vigorous stirring by means of a homomixer, thereby allowing the catalyst residue to transfer into the aqueous phase. After allowing the contacted mixture to stand, the aqueous phase was removed by separation, and the polymer solution phase was washed twice with distilled water to purify it and separated.

Subsequently, the polymer solution thus purified and separated was then poured into acetone in an amount of 3 times as much as the polymer solution with vigorous stirring. Then, the solid portion was collected by filtration and thoroughly washed with acetone. Further, the solid portion thus washed was introduced into acetone so as to be 40 g/liter and extracted TCD present in the polymer at a temperature of 60° C. for 2 hours. After the extraction, the solid portion was collected by filtration and dried at 130° C. and 350 mmHg for 12 hours in a nitrogen stream.

In the above-mentioned manner, a cycloolefin copolymer composition comprising the ethylene/5-phenylbicyclo[2.2.1]hepto-2-ene (PhBH)/vinyl norbornene (VNB) copolymer and the ethylene/TCD copolymer was obtained in an amount of 52.4 g/hr, i.e., 26.2 g/liter. In the copolymer composition thus produced, the component [Aa] was contained in an amount of 26.3% by weight. The MFR of the copolymer composition, as measured at 260° C. under a load of 2.16 kg, was 2.2 g/10 min. The Tg of the ethylene/TCD copolymer component [Ba] was 143° C.

The results are shown in Table 4.

Examples 11–13

The procedure of Example 10 was repeated to prepare copolymer compositions except for varying the conditions to those shown in Table 4, and various cycloolefin copolymers as [Aa] components, such as ethylene/PhBH/VNB copolymers and an ethylene/PhBH/1,9-decadiene (1,9-DD) copolymer.

The results are shown in Table 4.

Example 14

A 1-liter stainless steel autoclave was charged with 239 ml of toluene and 7.8 g of the ethylene/PhBH/VNB copolymer (intrinsic viscosity [η]: 2.23 dl/g, iodine value: 11.9 g-iodine/100 g-polymer, Tg: –5.0° C.) obtained by "Preparation of Cycloolefin Elastomer Component [Aa]", 134 g of norbornene (NB) was fed at room temperature in a nitrogen atmosphere, and the content in the autoclave was stirred for 5 minutes. Subsequently, ethylene was passed through the reaction system at ordinary pressure with stirring to lay the system in an ethylene atmosphere. Keeping the internal temperature of the autoclave at 70° C., ethylene was fed to the autoclave so that the internal pressure was 4 kg/cm$^2$. After stirring for 10 minutes, a toluene solution containing ethylenebis(indenyl)zirconium dichloride and methyl aluminoxan, which had been beforehand prepared, was added to the system to initiate the copolymerization reaction of ethylene and NB. At this time, the concentration of ethylenebis(indenyl)zirconium dichloride in the system was 0.10 mmol/liter, and the concentration of methyl aluminoxane in the system was 20 mmol/liter. During the polymerization, ethylene was continuously fed to the system to keep the internal pressure at 4 kg/cm$^2$. After 20 minutes, isopropyl alcohol was added to the system to terminate the polymerization reaction. After release of the pressure, the polymer solution was taken out of the autoclave, and contacted with an aqueous solution of 5 ml of concentrated hydrochloric acid in 1 liter of water in a proportion of 1:1 with vigorous stirring by means of a homomixer, thereby allowing the catalyst residue to transfer into the aqueous phase. After allowing the contacted mixture to stand, the aqueous phase was removed by separation, and the polymer solution phase was washed twice with distilled water to purify it and separated.

Then, the polymer solution thus purified-and-separated was poured into acetone in an amount of 3 times as much as the polymer solution with vigorous stirring to precipitate a copolymer, and the solid portion (copolymer) was collected by filtration and thoroughly washed with acetone. Further, the solid portion was introduced into acetone so as to be 40 g/liter and extracted the unreacted norbornene (NB) present in the copolymer at a temperature of 60° C. for 2 hours. After the extraction, the solid portion was collected by filtration and dried at 130° C. and 350 mmHg for 12 hours in a nitrogen stream.

In the above-mentioned manner, a cycloolefin copolymer composition comprising the ethylene/5-phenylbicyclo [2.2.1]hepto-2-ene (PhBH)/vinyl norbornene (VNB) copolymer and the ethylene/NB copolymer was obtained. In the copolymer composition thus produced, the component [Aa] was contained in an amount of 25.7% by weight. The MFR of the copolymer composition, as measured at 260° C. under a load of 2.16 kg, was 2.0 g/10 min. The Tg of the component [Ba] was 141° C.

The results are shown in Table 4.

Comparative Example 5

The procedure of Example 10 was repeated except that the cycloolefin elastomer component [Aa] was not present.

The results are shown in Table 4.

TABLE 4

| | | Elastomer Component [Aa] | | | | |
|---|---|---|---|---|---|---|
| Example | Kind of Elastomer | $[\eta]$ (dl/g) | Ph—NB Content (mol %) | Tg (°C.) | Refractive Index $(n_D)$*2 | Iodine Value (g-iodine/ 100 g- polymer) |
| Ex. 10 | Ethylene. PhBH—VNB | 2.05 | 11.0 | 2.0 | 1.5408 | 13.2 |
| Ex. 11 | Ethylene. PhBH—VNB | 1.99 | 13.2 | 7.7 | 1.5472 | 12.1 |
| Ex. 12 | Ethylene. PhBH-1.9DD | 2.17 | 12.0 | 2.1 | 1.5450 | 5.0 |
| Ex. 13 | Ethylene. PhBH—VNB | 2.23 | 5.1 | −5.0 | 1.5311 | 11.9 |
| Ex. 14 | Ethylene. PhBH—VNB | 2.23 | 5.1 | −5.0 | 1.5311 | 11.9 |
| Comp. Ex. 5 | Component [Aa] was not present | | | | | |

| | | Conditions for Synthesis of Component [Ba] in the presence of Component [Aa]*1 | | |
|---|---|---|---|---|
| Example | Kind of Cycloolefin | Concentration of Cycloolefin (g/l) | Feed Rate of Ethylene (l/hr) | Added Amount of [Aa] (g/l) |
| Ex. 10 | TCD | 60.0 | 30.6 | 6.9 |
| Ex. 11 | TCD | 60.0 | 30.6 | 6.9 |
| Ex. 12 | TCD | 60.0 | 30.6 | 6.9 |
| Ex. 13 | TCD | 55.0 | 30.5 | 6.0 |
| Ex. 14 | NB | 335.0 | (pressure: 4 kg/cm²) | 7.8 |
| Comp. Ex. 5 | TCD | 60.0 | 30.6 | 0 |

| | | Physical Properties of Copolymer Composition | | | | | |
|---|---|---|---|---|---|---|---|
| Ex. | Content of [Aa] (wt %) | Tg of [Ba] (°C.) | Refractive Index of [Ba] $(n_D)$ *2 | Refractive Index Difference between [Aa] and [Ba] | Izod Impact Strength (kg · cm/cm) | Light trans- mittance (%) | MFR (g/10 min) |
| Ex. 10 | 26.3 | 143 | 1.5427 | 0.0019 | 23 | 89 | 2.2 |
| E. 11 | 25.9 | 140 | 1.5430 | 0.0042 | 11 | 89 | 3.0 |
| Ex. 12 | 26.8 | 144 | 1.5418 | 0.0032 | 22 | 88 | 2.4 |
| Ex. 13 | 24.9 | 132 | 1.5401 | 0.0090 | 12 | 86 | 2.6 |
| Ex. 14 | 25.7 | 141 | 1.5329 | 0.0018 | 28 | 88 | 2.0 |
| Comp. Ex. 5 | 0 | 149 | 1.5441 | — | 1 | 89 | 5.0 |

*1: Feed rate of nitrogen = 40.6 l/hr, Feed rate of hydrogen = 0.85 l/hr. In Example 14, neither nitrogen nor hydrogen was fed.
*2: Measured at 25° C.

Preparation of Cycloolefin Elastomer Component [Aα]

In a 1-liter glass polymerization reactor equipped with a stirring blade, a cycloolefin elastomer [Aα] was synthesized in the following manner.

A cyclohexane solution of 5-phenylbicyclo[2.2.1]hepto-2-ene (PhBH) was fed to the polymerization reactor at a rate of 0.4 liter/hr so that the PhBH concentration in the reactor was 10.6 g/liter. Further, to the reactor were continuously fed, as catalysts, a cyclohexane solution of $VO(OC_2H_5)Cl_2$ at a rate of 0.5 liter/hr (the concentration of vanadium to be fed at this time was 2.86 times as much as that of the vanadium present in the reactor) so that the vanadium concentration in the reactor was 0.5 mmol/liter, and a cyclohexane solution of isobutylaluminum sesquichloride $(Al(C_4H_9)_{1.5}Cl_{1.5})$ at a rate of 0.4 liter/hr so that the aluminum concentration in the polymerizer was 4.0 mmol/liter. Furthermore, cyclohexane was also continuously fed to the reactor at a rate of 0.5 liter/hr. Moreover, to the polymerization system were fed ethylene at a rate of 20.0 liters/hr, nitrogen at a rate of 10.0 liters/hr and hydrogen at a rate of 0.5 liter/hr, through bubbling tubes.

The copolymerization reaction was conducted while keeping the polymerization system at 10° C. by circulating a cooling medium through a jacket provided outside the reactor. A polymer solution of an ethylene/PhBH copolymer resulted from the above copolymerization reaction was continuously withdrawn from the top of the reactor so that the amount of the polymer solution in the reactor was constantly 1 liter (i.e., the average residence time was 0.5 hour). To the polymer solution was added a small amount of methyl alcohol to terminate the polymerization reaction. Thereafter, the polymer solution was contacted with an aqueous solution containing 5 ml of concentrated hydrochloric acid in 1 liter of water in a proportion of 1:1 with vigorous stirring by means of a homomixer, thereby allowing the catalyst residue to transfer into the aqueous phase. After allowing the contacted mixture to stand, the aqueous phase was removed by separation, and the polymer solution phase was washed twice with distilled water to purify it and separated. The polymer solution thus separated was then poured into acetone in an amount of 3 times as much as the polymer solution with vigorous stirring. Then, the solid portion was collected by filtration, thoroughly washed with acetone, and dried at 130° C. and 350 mmHg for 12 hours.

In the above-mentioned manner, an ethylene/PhBH copolymer was obtained as a cycloolefin elastomer component [Aα] in an amount of 40.0 g/hr, i.e., 20.0 g/liter. The copolymer obtained had an ethylene content of 87.8% by mol; a PhBH content of 12.2% by mol; an intrinsic viscosity [η] of 1.91 dl/g; a glass transition temperature (Tg), measured by DSC, of 2.4° C.; an iodine value of 0.2 g-iodine/100 g-polymer; and a refractive index $n_D(A\alpha)$, measured at 25° C., of 1.5416.

Separately, the polymerization reaction was carried out as mentioned above and a polymer solution was withdrawn from the top of the reactor, and washed with an acidic water and then pure water to remove the catalyst residue. To the polymer solution was added magnesium sulfate anhydride in an amount of 10 g per 1 liter of the polymer solution, and the resulting mixture was shaken to remove water contained in the polymer solution to obtain a polymer solution, which was used for the polymerization reaction in Example 15.

Example 15

In a 1-liter glass polymerization reactor equipped with a stirring blade, the copolymerization of ethylene and tetracyclo[4.4.0.1$^{2,5}$.1$^{7,10}$]-3-dodecene (TCD) in the presence of the cycloolefin elastomer component [Aα] substantially containing no polymerizable double bond was continuously carried out in the following manner.

The water-removed polymer solution obtained in the manner mentioned above, which contained the ethylene/PhBH copolymer ([η]: 1.91 dl/g, iodine value: 0.2 g-iodine/100 g-polymer, Tg: 2.4° C.), was continuously fed to the reactor at a rate of 0.5 liter/hr so that the concentration of the ethylene/PhBH copolymer in the reactor was 6.9 g/liter. Further, to the reactor was continuously fed a cyclohexane solution of TCD at a rate of 0.4 liter/hr so that the TCD concentration in the polymerizer was 60.0 g/liter. Furthermore, to the reactor from its top were continuously fed, as catalysts, a cyclohexane solution of $VO(OC_2H_5)Cl_2$ at a rate of 0.7 liter/hr (the concentration of vanadium to be fed at this time was 2.86 times as much as that of the vanadium present in the reactor) so that the vanadium concentration in the reactor was 0.5 mmol/liter and a cyclohexane solution of isobutylaluminum sesquichloride $(Al(C_4H_9)_{1.5}Cl_{1.5})$ at a rate of 0.4 liter/hr so that the aluminum concentration in the reactor was 4.0 mmol/liter. Moreover, to the polymerization system were fed ethylene at a rate of 30.6 liters/hr, nitrogen at a rate of 40.6 liters/hr and hydrogen at a rate of 0.85 liter/hr, through bubbling tubes.

The copolymerization reaction was conducted while keeping the polymerization system at 10° C. by circulating a cooling medium through a jacket provided outside the polymerization reactor. A polymer solution of the ethylene/TCD copolymer composition containing the ethylene/PhBH copolymer resulted from the above copolymerization reaction was continuously withdrawn from the top of the reactor so that the amount of the polymer solution in the reactor was constantly 1 liter (i.e., the average residence time was 0.5 hour). To the polymer solution was added a small amount of methanol to terminate the polymerization reaction. Thereafter, the polymer solution was contacted with an aqueous solution containing 5 ml of concentrated hydrochloric acid in 1 liter of water in a proportion of 1:1 with vigorous stirring by means of a homomixer, thereby allowing the catalyst residue to transfer into the aqueous phase. After allowing the contacted mixture to stand, the aqueous phase was removed by separation, and the polymer solution phase was washed twice with distilled water to purify it and separated.

Subsequently, the polymer solution thus purified and separated was then poured into acetone in an amount of 3 times as much as the polymer solution with vigorous stirring. Then, the solid portion was collected by filtration and thoroughly washed with acetone. Further, the solid portion thus washed was introduced into acetone so as to be 40 g/liter to extract TCD present in the polymer at a temperature of 60° C. for 2 hours. After the extraction, the solid portion was collected by filtration and dried at 130° C. and 350 mmHg for 12 hours in a nitrogen atmosphere.

In the above-mentioned manner, a cycloolefin copolymer composition comprising the ethylene/PhBH copolymer and the ethylene/TCD copolymer was obtained in an amount of 53.4 g/hr, i.e., 26.7 g/liter. In the copolymer composition thus produced, the component [Aα] was contained in an amount of 25.8% by weight. The MFR of the copolymer composition, as measured at 260° C. under a load of 2.16 kg, was 2.9 g/10 min. The Tg of the component [Bα] was 142° C.

The results are shown in Table 5.

Example 16

The procedure of Example 15 was repeated except for varying the conditions to those shown in Table 5, to prepare a cycloolefin copolymer composition comprising an ethylene/PhBH copolymer and an ethylene/TCD copolymer.

The results are shown in Table 5.

Example 17

A 1-liter stainless steel autoclave was charged with 239 ml of toluene and 7.8 g of the ethylene/PhBH copolymer (intrinsic viscosity [h]: 2.02 dl/g, Tg: −6.0° C.) obtained by "Preparation of Cycloolefin Elastomer Component [Aα]", 134 g of norbornene (NB) was fed at room temperature in a nitrogen atmoshere, and the content in the autoclave was stirred for 5 minutes. Subsequently, ethylene was passed through the reaction system at ordinary pressure with stirring to lay the system in an ethylene atmosphere. Keeping the internal temperature of the autoclave at 70° C., ethylene was fed to the autoclave so that the internal pressure was 4 kg/cm$^2$. After stirring for 10 minutes, a toluene solution containing ethylenebis(indenyl)zirconium dichloride and methyl aluminoxan, which had been beforehand prepared, was added to the system to initiate the copolymerization reaction of ethylene and NB. At this time, the concentration of ethylenebis(indenyl)zirconium dichloride in the system was 0.10 mmol/liter, and the concentration of methyl aluminoxane in the system was 20 mmol/liter. During the polymerization, ethylene was continuously fed to the system to keep the internal pressure at 4 kg/cm$^2$. After 20 minutes, isopropyl alcohol was added to the system to terminate the polymerization reaction. After release of the pressure, the polymer solution was taken out of the autoclave, and contacted with an aqueous solution of 5 ml of concentrated hydrochloric acid in 1 liter of water in a proportion of 1:1 with vigorous stirring by means of a homomixer, thereby allowing the catalyst residue to transfer into the aqueous phase. After allowing the contacted mixture to stand, the aqueous phase was removed by separation, and the polymer solution phase was washed twice with distilled water to purify it and separated.

Then, the polymer solution thus purified and separated was poured into acetone in an amount of 3 times as much as the polymer solution with vigorous stirring to precipitate a copolymer, and the solid portion (copolymer) was collected by filtration and thoroughly washed with acetone. Further, the solid portion was introduced into acetone so as to be 40 g/liter and extracted the unreacted norbornene (NB) present in the polymer at a temperature of 60° C. for 2 hours. After the extraction, the solid portion was collected by filtration and dried at 130° C. and 350 mmHg for 12 hours in a nitrogen stream.

In the above-mentioned manner, a cycloolefin copolymer composition comprising the ethylene/PhBH copolymer and the ethylene/NB copolymer was obtained. In the copolymer composition thus produced, the component [Aα] was contained in an amount of 25.7% by weight. The MFR of the copolymer composition, as measured at 260° C. under a load of 2.16 kg, was 2.6 g/10 min. The Tg of the component [Bα] was 135° C.

The results are shown in Table 5.

Comparative Examples 6–8

The procedure of Example 15 was repeated except for varying the conditions to those shown in Table 5, to prepare cycloolefin copolymer compositions.

The results are shown in Table 5.

As is apparent from the results of Comparative Example 7, when the intrinsic viscosity [η] of the elastomer component [ACt] is lower than 0.5 dl/g, the impact strength of the composition is reduced. Further, as is apparent from the results of Comparative Example 8, when the glass transition temperature (Tg) of the elastomer component [Aα] is not lower than 15° C., the impact strength of the composition is reduced.

TABLE 5

| Example | Elastomer Component [Aa] | | | | |
|---|---|---|---|---|---|
| | Kind of Elastomer | [η] (dl/g) | Ph—NB Content (mol %) | Tg (°c.) | Refractive Index (n$_D$) *2 |
| Ex. 15 | Ethylene.PhBH | 1.91 | 12.2 | 2.4 | 1.5416 |
| Ex. 16 | Ethylene.PhBH | 2.10 | 14.1 | 7.2 | 1.5457 |
| Ex. 17 | Ethylene.PhBH | 2.02 | 5.0 | −6.0 | 1.5302 |
| Comp. Ex. 6 | Component [Aa] was not present | | | | |
| Comp. Ex. 7 | Ethylene.PhBH | 0.32 | 11.0 | 1.0 | 1.5391 |
| Comp. Ex. 8 | Ethylene.PhBH | 1.87 | 17.0 | 20.6 | 1.5479 |

TABLE 5-continued

| | Conditions for Synthesis of Component [Ba] in the presence of Component [Aa]*1 | | | |
|---|---|---|---|---|
| Example | Kind of Cycloolefin | Concentration of Cycloolefin (g/l) | Feed Rate of Ethylene (l/hr) | Added Amount of [Aa] (g/l) |
| Ex. 15 | TCD | 60.0 | 30.6 | 6.9 |
| Ex. 16 | TCD | 60.0 | 30.6 | 6.9 |
| Ex. 17 | NB | 335.0 | (pressure: 4 kg/cm$^2$) | 7.8 |
| Comp. Ex. 6 | TCD | 60.0 | 30.6 | 0 |
| Comp. Ex. 7 | TCD | 60.0 | 30.6 | 6.9 |
| Comp. Ex. 8 | TCD | 60.0 | 30.6 | 6.9 |

| | Physical Properties of Copolymer Composition | | | | | | |
|---|---|---|---|---|---|---|---|
| Ex. | Content of [Aa] (wt %) | Tg of [Ba] (°C.) | Refractive Index of [Ba] (n$_D$) *2 | Refractive Index Difference between [Aa] and [Ba] | Izod Impact Strength (kg · cm/cm) | Light Transmittance (%) | MFR (g/10 min) |
| Ex. 15 | 25.8 | 142 | 1.5436 | 0.0020 | 21 | 88 | 2.9 |
| Ex. 16 | 26.0 | 141 | 1.5486 | 0.0029 | 10 | 88 | 2.7 |
| Ex. 17 | 26.0 | 135 | 1.5291 | 0.0011 | 37 | 88 | 2.6 |
| Comp. Ex. 6 | 0 | 149 | 1.5441 | — | 1 | 89 | 5.0 |
| Comp. Ex. 7 | 25.9 | 143 | 1.5436 | 0.0045 | 2 | 85 | 2.8 |
| Comp. Ex. 8 | 26.0 | 144 | 1.5436 | 0.0043 | 3 | 86 | 2.7 |

*1: Feed rate of nitrogen = 40.6 l/hr, Feed rate of hydrogen = 0.85 l/hr. In Example 17 and Comparative Example 6, neither nitrogen nor hydrogen was fed.
*2: measured at 25° C.

What is claimed is:

1. A cycloolefin copolymer composition comprising:

(Aa) a cycloolefin elastomer component which is obtained by copolymerizing (i) an α-olefin of two or more carbon atoms with (ii) at least one cycloolefin represented by the following formula (I) or (II) and (iiia) a non-conjugated diene of 5 to 20 carbon atoms, and which has a content of the cycloolefin units of not less than 3% by mol, an intrinsic viscosity (η), as measured in decalin at 135° C., of 0.5 to 5.0 dl/g, a glass transition temperature (Tg) of lower than 15° C., an iodine value of 2 to 30 (g-iodine/100 g-polymer) and a refractive index n$_D$(Aa), as measured at 25° C., of 1.500 to 1.650, and contains a polymerizable carbon-carbon double bond; and (Ba) a cycloolefin copolymer component having a glass transition temperature (Tg), as measured by DSC, of not lower than 70° C. which is obtained by copolymerizing (i) an α-olefin of two or more carbon atoms with (ii) a cycloolefin represented by the following formula (I) or (II), wherein the copolymerization to obtain the cycloolefin copolymer component (Ba) is carried out in the presence of the copolymer component (Aa) and the copolymer component (Aa) is chemically bound to the copolymer component (Ba); and wherein the component (Aa) is contained in an amount of 8 to 40% by weight, and a difference Δn$_D$=|n$_D$(Aa)−n$_D$(Ba)| between the refractive index n$_D$(Aa) of the component (Aa) and the refractive index n$_D$(Ba) of the component (Ba) is not more than 0.015:

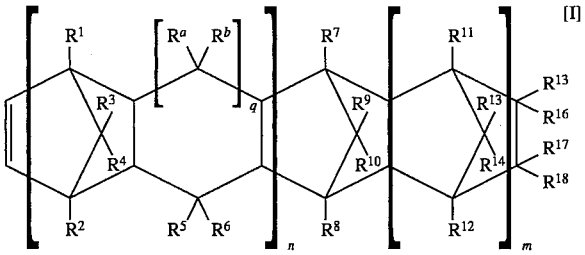

wherein n is 0 or 1; m is 0 or a positive integer; q is 0 or 1;

each of R$^1$–R$^{18}$, R$^a$ and R$^b$ is independently a hydrogen atom, a halogen atom, or an aliphatic, an alicyclic or an aromatic hydrocarbon group;

R$^{15}$–R$^{18}$ may be linked with one another to form a monocyclic or polycyclic group which may have a double bond; and R$^{15}$ and R$^{16}$, or R$^{17}$ and R$^{18}$ may together form an alkylidene group; or

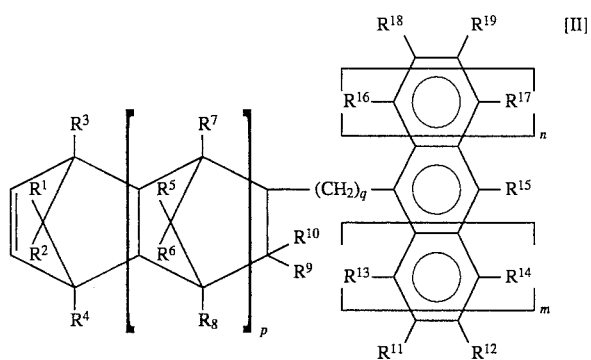

wherein each of p and q is independently 0 or an integer of 1 or more; each of m and n is independently 0, 1 or 2;

each of $R^1$–$R^{19}$ is independently a hydrogen atom, a halogen atom, or an aliphatic, an alicyclic or an aromatic hydrocarbon group, or an alkoxy group; the carbon atom to which $R^9$ and $R^{10}$ are linked may be bonded directly or by way of an alkylene group of 1–3 carbon atoms to the carbon atom to which $R^{13}$ is linked or the carbon atom to which $R^{11}$ is linked; and $R^{15}$ and $R^{12}$ or $R^{15}$ and $R^{19}$ may be linked together to form a monocyclic or polycyclic aromatic ring when each of n and m is 0.

2. A cycloolefin copolymer composition comprising:

(Aa) a cycloolefin elastomer component which is obtained by copolymerizing (i) an α-olefin of two or more carbon atoms with (ii) a cycloolefin represented by the following formula (II) and (iiia) a non-conjugated diene of 5 to 20 carbon atoms, and which has a content of the cycloolefin units of not less than 3% by mol, an intrinsic viscosity (η), as measured in decalin at 135° C., of 0.5 to 5.0 dl/g, a glass transition temperature (Tg) of lower than 15° C., an iodine value of 2 to 30 (g-iodine/100 g-polymer) and a refractive index $n_D$(Aa), as measured at 25° C., of 1.500 to 1.650, and contains a polymerizable carbon-carbon double bond; and (Ba) a cycloolefin copolymer component having a glass transition temperature (Tg), as measured by DSC, of not lower than 70° C. which is obtained by copolymerizing (i) an α-olefin of two or more carbon atoms with (ii) a cycloolefin represented by the following formula (I), wherein the copolymerization to obtain the cycloolefin copolymer component (Ba) is carried out in the presence of the copolymer component (Aa) and the copolymer component (Aa) is chemically bound to the copolymer component (Ba); and wherein the component (Aa) is contained in an amount of 8 to 40% by weight, and a difference $\Delta n_D = |n_D(Aa) - n_D(Ba)|$ between the refractive index $n_D$(Aa) of the component (Aa) and the refractive index $n_D$(Ba) of the component (Ba) is not more than 0.015.

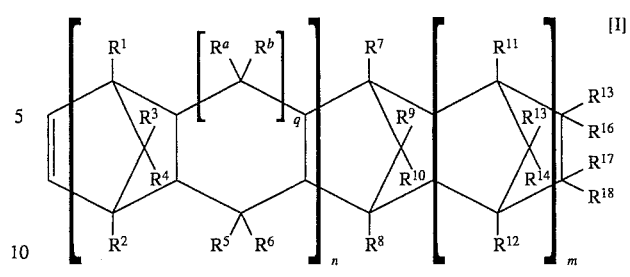

wherein n is 0 or 1; m is 0 or a positive integer; q is 0 or 1;

each of $R^1$–$R^{18}$, $R^a$ and $R^b$ is independently a hydrogen atom, a halogen atom, or an aliphatic, an alicyclic or an aromatic hydrocarbon group;

$R^{15}$–$R^{18}$ may be linked with one another to form a monocyclic or polycyclic group which may have a double bond; and $R^{15}$ and $R^{16}$, or $R^{17}$ and $R^{18}$ may together form an alkylidene group; or

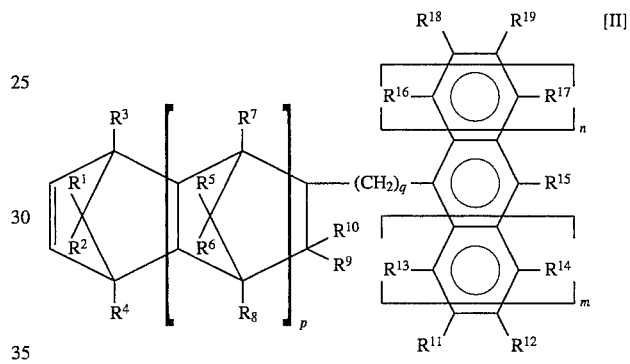

wherein each of p and q is independently 0 or an integer of 1 or more; each of m and n is independently 0, 1 or 2;

each of $R^1$–$R^{19}$ is independently a hydrogen atom, a halogen atom, or an aliphatic, an alicyclic or an aromatic hydrocarbon group, or an alkoxy group; the carbon atom to which $R^9$ and $R^{10}$ are linked may be bonded directly or by way of an alkylene group of 1–3 carbon atoms to the carbon atom to which $R^{13}$ is linked or the carbon atom to which $R^{11}$ is linked; and $R^{15}$ and $R^{12}$ or $R^{15}$ and $R^{19}$ may be linked together to form a monocyclic or polycyclic aromatic ring when each of n and m is 0.

3. A cycloolefin copolymer composition comprising:

(Aα) a cycloolefin elastomer component which is obtained by copolymerizing (i) an α-olefin of two or more carbon atoms and (ii) at least one cycloolefin represented by the following formula (I) or (II), and which has a content of the cycloolefin units of not less than 3% by mol, an intrinsic viscosity (η), as measured in decalin at 135° C., of 0.5 to 5.0 dl/g, a glass transition temperature (Tg) of lower than 15° C. and a refractive index $n_D$(Aα), as measured at 25° C., of 1.500 to 1.650, and substantially contains no polymerizable carbon-carbon double bond; and (Bα) a cycloolefin copolymer component having a glass transition temperature (TG), as measured by DSC, of not lower than 70° C. which is obtained by copolymerizing (i) an α-olefin of two or more carbon atoms with (ii) at least one cycloolefin represented by the following formula (I) or (II), wherein the copolymerization to obtain the cycloolefin copolymer component (Bα) is carried out in the presence of the copolymer component (Aα) and the copolymer component (Aα) is finely dispersed in the copolymer component (Bα); and wherein the component (Aα) is contained in an amount of 8 to 40% by weight, and a difference $\Delta n_D = |n_D(A\alpha) - n_D(B\alpha)|$ between the refractive index $n_D(A\alpha)$ of the component (Aα) and the refractive index $n_D(B\alpha)$ of the component (Bα) is not more than 0.015:

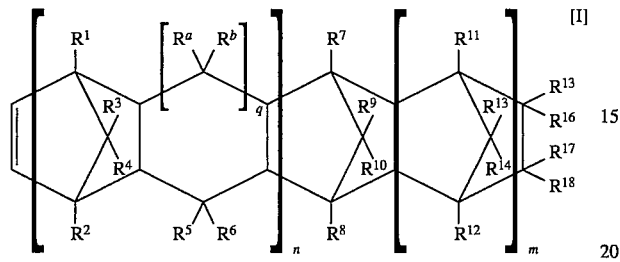

wherein n is 0 or 1; m is 0 or a positive integer; q is 0 or 1;

each of $R^1$–$R^{18}$, $R^a$ and $R^b$ is independently a hydrogen atom, a halogen atom, or an aliphatic, an alicyclic or an aromatic hydrocarbon group;

$R^{15}$–$R^{18}$ may be linked with one another to form a monocyclic or polycyclic group which may have a double bond; and $R^{15}$ and $R^{16}$, or $R^{17}$ and $R^{18}$ may together form an alkylidene group; or

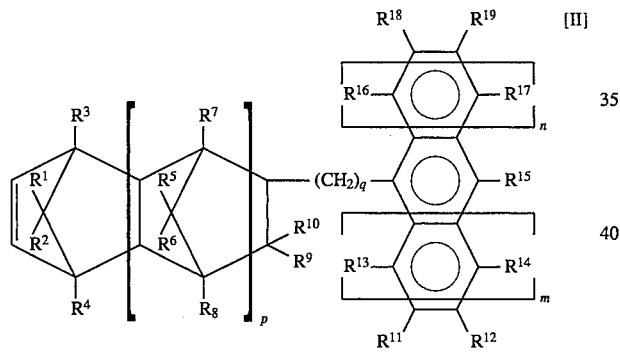

wherein each of p and q is independently 0 or an integer of 1 or more; each of m and n is independently 0, 1 or 2;

each of $R^1$–$R^{19}$ is independently a hydrogen atom, a halogen atom, or an aliphatic, an alicyclic or an aromatic hydrocarbon group, or an alkoxy group; the carbon atom to which $R^9$ and $R^{10}$ are linked may be bonded directly or by way of an alkylene group of 1–3 carbon atoms to the carbon atom to which $R^{13}$ is linked or the carbon atom to which $R^{11}$ is linked; and $R^{15}$ and $R^{12}$ or $R^{15}$ and $R^{19}$ may be linked together to form a monocyclic or polycyclic aromatic ring when each of n and m is 0.

4. A cycloolefin copolymer composition comprising:

(Aα) a cycloolefin elastomer component which is obtained by copolymerizing (i) an α-olefin of two or more carbon atoms with (ii) at least one cycloolefin represented by the below formula (II), and which has a content of the cycloolefin units of not less than 3% by mol, an intrinsic viscosity (η), as measured in decalin at 135° C., of 0.5 to 5.0 dl/g, a glass transition temperature (Tg) of lower than 15° C. and a refractive index $n_D(A\alpha)$, as measured at 25° C., of 1.500 to 1.650, and substantially contains no polymerizable carbon-carbon double bond; and (Bα) a cycloolefin copolymer component having a glass transition temperature (Tg), as measured by DSC, of not lower than 70° C. which is obtained by copolymerizing (i) an α-olefin of two or more carbon atoms with (ii) at least one cycloolefin represented by the following formula (I), wherein the copolymerization to obtain the cycloolefin copolymer component (Bα) is carried out in the presence of the copolymer component (Äα) and the copolymer component (Aα) is finely dispersed in the copolymer component (Bα); and wherein the component (Aα) is contained in an amount of 8 to 40% by weight, and a difference $\Delta n_D = |n_D(A\alpha) - n_D(B\alpha)|$ between the refractive index $n_D(A\alpha)$ of the component (Aα) and the refractive index $n_D(B\alpha)$ of the component (Bα) is not more than 0.015.

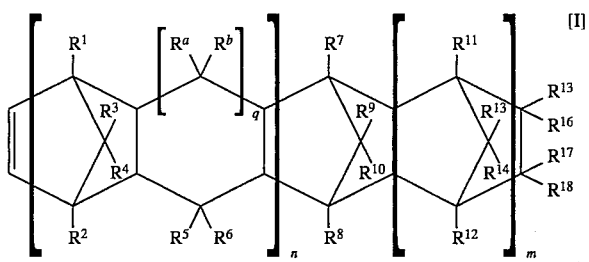

wherein n is 0 or 1; m is 0 or a positive integer; q is 0 or 1;

each of $R^1$–$R^{18}$, $R^a$ and $R^b$ is independently a hydrogen atom, a halogen atom, or an aliphatic, an alicyclic or an aromatic hydrocarbon group;

$R^{15}$–$R^{18}$ may be linked with one another to form a monocyclic or polycyclic group which may have a double bond; and $R^{15}$ and $R^{16}$, or $R^{17}$ and $R^{18}$ may together form an alkylidene group; or

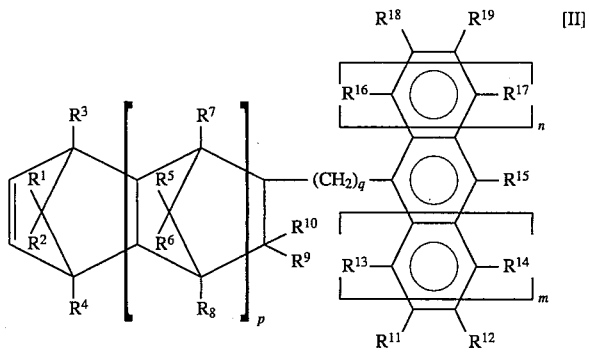

wherein each of p and q is independently 0 or an integer of 1 or more; each of m and n is independently 0, 1 or 2;

each of $R^1$–$R^{19}$ is independently a hydrogen atom, a halogen atom, or an aliphatic, an alicyclic or an aromatic hydrocarbon group, or an alkoxy group; the carbon atom to which $R^9$ and $R^{10}$ are linked may be bonded directly or by way of an alkylene group of 1–3 carbon atoms to the carbon atom to which $R^{13}$ is linked or the carbon atom to which $R^{11}$ is linked; and $R^{15}$ and $R^{12}$ $R^{15}$ and $R^{19}$ may be linked together to form a monocyclic or polycyclic aromatic ring when each of n and m is 0.

\* \* \* \* \*